United States Patent
Reese et al.

(10) Patent No.: US 11,656,838 B2
(45) Date of Patent: May 23, 2023

(54) USER INTERFACES FOR TIME PERIOD-BASED CURATED PLAYLISTS

(71) Applicant: Apple Inc., Cupertino, CA (US)

(72) Inventors: Tiffany S. Reese, Cupertino, CA (US); Arvind S. Shenoy, Los Gatos, CA (US); David J. Davis, San Jose, CA (US); Evan Mills, Los Altos, CA (US); Sebastien P. Sahuc, Piedmont, CA (US); Uli M. Schöberl, San Francisco, CA (US); Benjamin B. Bours, San Francisco, CA (US); Eric R. Seshens, Milpitas, CA (US); Jason M. Hess, Morgan Hills, CA (US); Drew R. Domm, Oakland, CA (US); Alexander B. Grossman, San Francisco, CA (US); Phillip A. Vasquez, San Bruno, CA (US); Fredric R. Vinna, San Francisco, CA (US); Agnes Won, Los Angeles, CA (US); Michael Zarcone, Santa Monica, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 17/095,394

(22) Filed: Nov. 11, 2020

(65) Prior Publication Data

US 2021/0141592 A1 May 13, 2021

Related U.S. Application Data

(60) Provisional application No. 62/933,879, filed on Nov. 11, 2019.

(51) Int. Cl.
*G06F 3/16* (2006.01)
*G06F 3/0482* (2013.01)

(52) U.S. Cl.
CPC ............ *G06F 3/165* (2013.01); *G06F 3/0482* (2013.01)

(58) Field of Classification Search
CPC .............................. G06F 3/165; G06F 3/0482
See application file for complete search history.

(56) References Cited

U.S. PATENT DOCUMENTS

| 5,483,261 A | 1/1996 | Yasutake |
| 5,488,204 A | 1/1996 | Mead et al. |

(Continued)

FOREIGN PATENT DOCUMENTS

| CN | 1784650 B | 5/2010 |
| CN | 101720456 A | 6/2010 |

(Continued)

OTHER PUBLICATIONS

LastFM, Reddit forum, https://www.reddit.com/r/lastfm/comments/9gr3i0/itd_be_cool_if_lastfm_tracked_time_spent/e66e8js/?utm_source=reddit&utm_medium=web2x&context=3 (Year: 2018).*

(Continued)

*Primary Examiner* — James T Tsai
(74) *Attorney, Agent, or Firm* — Kubota & Basol LLP

(57) ABSTRACT

In some embodiments, an electronic device receives, via one or more input devices, an input corresponding to a request to display a user interface associated with a first respective content mix, wherein the first respective content mix is associated with a first respective time period. In some embodiments in response to receiving the input corresponding to the request to display the user interface associated with the first respective content mix, the electronic device displays, via a display, the user interface. In some embodiments, the user interface includes a plurality of representations of content items including visual indications of amounts of consumption, of a first consumption metric type, (Continued)

by a user during the first respective time period, and a plurality of representations of content creators including visual indications of consumption, of a second consumption metric type, by the user during the first respective time period.

54 Claims, 62 Drawing Sheets

(56) References Cited

U.S. PATENT DOCUMENTS

| | | | |
|---|---|---|---|
| 5,825,352 A | 10/1998 | Bisset et al. | |
| 5,835,079 A | 11/1998 | Shieh | |
| 5,880,411 A | 3/1999 | Gillespie et al. | |
| 5,978,828 A | 11/1999 | Greer et al. | |
| 6,188,391 B1 | 2/2001 | Seely et al. | |
| 6,310,610 B1 | 10/2001 | Beaton et al. | |
| 6,323,846 B1 | 11/2001 | Westerman et al. | |
| 6,570,557 B1 | 5/2003 | Westerman et al. | |
| 6,587,127 B1* | 7/2003 | Leeke | G06Q 30/02 715/764 |
| 6,677,932 B1 | 1/2004 | Westerman | |
| 6,690,387 B2 | 2/2004 | Zimmerman et al. | |
| 7,015,894 B2 | 3/2006 | Morohoshi | |
| 7,184,064 B2 | 2/2007 | Zimmerman et al. | |
| 7,614,008 B2 | 11/2009 | Ording | |
| 7,633,076 B2 | 12/2009 | Huppi et al. | |
| 7,653,883 B2 | 1/2010 | Hotelling et al. | |
| 7,657,849 B2 | 2/2010 | Chaudhri et al. | |
| 7,663,607 B2 | 2/2010 | Hotelling et al. | |
| 7,844,914 B2 | 11/2010 | Andre et al. | |
| 7,957,762 B2 | 6/2011 | Herz et al. | |
| 8,006,002 B2 | 8/2011 | Kalayjian et al. | |
| 8,239,784 B2 | 8/2012 | Hotelling et al. | |
| 8,279,180 B2 | 10/2012 | Hotelling et al. | |
| 8,332,406 B2* | 12/2012 | Donaldson | G06Q 50/01 707/913 |
| 8,381,135 B2 | 2/2013 | Hotelling et al. | |
| 8,479,122 B2 | 7/2013 | Hotelling et al. | |
| 8,543,928 B2 | 9/2013 | Stovicek et al. | |
| 8,977,948 B1 | 3/2015 | Balfe et al. | |
| 9,348,458 B2 | 5/2016 | Hotelling et al. | |
| 9,933,937 B2 | 4/2018 | Lemay et al. | |
| 10,165,108 B1 | 12/2018 | Douglas | |
| 2002/0015024 A1 | 2/2002 | Westerman et al. | |
| 2002/0075328 A1 | 6/2002 | Letzelter et al. | |
| 2003/0050909 A1 | 3/2003 | Preda et al. | |
| 2003/0191753 A1 | 10/2003 | Hoch | |
| 2005/0168780 A1 | 8/2005 | Kobashi et al. | |
| 2005/0190059 A1 | 9/2005 | Wehrenberg | |
| 2006/0017692 A1 | 1/2006 | Wehrenberg et al. | |
| 2006/0020686 A1 | 1/2006 | Liss et al. | |
| 2006/0033724 A1 | 2/2006 | Chaudhri et al. | |
| 2006/0197753 A1 | 9/2006 | Hotelling | |
| 2006/0242277 A1 | 10/2006 | Torrence et al. | |
| 2006/0248185 A1 | 11/2006 | Morris | |
| 2006/0282858 A1 | 12/2006 | Csicsatka et al. | |
| 2007/0085840 A1* | 4/2007 | Asaka | G06F 3/0488 341/20 |
| 2007/0204222 A1 | 8/2007 | Rogan et al. | |
| 2007/0297009 A1 | 12/2007 | Kikuchi | |
| 2008/0250312 A1 | 10/2008 | Curtis | |
| 2009/0222551 A1 | 9/2009 | Neely et al. | |
| 2009/0228486 A1 | 9/2009 | Kuehr-McLaren et al. | |
| 2010/0070884 A1 | 3/2010 | Bromenshenkel et al. | |
| 2010/0070885 A1 | 3/2010 | Bromenshenkel et al. | |
| 2010/0071000 A1 | 3/2010 | Amento et al. | |
| 2010/0205538 A1 | 8/2010 | Han et al. | |
| 2010/0302594 A1 | 12/2010 | Chapman et al. | |
| 2011/0004519 A1 | 1/2011 | Aleong et al. | |
| 2011/0078184 A1 | 3/2011 | Song et al. | |
| 2011/0246383 A1 | 10/2011 | Gibson et al. | |
| 2011/0276396 A1 | 11/2011 | Rathod | |
| 2012/0009903 A1 | 1/2012 | Schultz et al. | |
| 2012/0041907 A1 | 2/2012 | Wang et al. | |
| 2012/0088477 A1 | 4/2012 | Cassidy | |
| 2012/0117026 A1 | 5/2012 | Cassidy | |
| 2012/0173308 A1 | 7/2012 | Brown et al. | |
| 2012/0271882 A1 | 10/2012 | Sachdeva et al. | |
| 2013/0033428 A1 | 2/2013 | Choi et al. | |
| 2013/0042263 A1 | 2/2013 | Reynolds | |
| 2013/0165234 A1 | 6/2013 | Hall et al. | |
| 2013/0218961 A1* | 8/2013 | Ho | G06Q 30/02 709/204 |
| 2013/0265284 A1 | 10/2013 | Yun et al. | |
| 2013/0268543 A1 | 10/2013 | Andler et al. | |
| 2013/0339374 A1 | 12/2013 | Skeen et al. | |
| 2014/0059040 A1 | 2/2014 | Cha et al. | |
| 2014/0075308 A1* | 3/2014 | Sanders | G06F 3/165 715/716 |
| 2014/0108929 A1 | 4/2014 | Garmark et al. | |
| 2014/0114966 A1* | 4/2014 | Bilinski | G06F 16/24578 707/723 |
| 2014/0289000 A1 | 9/2014 | Hutchings et al. | |
| 2014/0297516 A1 | 10/2014 | Brown et al. | |
| 2015/0067505 A1 | 3/2015 | Metcalf et al. | |
| 2015/0067724 A1 | 3/2015 | Johnson et al. | |
| 2015/0193061 A1 | 7/2015 | Stekkelpak et al. | |
| 2015/0242497 A1 | 8/2015 | He et al. | |
| 2015/0278215 A1 | 10/2015 | Chang et al. | |
| 2015/0304268 A1 | 10/2015 | Byttow et al. | |
| 2016/0110064 A1 | 4/2016 | Shapira | |
| 2016/0132198 A1 | 5/2016 | Sinclair et al. | |
| 2016/0300594 A1 | 10/2016 | Allen et al. | |
| 2016/0346690 A1 | 12/2016 | Ramachandran | |
| 2017/0161665 A1 | 6/2017 | Iwata et al. | |
| 2017/0163591 A1 | 6/2017 | Jimenez Pazmino et al. | |
| 2017/0286915 A1 | 10/2017 | Yamaguchi et al. | |
| 2017/0310629 A1 | 10/2017 | Liu et al. | |
| 2017/0344553 A1 | 11/2017 | Evnine et al. | |
| 2017/0357421 A1* | 12/2017 | Dye | H04N 21/4825 |
| 2017/0358302 A1 | 12/2017 | Orr et al. | |
| 2018/0189391 A1 | 7/2018 | Ip et al. | |
| 2018/0367229 A1* | 12/2018 | Gibson | H04H 60/46 |
| 2018/0376178 A1 | 12/2018 | Cormican | |
| 2019/0272286 A1* | 9/2019 | Casillas | G06F 16/639 |
| 2019/0342616 A1 | 11/2019 | Domm et al. | |

FOREIGN PATENT DOCUMENTS

| | | |
|---|---|---|
| CN | 102834800 A | 12/2012 |
| CN | 103631851 A | 3/2014 |
| CN | 103858439 A | 6/2014 |
| CN | 104246683 A | 12/2014 |
| CN | 105007288 A | 10/2015 |
| CN | 105007289 A | 10/2015 |
| CN | 105095452 A | 11/2015 |
| CN | 106415476 A | 2/2017 |
| JP | 2000-163031 A | 6/2000 |
| JP | 2002-342033 A | 11/2002 |
| WO | 2013/169849 A2 | 11/2013 |
| WO | 2014/105276 A1 | 7/2014 |

OTHER PUBLICATIONS

Scrobbling Documentation (accessed URL=https://web.archive.org/web/20180524005114/https://www.last.fm/api/scrobbling) (Year: 2018).*

LastFM Charts (https://cbsi.secure.force.com/lastfm/articles/en_US/Knowledge/What-do-I-get-for-signing-up?retURL=%2Flastfm%2Fapex%2Fknowledgehome_lfm&popup=false&categories=LastFM%3ALastFM_Eng&template=template_lastfm&referer=lastfm.com&data=&cfs=LFM) (Year: 2015).*

Final Office Action received for U.S. Appl. No. 16/146,547, dated May 29, 2019, 60 pages.

International Search Report received for PCT Patent Application No. PCT/US2019/030728, dated Jun. 17, 2019, 3 pages.

Non-Final Office Action received for U.S. Appl. No. 16/146,547, dated Feb. 1, 2019, 62 pages.

Non-Final Office Action received for U.S. Appl. No. 16/146,547, dated Apr. 17, 2020, 54 pages.

(56) References Cited

OTHER PUBLICATIONS

Notice of Allowance received for U.S. Appl. No. 16/146,547, dated Apr. 16, 2021, 5 pages.
Notice of Allowance received for U.S. Appl. No. 16/146,547, dated Dec. 14, 2020, 27 pages.
Search Report Received for Chinese Patent Application No. 201811142387.9 dated Apr. 25, 2022, 11 Pages (5 Pages of English Translation and 6 Pages of Official Copy).
Search Report received for Danish Patent Application No. PA201870353, dated Oct. 3, 2018, 4 pages.
Arbelaez, Andres, "What if Spotify had Stories?", Prototypr.io, Available online at: <https://blog.prototypr.io/what-if-spotify-had-stories-9471a1464bd1>, [Retrieved Sep. 15, 2020], Feb. 1, 2018, 10 pages.
Lee et al., "A Multi-Touch Three Dimensional Touch-Sensitive Tablet", CHI'85 Proceedings, Apr. 1985, pp. 21-25.
Mostazo, Lucas, "Qué es y como usar Spotify (2017)", Youtube, Availabe online at: <https://www.youtube.com/watch?v=KNcZb-m7OVw>, [Retrieved Sep. 15, 2020], Jan. 9, 2015, 3 pages (Official Copy only). See attached Communication 37 CFR § 1.98(a) (3).
Rubine, Dean, "Combining Gestures and Direct Manipulation", CHI'92, May 3-7, 1992, pp. 659-660.
Rubine, Dean H., "The Automatic Recognition of Gestures", CMU-CS-91-202, Submitted in Partial Fulfillment of the Requirements for the Degree of Doctor of Philosophy in Computer Science at Carnegie Mellon University, Dec. 1991, 285 pages.
Seppala, Timothy J., "Spotify's latest playlist collects your top 100 tracks from 2017", Engadget, Available online at: <https://www.engadget.com/2017/12/05/spotify-unwrapped-ed-sheeran-in-2017/>, [Retrieved Sep. 15, 2020], Dec. 5, 2017, 9 pages.
Ting, Sim Yan, "Spotify Just Made it Easier to Discover Top Tracks your Friends are Listening to", Vulcan Post, Available online at: <https://vulcanpost.com/106221/spotify-just-made-easier-discover-top-tracksfriends-listening/>, Dec. 12, 2014, 4 pages.
Westerman, Wayne, "Hand Tracking, Finger Identification, and Chordic Manipulation on a Multi-Touch Surface", A Dissertation Submitted to the Faculty of the University of Delaware in Partial Fulfillment of the Requirements for the Degree of Doctor of Philosophy in Electrical Engineering, 1999, 363 pages.

\* cited by examiner

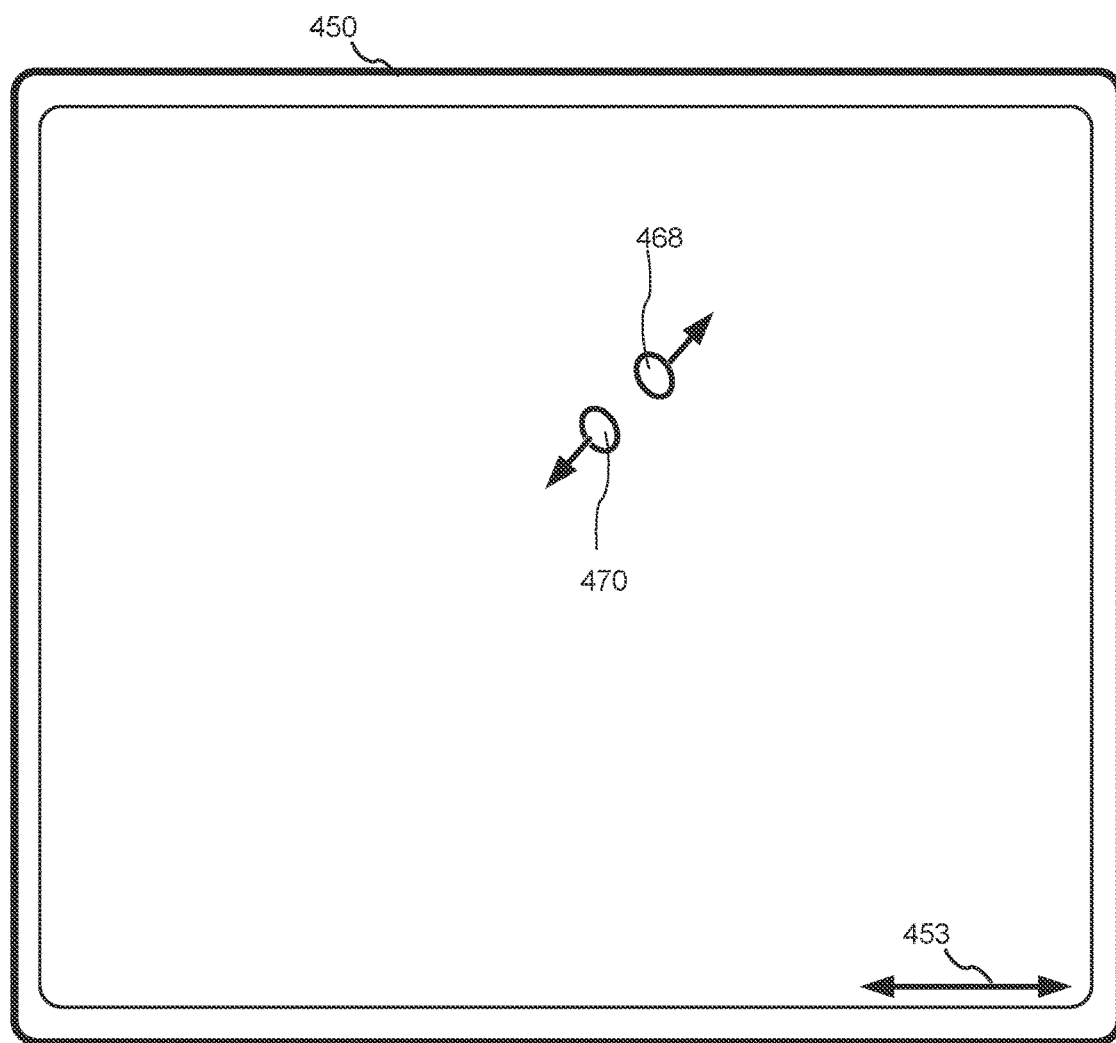
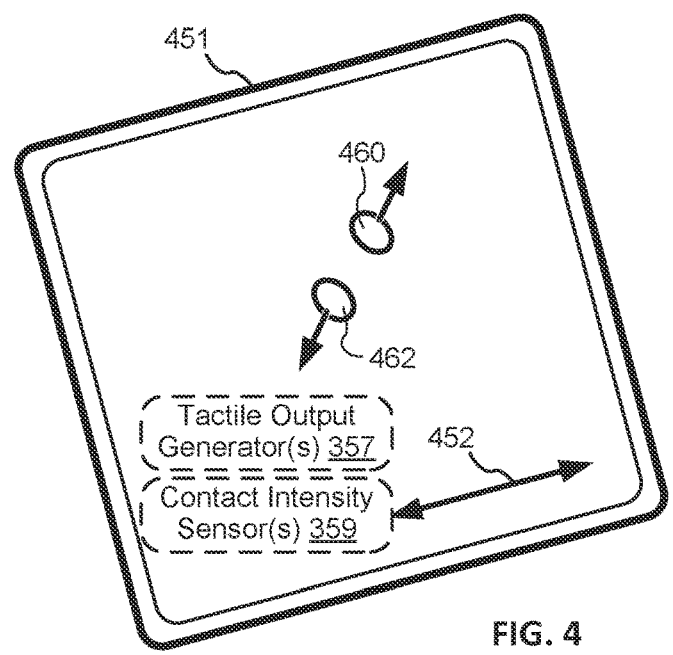
FIG. 4

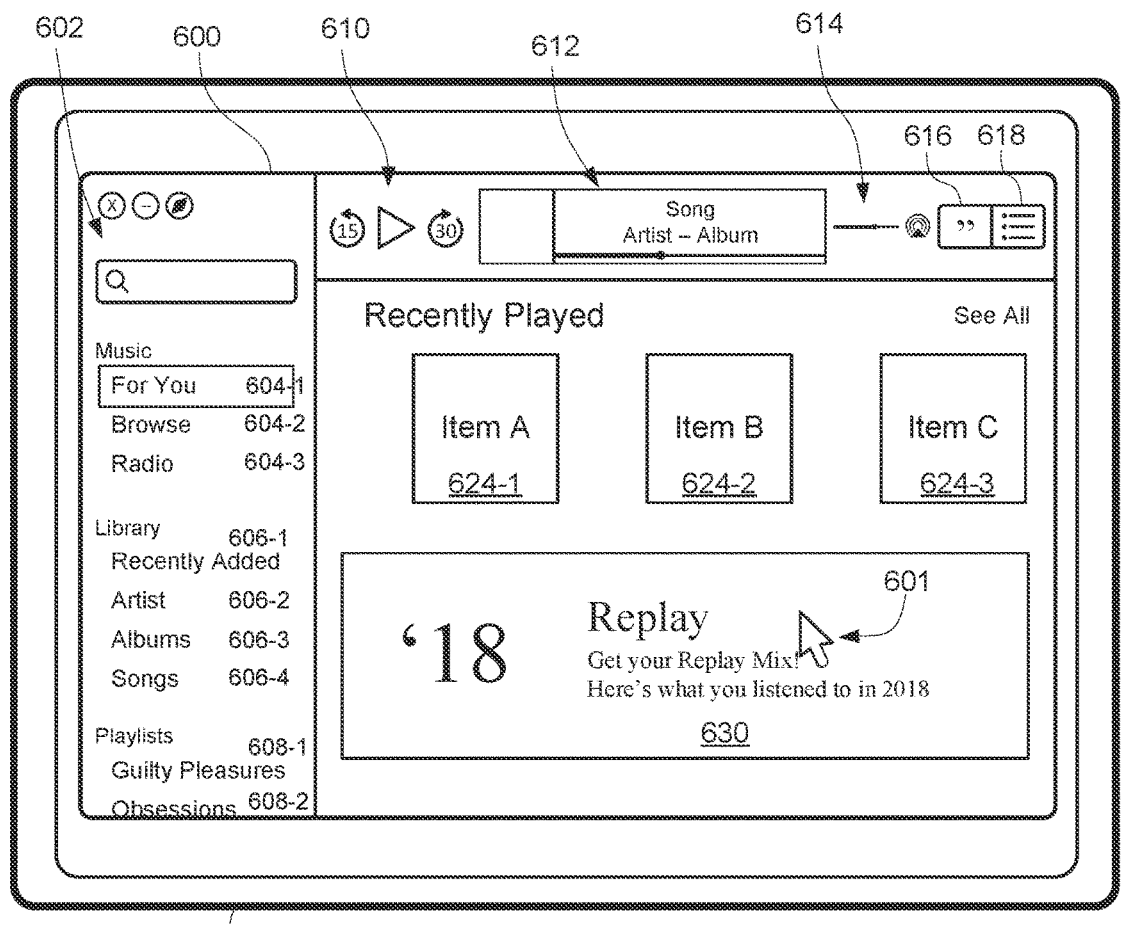
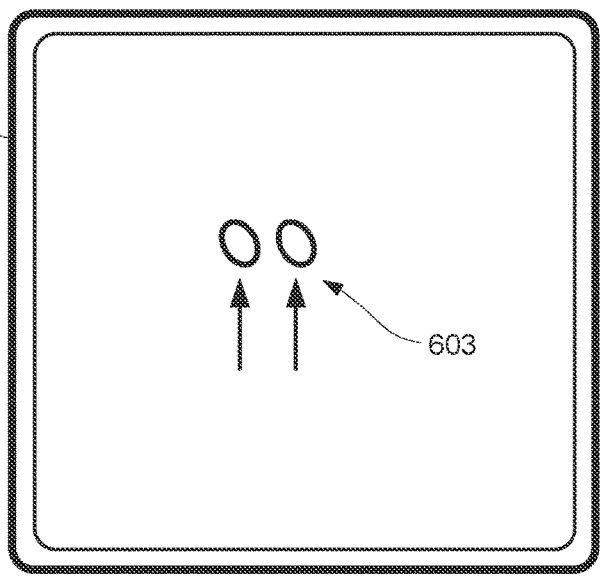
FIG. 6B

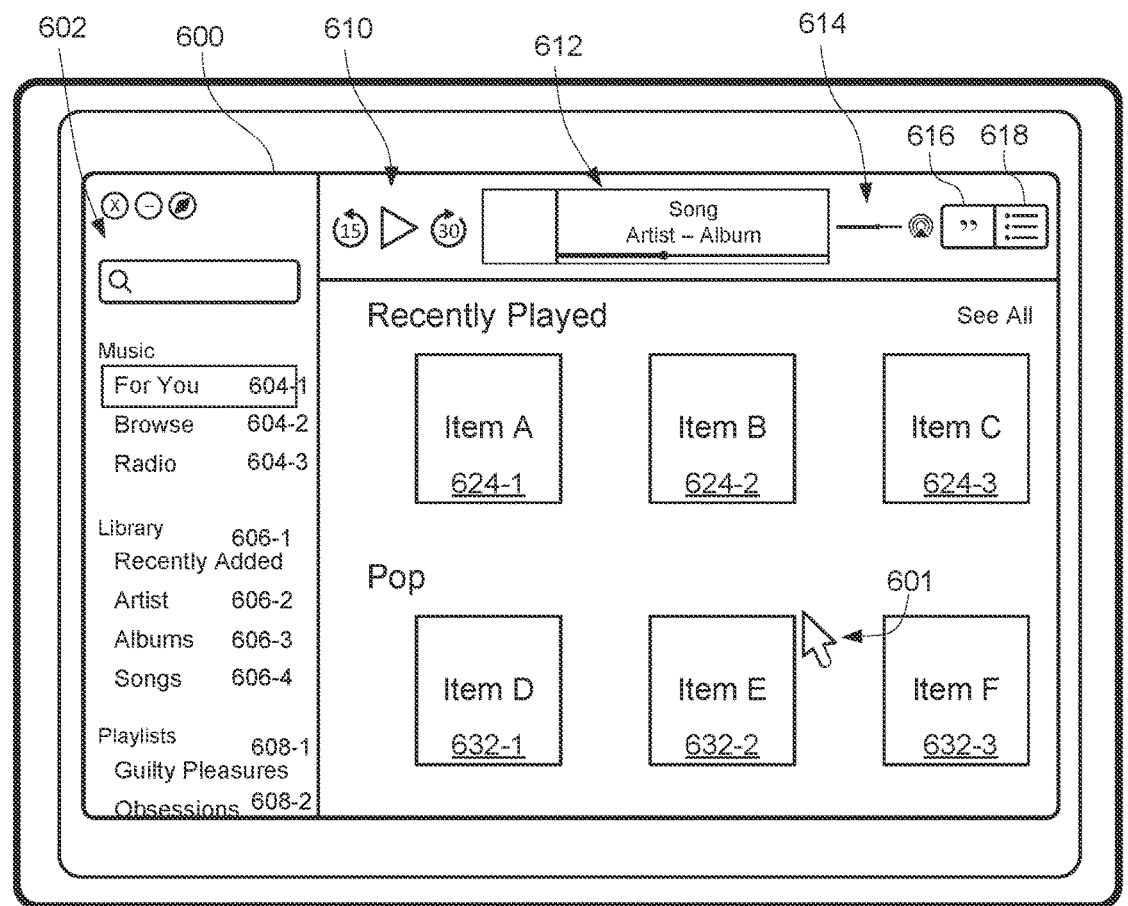
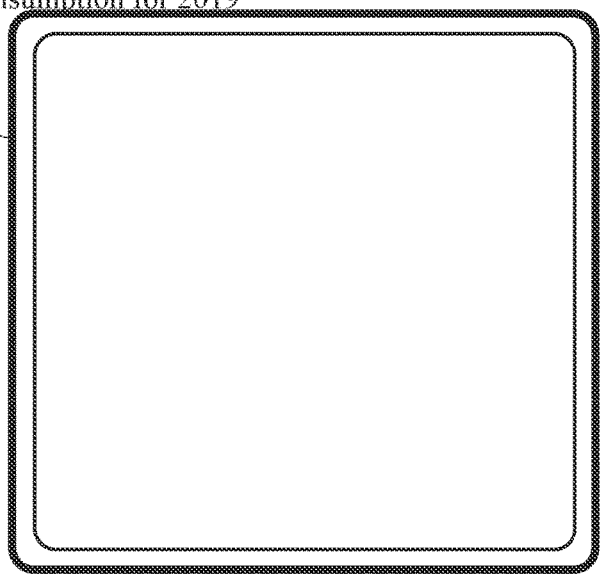
FIG. 6C

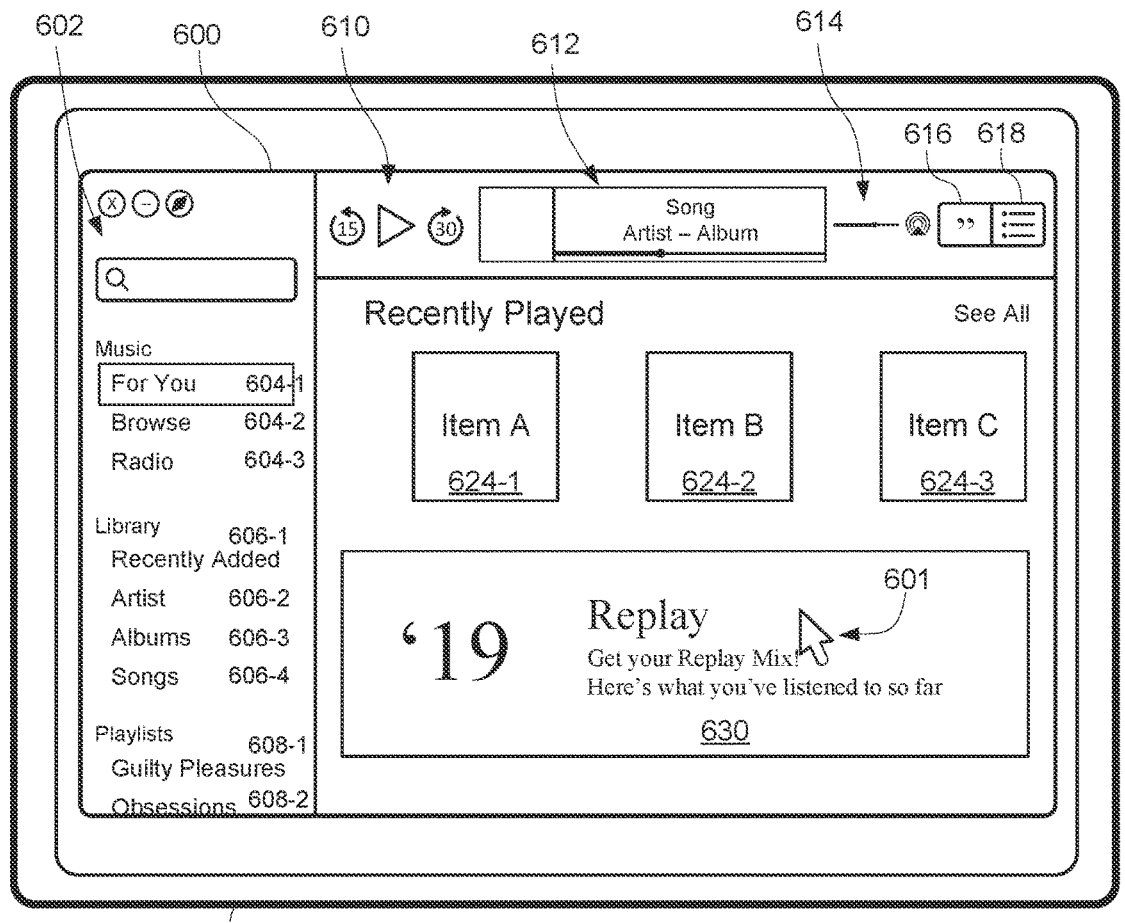
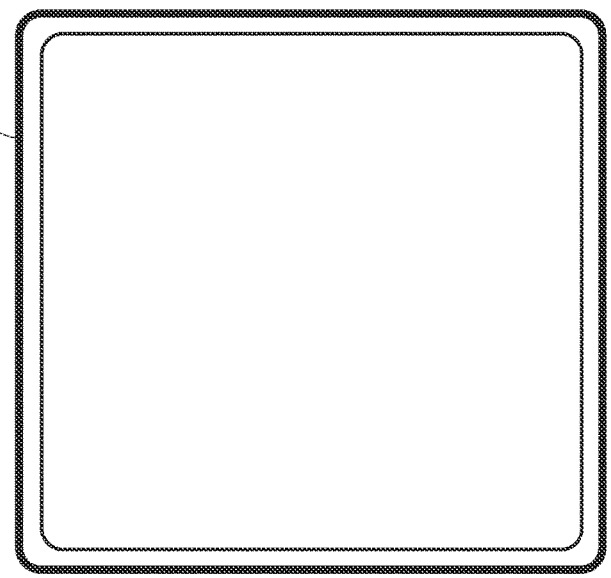
FIG. 6D

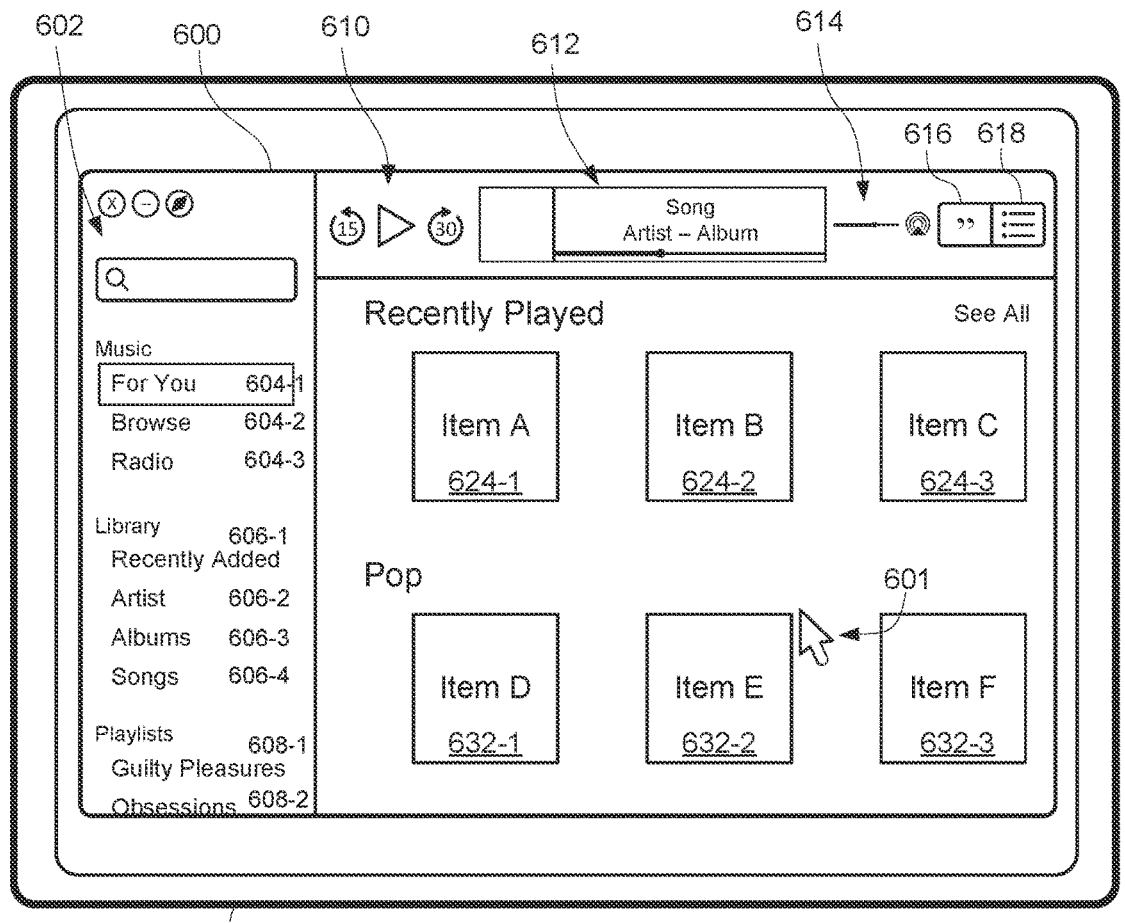
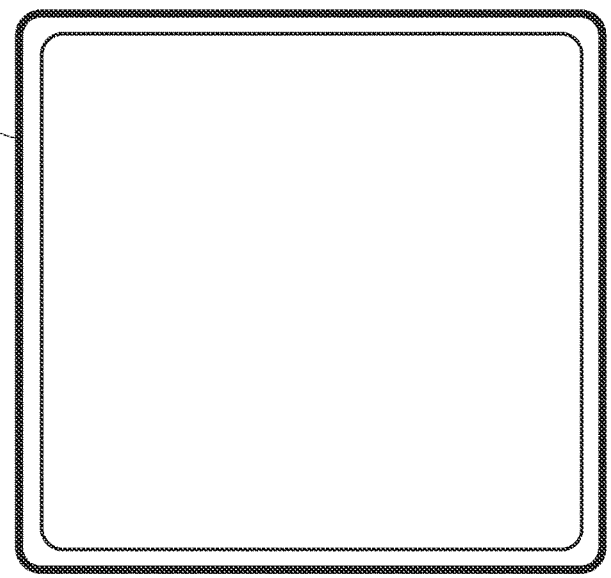
FIG. 6E

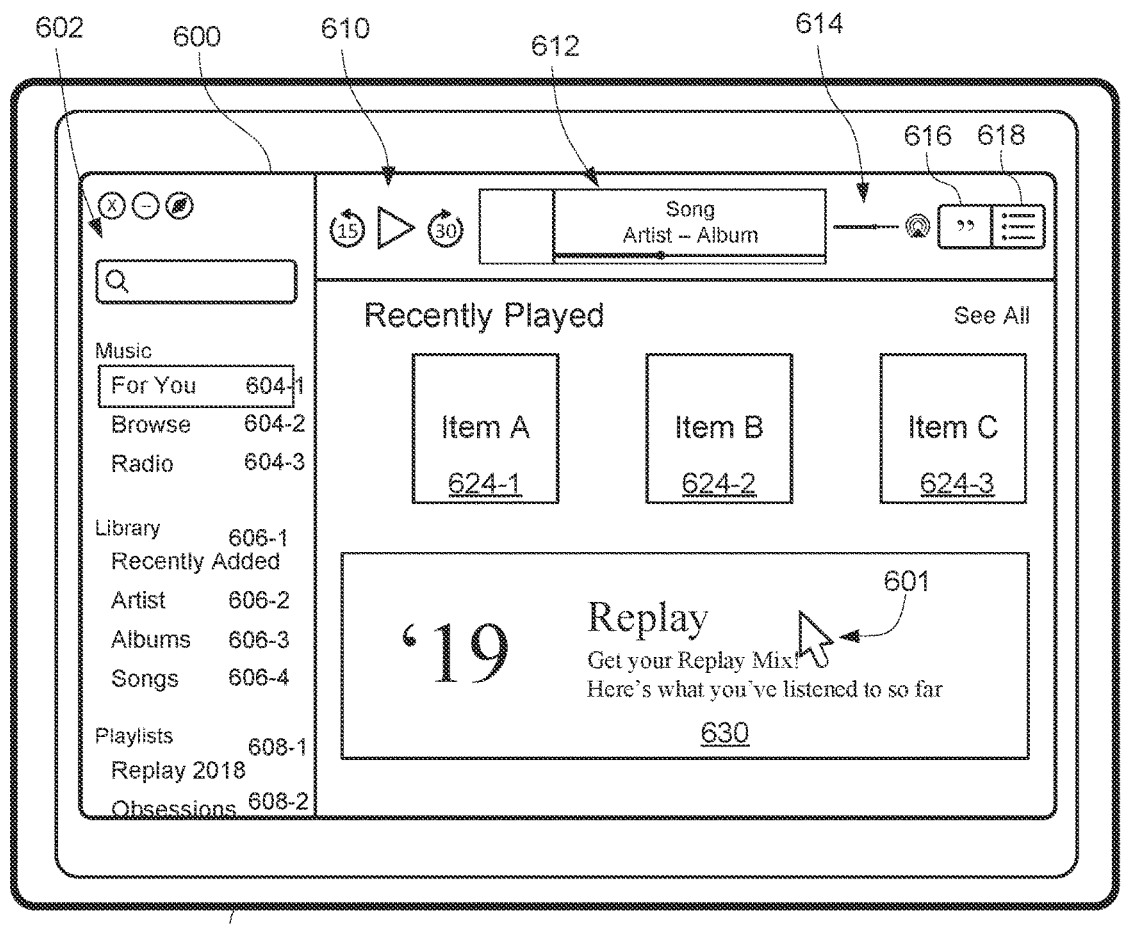
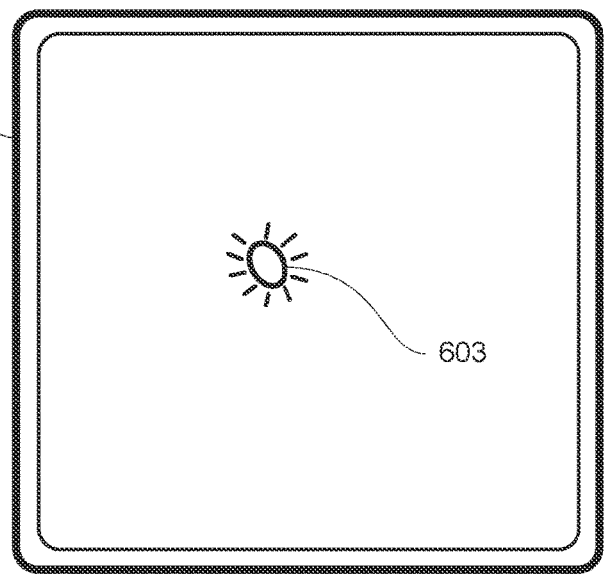
FIG. 6F

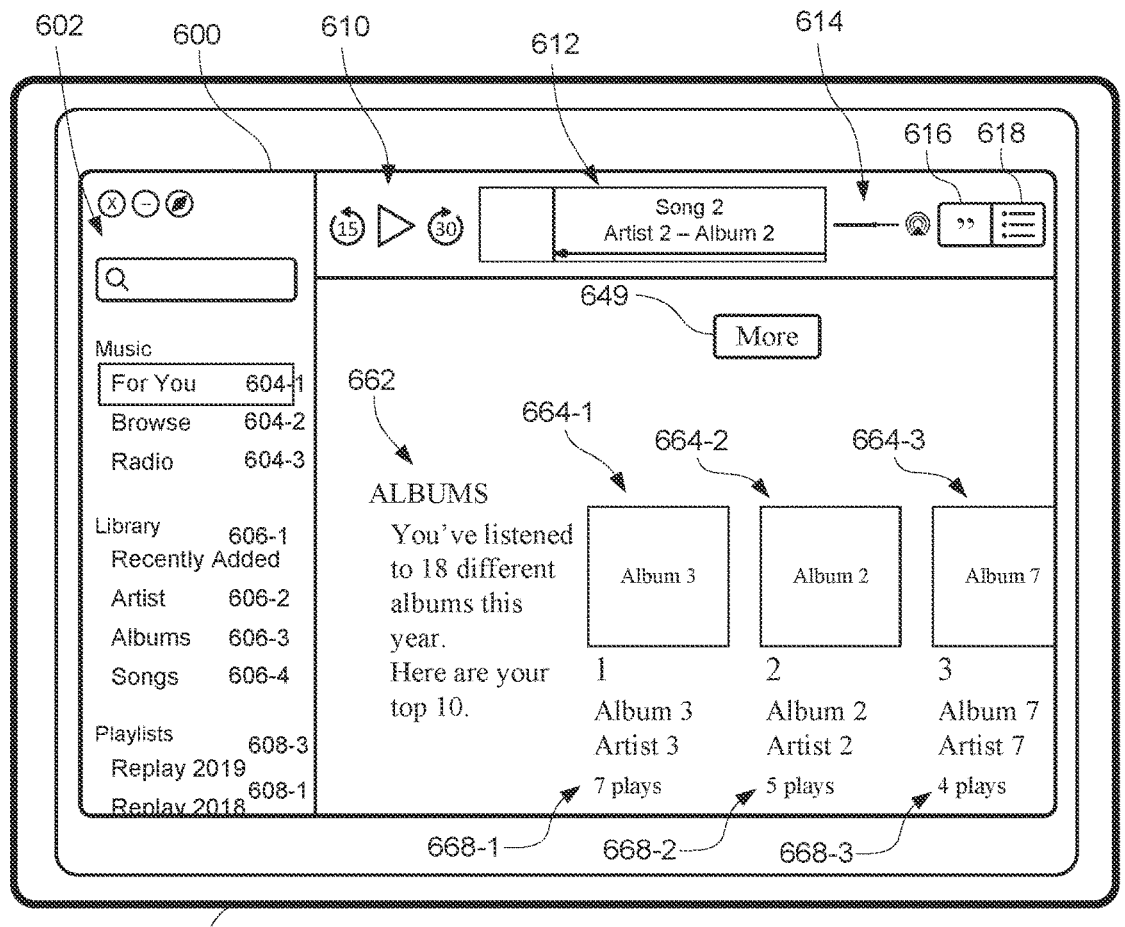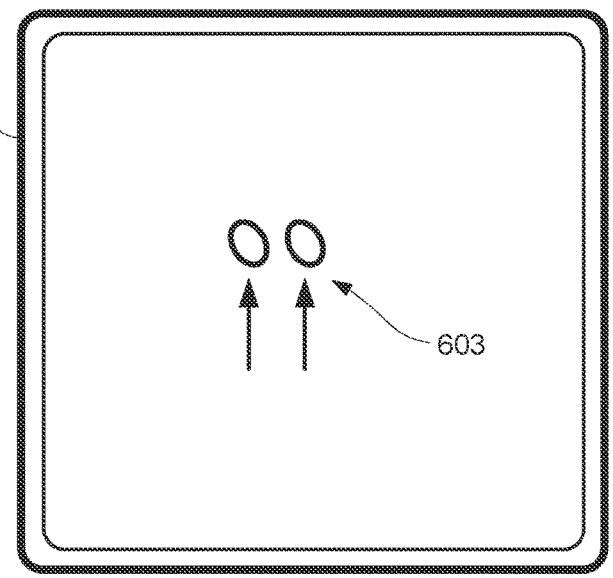
FIG. 6V

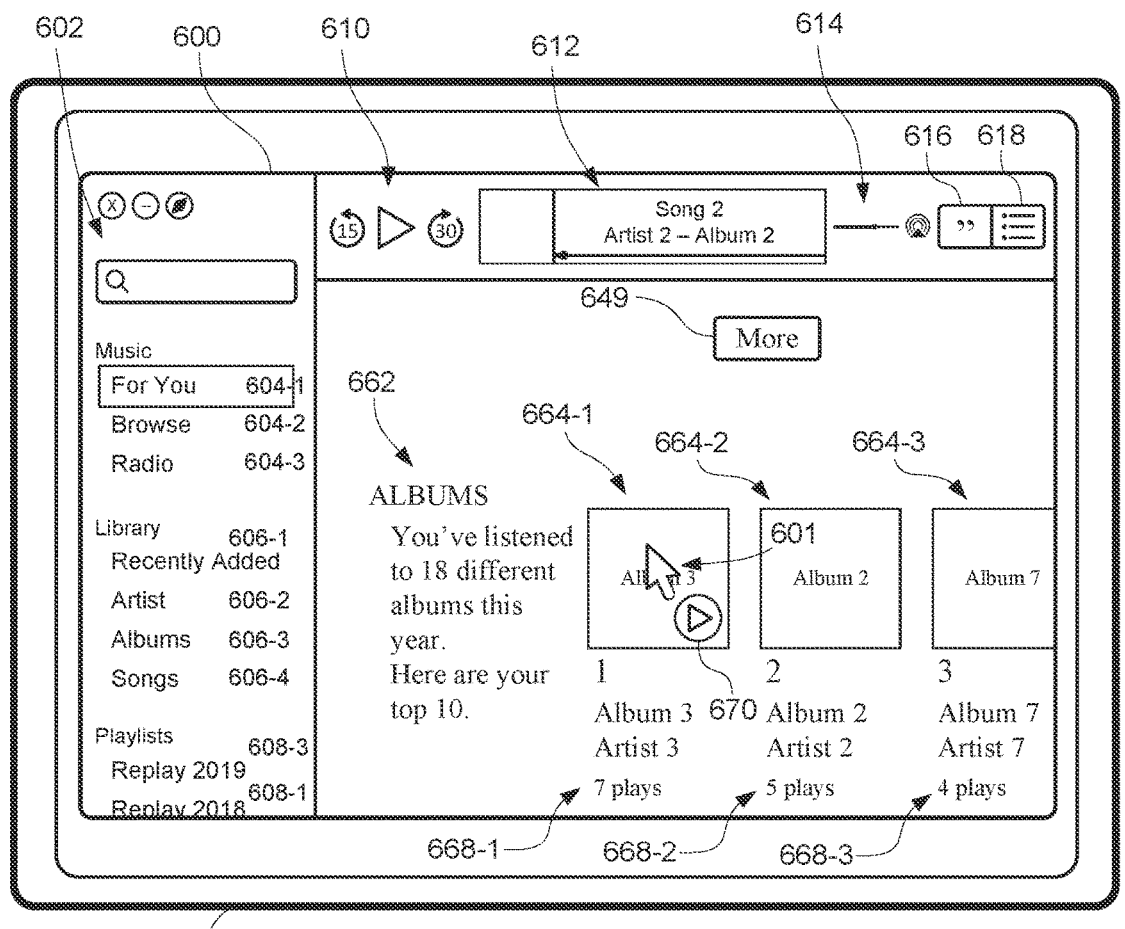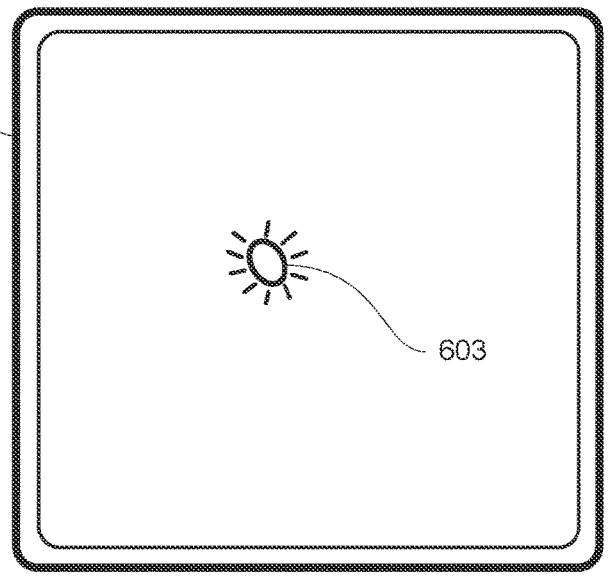
FIG. 6W

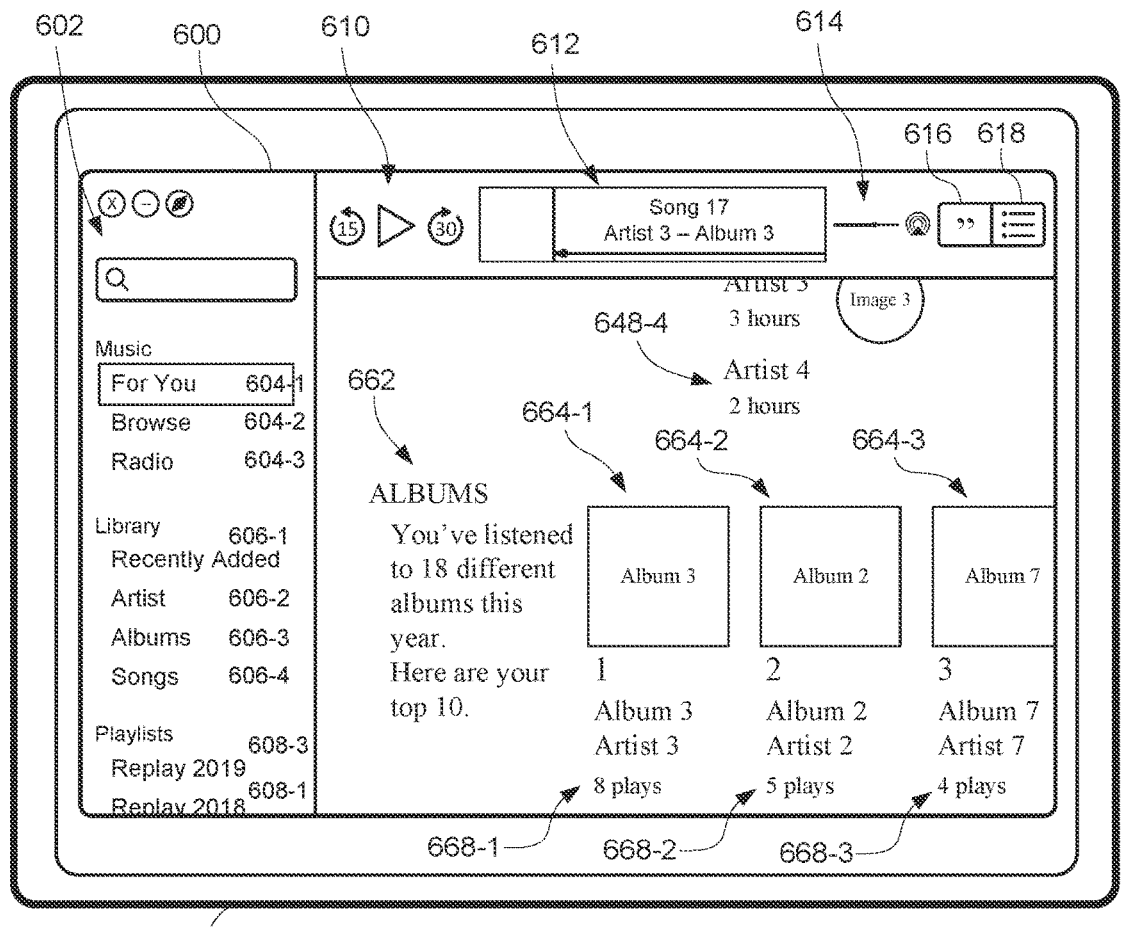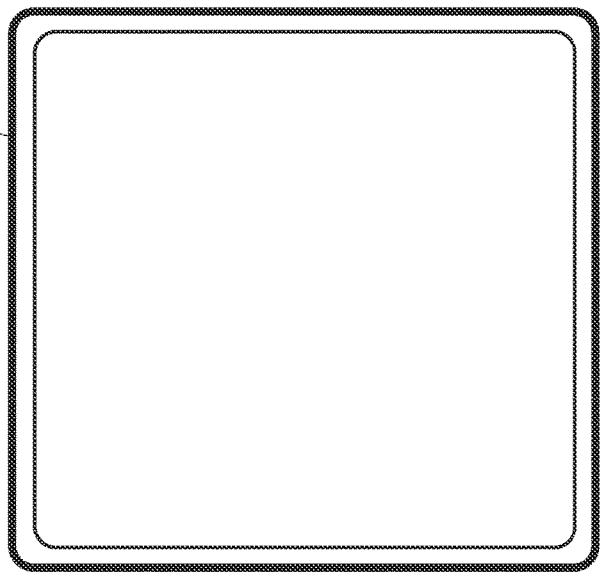
FIG. 6AA

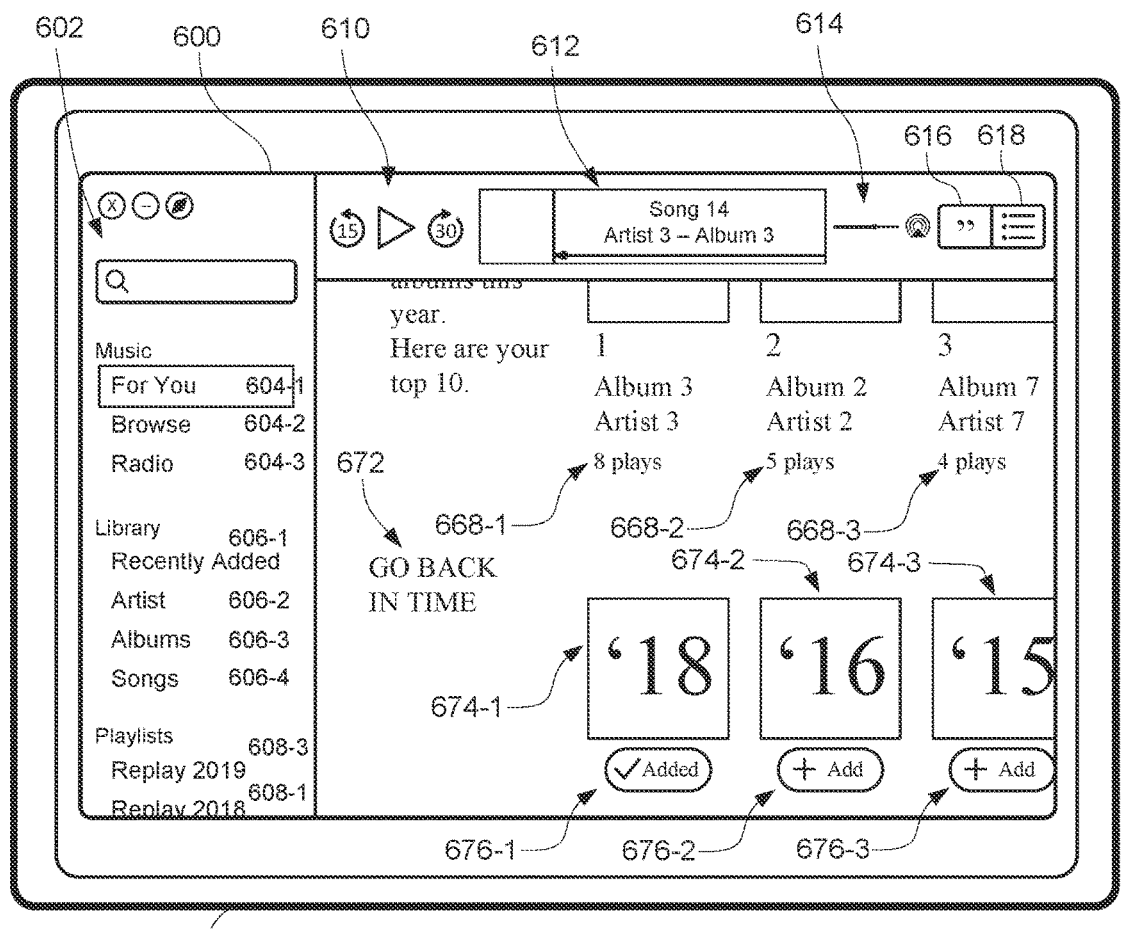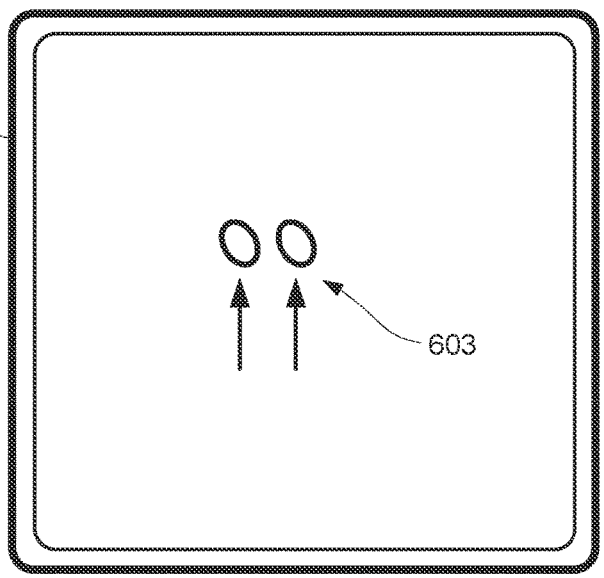
FIG. 6DD

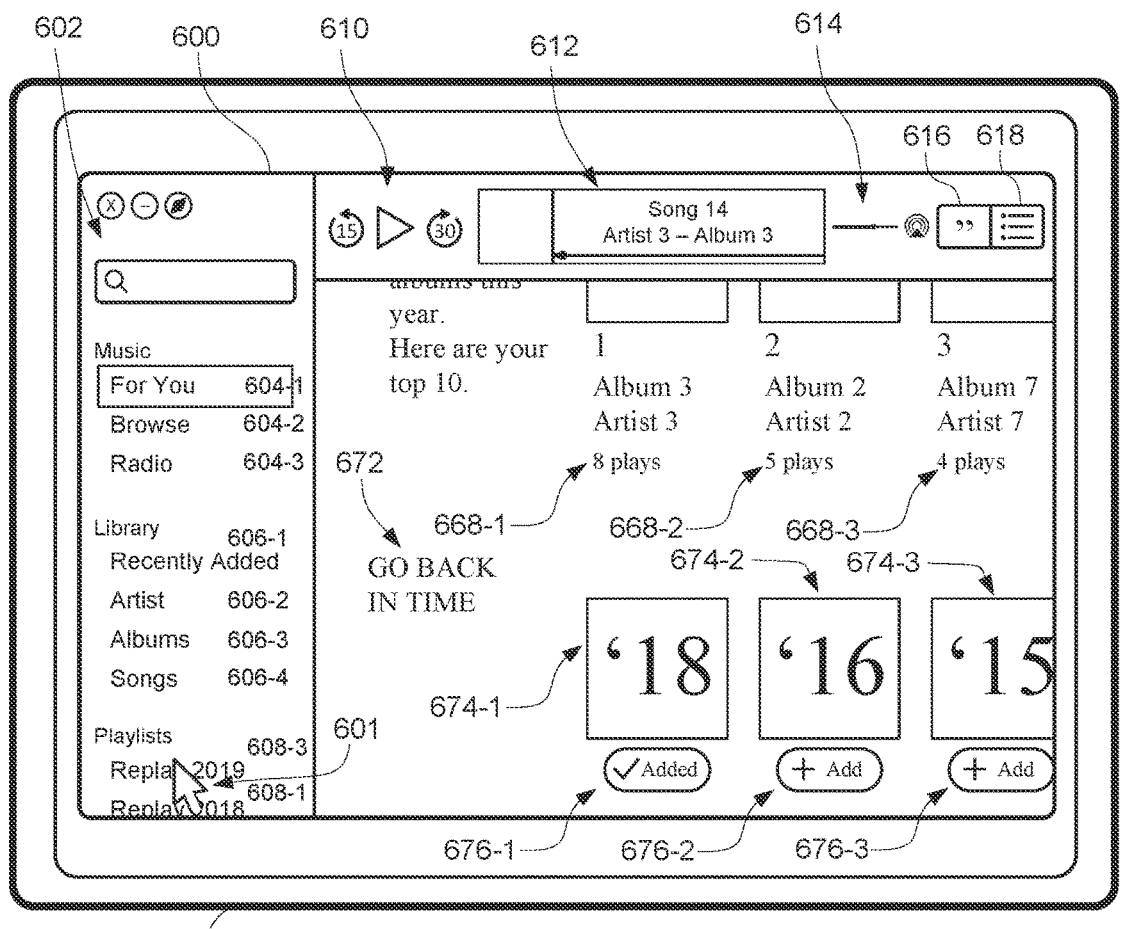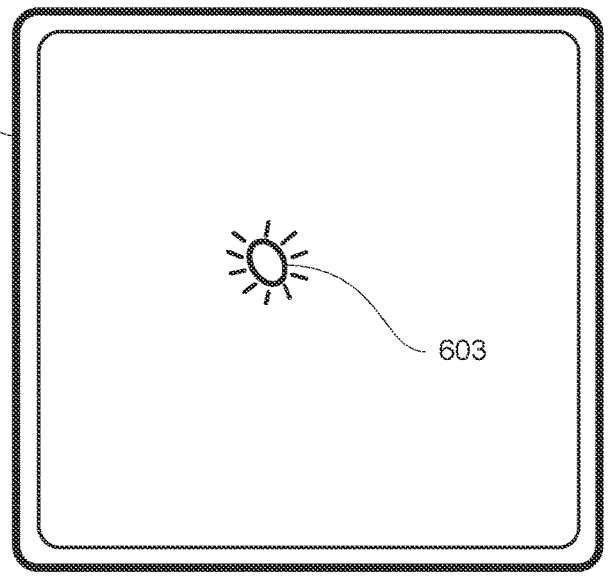
FIG. 6EE

Current Date: December 1, 2019

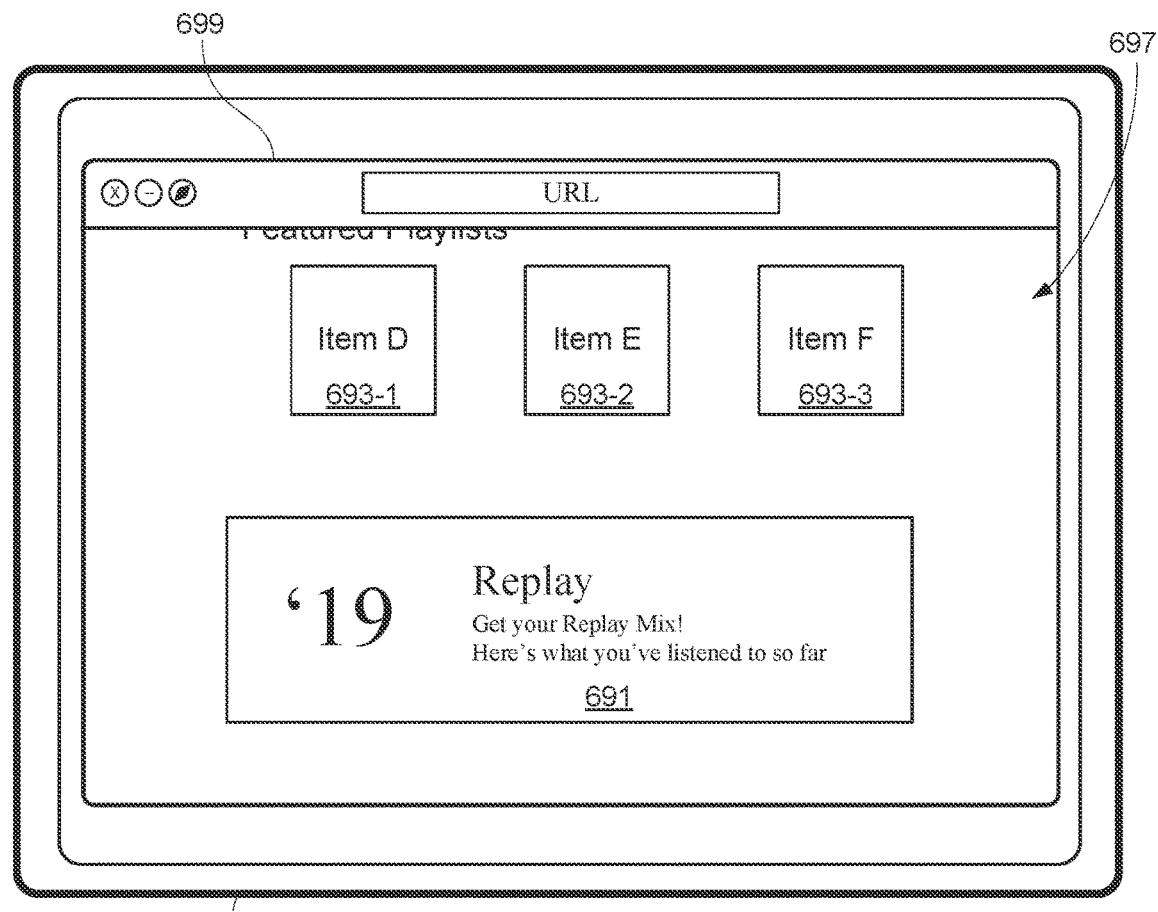
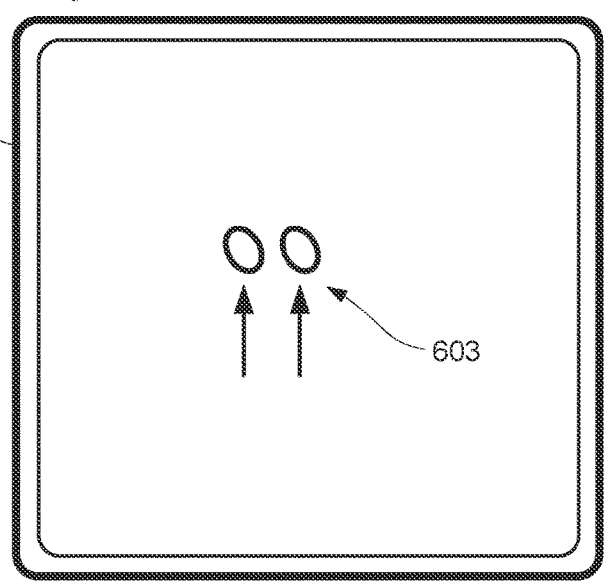
FIG. 6KK

USER INTERFACES FOR TIME PERIOD-BASED CURATED PLAYLISTS

CROSS-REFERENCE TO RELATED APPLICATIONS

This application claims benefit of U.S. Provisional Patent Application No. 62/933,879, filed Nov. 11, 2019, the contents of all of which are hereby incorporated by reference in its entirety for all purposes.

FIELD OF THE DISCLOSURE

This relates generally to user interfaces that enable a user to interact with a curated playlist on an electronic device.

BACKGROUND OF THE DISCLOSURE

User interaction with electronic devices has increased significantly in recent years. These devices can be devices such as computers, tablet computers, televisions, multimedia devices, mobile devices, and the like.

In some circumstances, such a device presents time period-based curated playlists in a music playback application. In some circumstances, time period-based curated playlists include items of content that are provided by a variety of sources. In some circumstances, an electronic device is able to provide time period-based curated playlists that are automatically generated using playback activity during relevant periods of time, thus enhancing the user's interactions with the device. Enhancing the user's interactions with the device improves the user's experience with the device and decreases user interaction time, which is particularly important where input devices are battery-operated.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

SUMMARY OF THE DISCLOSURE

Some embodiments described in this disclosure are directed to one or more electronic devices that provides time period-based curated playlists. The full descriptions of the embodiments are provided in the Drawings and the Detailed Description, and it is understood that the Summary provided above does not limit the scope of the disclosure in any way.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

FIG. 4 illustrates an exemplary user interface for a multifunction device with a touch-sensitive surface that is separate from the display in accordance with some embodiments of the disclosure.

FIGS. 7A-7K are flow diagrams illustrating a method of providing time period-based curated playlists in accordance with some embodiments of the disclosure.

DETAILED DESCRIPTION

Figure 1A:
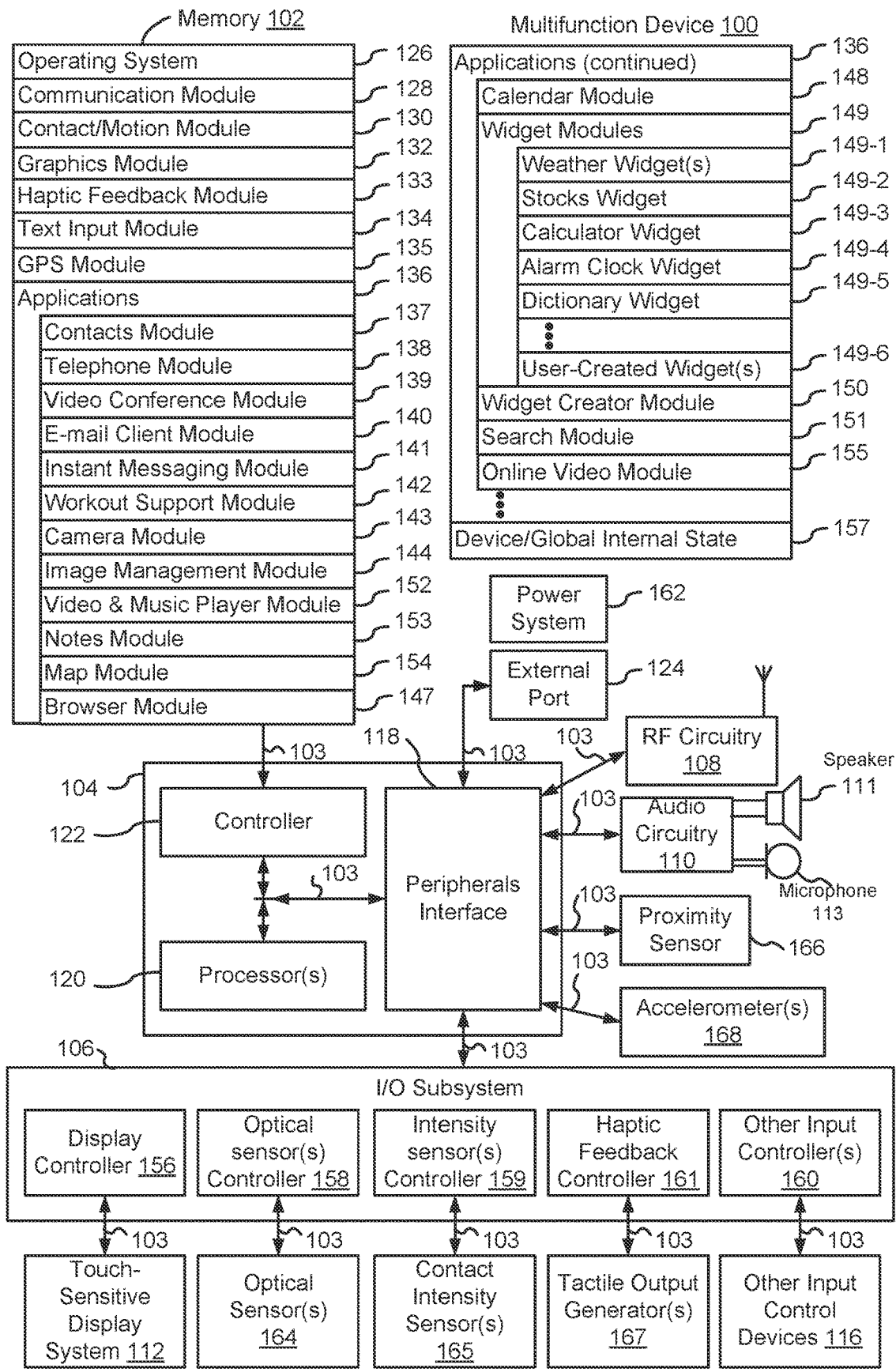
FIG. 1A is a block diagram illustrating a multifunction device with a touch-sensitive display in accordance with some embodiments of the disclosure.

In the following description of embodiments, reference is made to the accompanying drawings which form a part hereof, and in which it is shown by way of illustration specific embodiments that are optionally practiced. It is to be understood that other embodiments are optionally used and structural changes are optionally made without departing from the scope of the disclosed embodiments. Further, although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

EXEMPLARY DEVICES

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touch pads), are, optionally, used. It should also be understood that, in some embodiments, the device is not a portable communications device, but is a desktop computer or a television with a touch-sensitive surface (e.g., a touch screen display and/or a touch pad). In some embodiments, the device does not have a touch screen display and/or a touch pad, but rather is capable of outputting display information (such as the user interfaces of the disclosure) for display on a separate display device, and capable of receiving input information from a separate input device having one or more input mechanisms (such as one or more buttons, a touch screen display and/or a touch pad). In some embodiments, the device has a display, but is capable of receiving input information from a separate input device having one or more input mechanisms (such as one or more buttons, a touch screen display and/or a touch pad).

In the discussion that follows, an electronic device that includes a display and a touch-sensitive surface is described. It should be understood, however, that the electronic device optionally includes one or more other physical user-interface devices, such as a physical keyboard, a mouse and/or a joystick. Further, as described above, it should be understood that the described electronic device, display and touch-sensitive surface are optionally distributed amongst two or more devices. Therefore, as used in this disclosure, information displayed on the electronic device or by the electronic device is optionally used to describe information outputted by the electronic device for display on a separate display device (touch-sensitive or not). Similarly, as used in this disclosure, input received on the electronic device (e.g., touch input received on a touch-sensitive surface of the electronic device) is optionally used to describe input received on a separate input device, from which the electronic device receives input information.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, a television channel browsing application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable or non-portable devices with touch-sensitive displays, though the devices need not include touch-sensitive displays or displays in general, as described above. FIG. 1A is a block diagram illustrating portable or non-portable multifunction device 100 with touch-sensitive displays 112 in accordance with some embodiments. Touch-sensitive display 112 is sometimes called a "touch screen" for convenience, and is sometimes known as or called a touch-sensitive display system. Device 100 includes memory 102 (which optionally includes one or more computer readable storage mediums), memory controller 122, one or more processing units (CPU's) 120, peripherals interface 118, RF circuitry 108, audio circuitry 110, speaker 111, microphone 113, input/output (I/O) subsystem 106, other input or control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable or non-portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application specific integrated circuits. Further, the various components shown in FIG. 1A are optionally implemented across two or more devices; for example, a display and audio circuitry on a display device, a touch-sensitive surface on an input device, and remaining components on device 100. In such an embodiment, device 100 optionally communicates with the display device and/or the input device to facilitate operation of the system, as described in the disclosure, and the various components described herein that relate to display and/or input remain in device 100, or are optionally included in the display and/or input device, as appropriate.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data.

In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSDPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161 and one or more input controllers 160 for other input or control devices. The one or more input controllers 160 receive/send electrical signals from/to other input or control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, infrared port, USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. As described above, the touch-sensitive operation and the display operation of touch-sensitive display 112 are optionally separated from each other, such that a display device is used for display purposes and a touch-sensitive surface (whether display or not) is used for input detection purposes, and the described components and functions are modified accordingly. However, for simplicity, the following description is provided with reference to a touch-sensitive display. Display controller 156 receives and/or sends electrical signals from/ to touch screen 112. Touch screen 112 displays visual output to the user. The visual output optionally includes graphics, text, icons, video, and any combination thereof (collectively termed "graphics"). In some embodiments, some or all of the visual output corresponds to user-interface objects.

Touch screen 112 has a touch-sensitive surface, sensor or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone®, iPod Touch®, and iPad® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable or non-portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112 which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112 which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
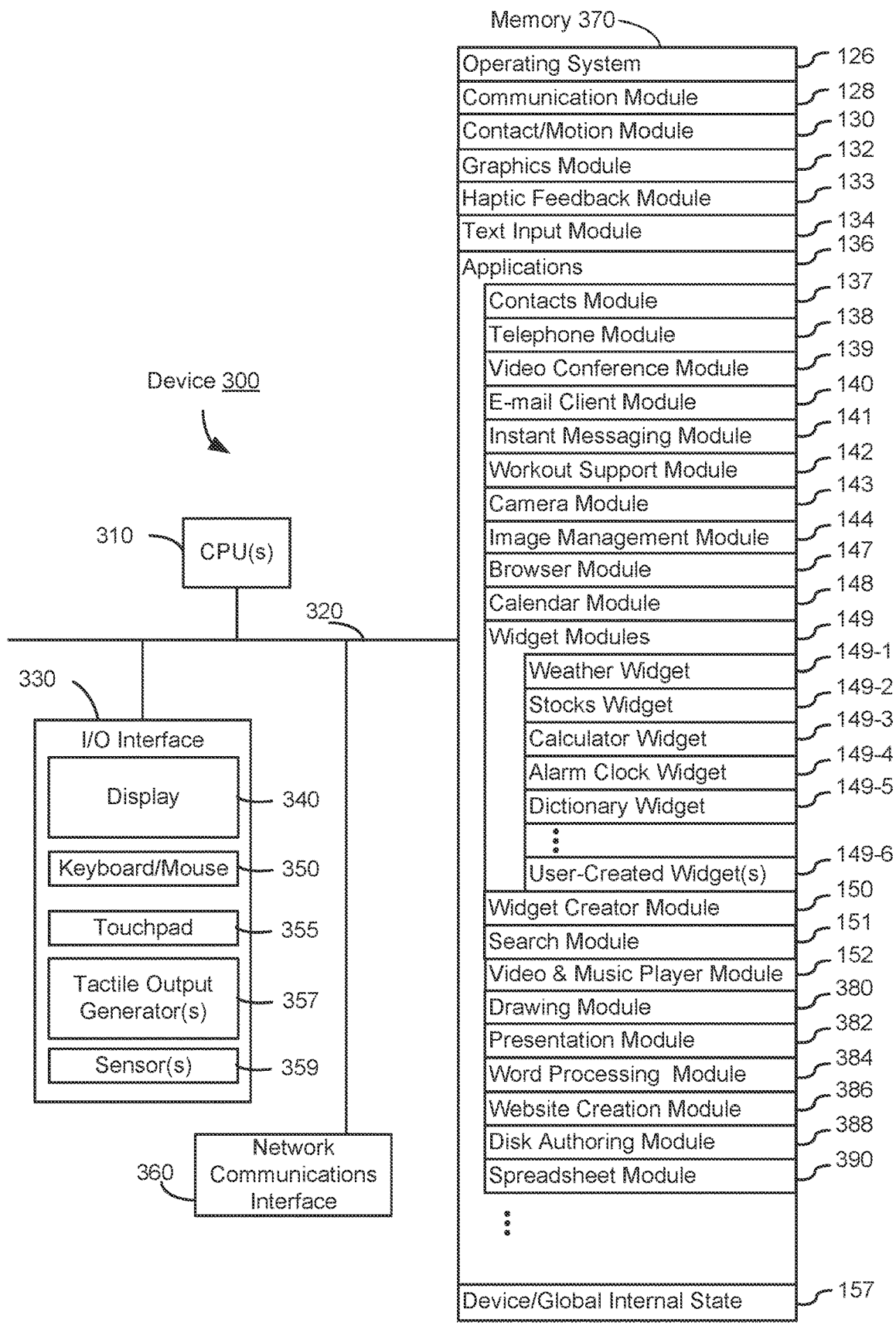
FIG. 3 is a block diagram of an exemplary multifunction device with a display and a touch-sensitive surface in accordance with some embodiments of the disclosure.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with the 30-pin connector used on iPod (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact) determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast or other visual property) of graphics that are displayed. As used herein, the term "graphics" includes any object that can be displayed to a user, including without limitation text, web pages, icons (such as user-interface objects including soft keys), digital images, videos, animations and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing, to camera 143 as picture/video metadata, and to applications that provide location-based services such as weather widgets, local yellow page widgets, and map/navigation widgets).

Applications 136 optionally include the following modules (or sets of instructions), or a subset or superset thereof:
  contacts module 137 (sometimes called an address book or contact list);
  telephone module 138;
  video conferencing module 139;
  e-mail client module 140;
  instant messaging (IM) module 141;
  workout support module 142;
  camera module 143 for still and/or video images;
  image management module 144;
  video player module;
  music player module;
  browser module 147;
  calendar module 148;
  widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
  widget creator module 150 for making user-created widgets 149-6;
  search module 151;
  video and music player module 152, which merges video player module and music player module;
  notes module 153;
  map module 154; and/or
  online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
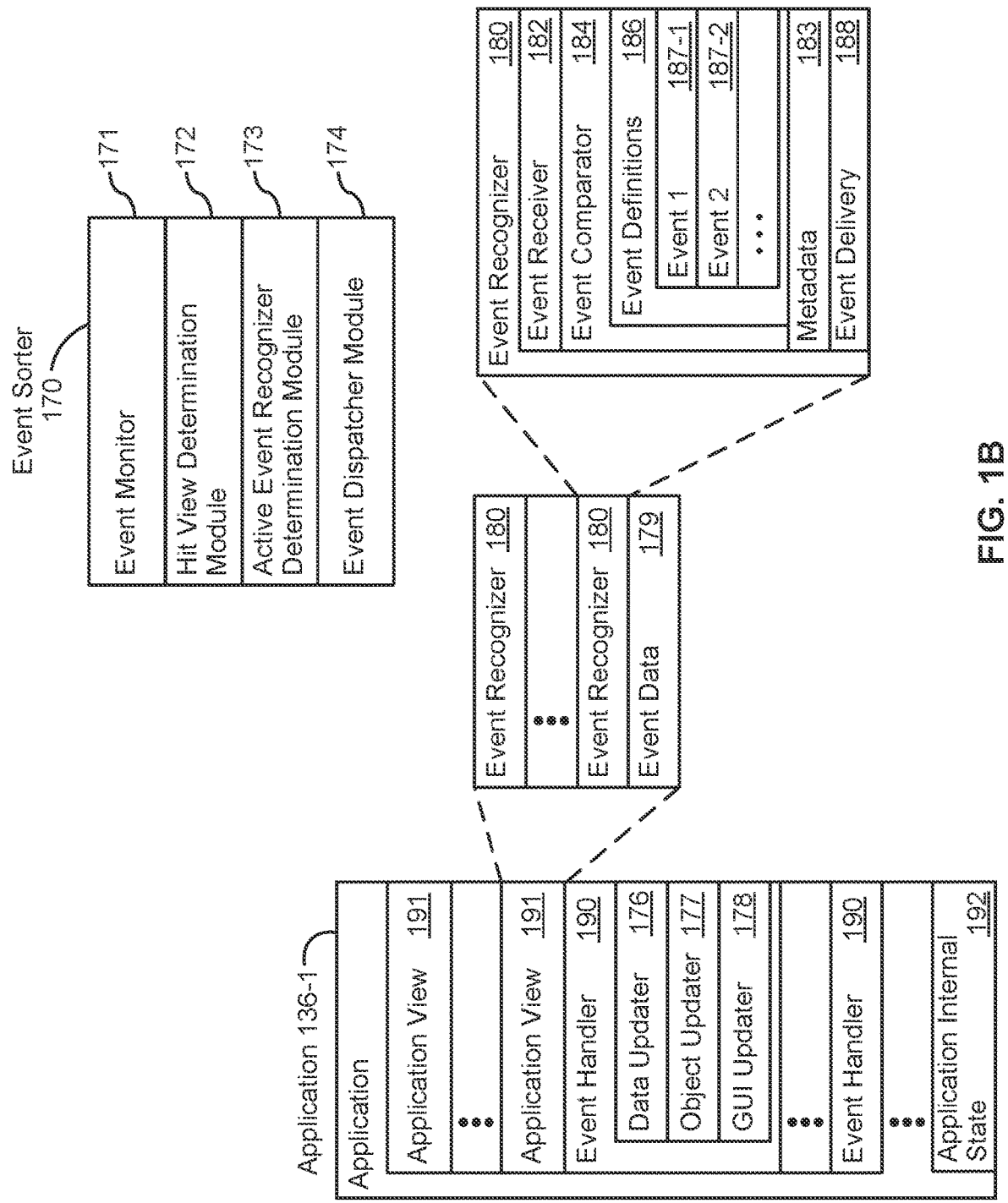
FIG. 1B is a block diagram illustrating exemplary components for event handling in accordance with some embodiments of the disclosure.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
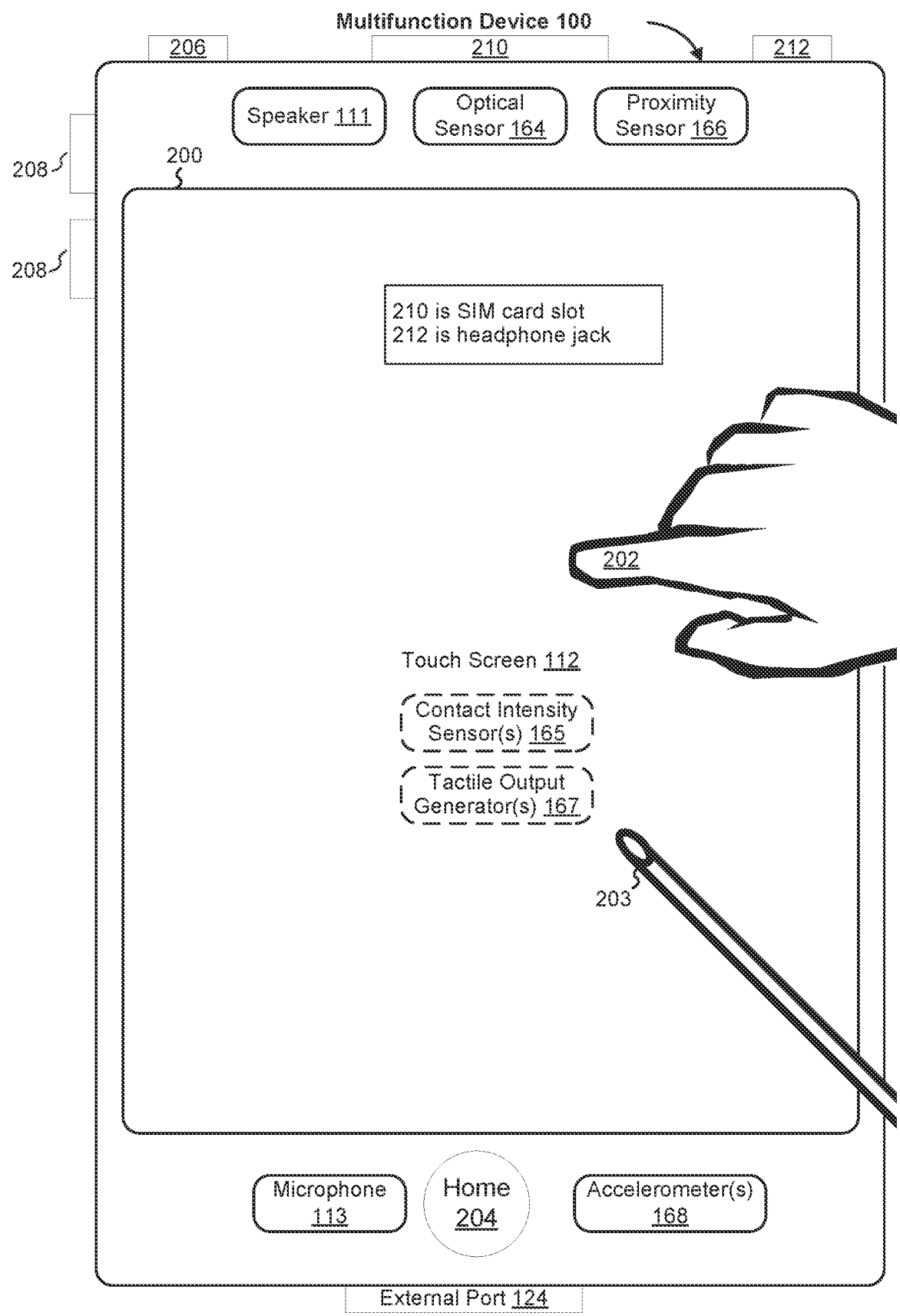
FIG. 2 illustrates a multifunction device having a touch screen in accordance with some embodiments of the disclosure.

FIG. 2 illustrates a portable or non-portable multifunction device 100 having a touch screen 112 in accordance with some embodiments. As stated above, multifunction device 100 is described as having the various illustrated structures (such as touch screen 112, speaker 111, accelerometer 168, microphone 113, etc.); however, it is understood that these structures optionally reside on separate devices. For example, display-related structures (e.g., display, speaker, etc.) and/or functions optionally reside on a separate display device, input-related structures (e.g., touch-sensitive surface, microphone, accelerometer, etc.) and/or functions optionally reside on a separate input device, and remaining structures and/or functions optionally reside on multifunction device 100.

The touch screen 112 optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward) and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also includes one or more physical buttons, such as "home" or menu button 204. As previously described, menu button 204 is, optionally, used to navigate to any application 136 in a set of applications that are, optionally, executed on device 100. Alternatively, in some embodiments, the menu button is implemented as a soft key in a GUI displayed on touch screen 112.

In one embodiment, device 100 includes touch screen 112, menu button 204, push button 206 for powering the device on/off and locking the device, volume adjustment button(s) 208, Subscriber Identity Module (SIM) card slot 210, head set jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not include the display and the touch-sensitive surface, as described above, but rather, in some embodiments, optionally communicates with the display and the touch-sensitive surface on other devices. Additionally, device 300 need not be portable. In some embodiments, device 300 is a laptop computer, a desktop computer, a tablet computer, a multimedia player device (such as a television or a set-top box), a navigation device, an educational device (such as a child's learning toy), a gaming system, or a control device (e.g., a home or industrial controller). Device 300 typically includes one or more processing units (CPU's) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable or non-portable multifunction device 100 (FIG. 1A), or a subset thereof. Furthermore, memory 370 optionally stores additional programs, modules, and data structures not present in memory 102 of portable or non-portable multifunction device 100. For example, memory 370 of device 300 optionally stores drawing module 380, presentation module 382, word processing module 384, website creation module 386, disk authoring module 388, and/or spreadsheet module 390, while memory 102 of portable or non-portable multifunction device 100 (FIG. 1A) optionally does not store these modules.

Each of the above identified elements in FIG. 3 are, optionally, stored in one or more of the previously mentioned memory devices. Each of the above identified modules corresponds to a set of instructions for performing a function described above. The above identified modules or programs (e.g., sets of instructions) need not be implemented as separate software programs, procedures or modules, and thus various subsets of these modules are, optionally, combined or otherwise re-arranged in various embodiments. In some embodiments, memory 370 optionally stores a subset of the modules and data structures identified above. Furthermore, memory 370 optionally stores additional modules and data structures not described above.

FIG. 4 illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 357) for detecting intensity of contacts on touch-sensitive surface 451 and/or one or more tactile output generators 359 for generating tactile outputs for a user of device 300.

Although some of the examples that follow will be given with reference to inputs on touch screen display 112 (where the touch sensitive surface and the display are combined), in some embodiments, the device detects inputs on a touch-sensitive surface that is separate from the display, as shown in FIG. 4. In some embodiments the touch sensitive surface (e.g., 451 in FIG. 4) has a primary axis (e.g., 452 in FIG. 4) that corresponds to a primary axis (e.g., 453 in FIG. 4) on the display (e.g., 450). In accordance with these embodiments, the device detects contacts (e.g., 460 and 462 in FIG. 4) with the touch-sensitive surface 451 at locations that correspond to respective locations on the display (e.g., in FIG. 4, 460 corresponds to 468 and 462 corresponds to 470). In this way, user inputs (e.g., contacts 460 and 462, and movements thereof) detected by the device on the touch-sensitive surface (e.g., 451 in FIG. 4) are used by the device to manipulate the user interface on the display (e.g., 450 in FIG. 4) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

As used herein, the term "focus selector" refers to an input element that indicates a current part of a user interface with which a user is interacting. In some implementations that include a cursor or other location marker, the cursor acts as a "focus selector," so that when an input (e.g., a press input) is detected on a touch-sensitive surface (e.g., touchpad 355 in FIG. 3 or touch-sensitive surface 451 in FIG. 4) while the cursor is over a particular user interface element (e.g., a button, window, slider or other user interface element), the particular user interface element is adjusted in accordance with the detected input. In some implementations that include a touch-screen display (e.g., touch-sensitive display system 112 in FIG. 1A) that enables direct interaction with user interface elements on the touch-screen display, a detected contact on the touch-screen acts as a "focus selector," so that when an input (e.g., a press input by the contact) is detected on the touch-screen display at a location of a particular user interface element (e.g., a button, window, slider or other user interface element), the particular user interface element is adjusted in accordance with the detected input. In some implementations focus is moved from one region of a user interface to another region of the user interface without corresponding movement of a cursor or movement of a contact on a touch-screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch-screen display) that is controlled by the user so as to communicate the user's intended interaction with the user interface (e.g., by indicating, to the device, the element of the user interface with which the user is intending to interact). For example, the location of a focus selector (e.g., a cursor, a contact or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90% or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the description of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Figure 5A:
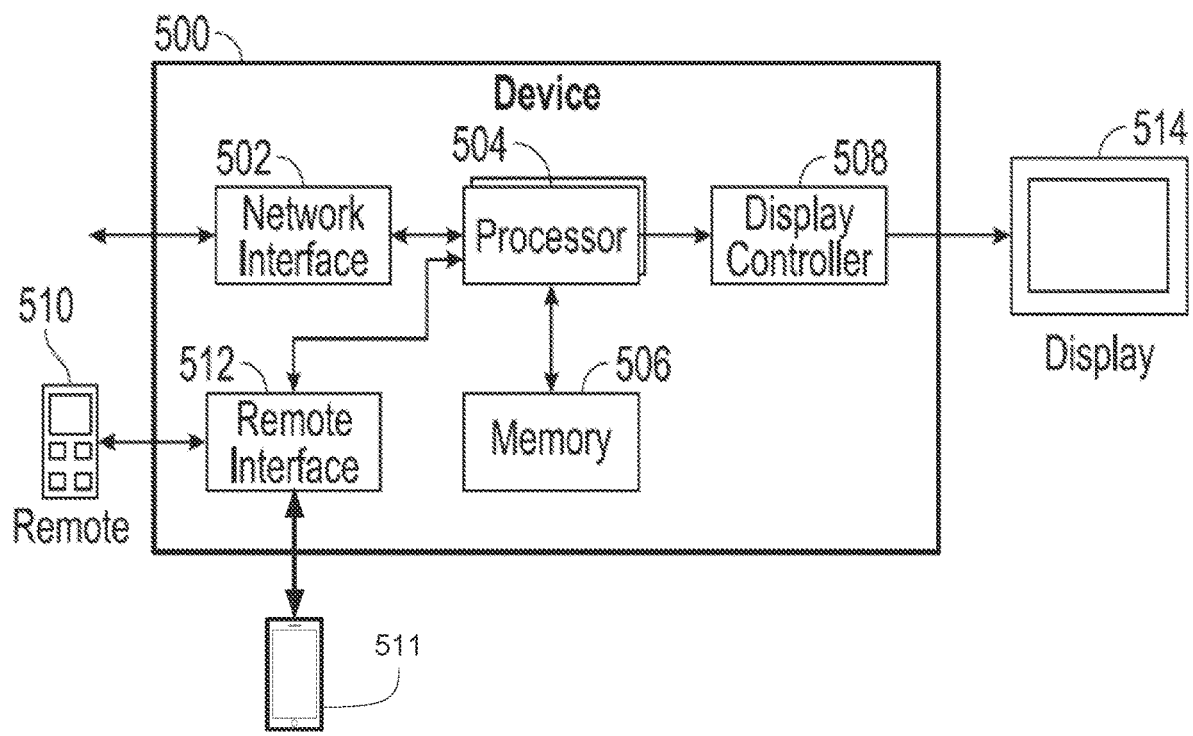
FIGS. 5A-5C illustrate block diagrams of exemplary architectures for devices according to some embodiments of the disclosure.

FIG. 5A illustrates a block diagram of an exemplary architecture for the device 500 according to some embodiments of the disclosure. In the embodiment of FIG. 5A, media or other content is optionally received by device 500 via network interface 502, which is optionally a wireless or wired connection. The one or more processors 504 optionally execute any number of programs stored in memory 506 or storage, which optionally includes instructions to perform one or more of the methods and/or processes described herein (e.g., method 700).

In some embodiments, display controller 508 causes the various user interfaces of the disclosure to be displayed on display 514. Further, input to device 500 is optionally provided by remote 510 via remote interface 512, which is optionally a wireless or a wired connection. In some embodiments, input to device 500 is provided by a multifunction device 511 (e.g., a smartphone) on which a remote control application is running that configures the multifunction device to simulate remote control functionality, as will be described in more detail below. In some embodiments, multifunction device 511 corresponds to one or more of device 100 in FIGS. 1A and 2, and device 300 in FIG. 3. It is understood that the embodiment of FIG. 5A is not meant to limit the features of the device of the disclosure, and that other components to facilitate other features described in the disclosure are optionally included in the architecture of FIG. 5A as well. In some embodiments, device 500 optionally corresponds to one or more of multifunction device 100 in FIGS. 1A and 2 and device 300 in FIG. 3; network interface 502 optionally corresponds to one or more of RF circuitry 108, external port 124, and peripherals interface 118 in FIGS. 1A and 2, and network communications interface 360 in FIG. 3; processor 504 optionally corresponds to one or more of processor(s) 120 in FIG. 1A and CPU(s) 310 in FIG. 3; display controller 508 optionally corresponds to one or more of display controller 156 in FIG. 1A and I/O interface 330 in FIG. 3; memory 506 optionally corresponds to one or more of memory 102 in FIG. 1A and memory 370 in FIG. 3; remote interface 512 optionally corresponds to one or more of peripherals interface 118, and I/O subsystem 106 (and/or its components) in FIG. 1A, and I/O interface 330 in FIG. 3; remote 512 optionally corresponds to and/or includes one or more of speaker 111, touch-sensitive display system 112, microphone 113, optical sensor(s) 164, contact intensity sensor(s) 165, tactile output generator(s) 167, other input control devices 116, accelerometer(s) 168, proximity sensor 166, and I/O subsystem 106 in FIG. 1A, and keyboard/mouse 350, touchpad 355, tactile output generator(s) 357, and contact intensity sensor(s) 359 in FIG. 3, and touch-sensitive surface 451 in FIG. 4; and, display 514 optionally corresponds to one or more of touch-sensitive display system 112 in FIGS. 1A and 2, and display 340 in FIG. 3.

Figure 5B:
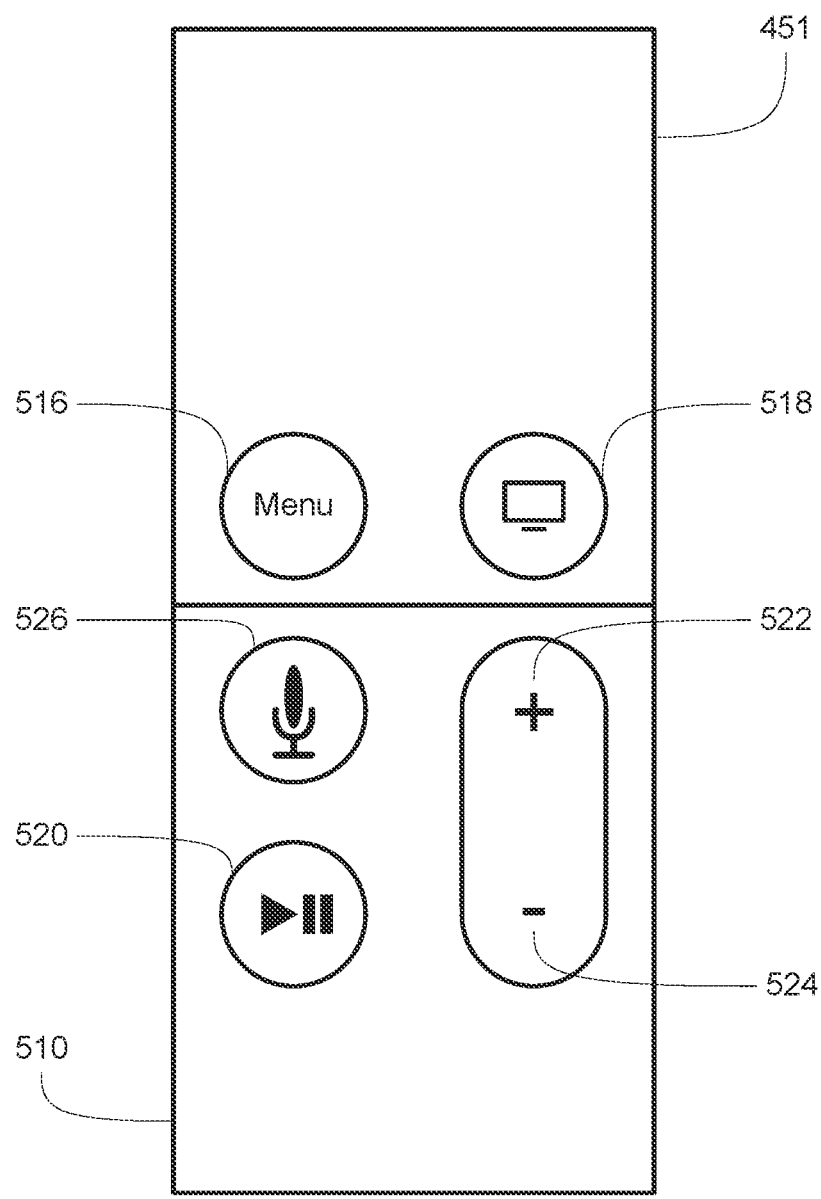

FIG. 5B illustrates an exemplary structure for remote 510 according to some embodiments of the disclosure. In some embodiments, remote 510 optionally corresponds to one or more of multifunction device 100 in FIGS. 1A and 2 and device 300 in FIG. 3. Remote 510 optionally includes touch-sensitive surface 451. In some embodiments, touch-sensitive surface 451 is edge-to-edge (e.g., it extends to the edges of remote 510, such that little or no surface of remote 510 exists between the touch-sensitive surface 451 and one or more edges of remote 510, as illustrated in FIG. 5B). Touch-sensitive surface 451 is optionally able to sense contacts as well as contact intensities (e.g., clicks of touch-sensitive surface 451), as previously described in this disclosure. Further, touch-sensitive surface 451 optionally includes a mechanical actuator for providing physical button click functionality (e.g., touch-sensitive surface 451 is "clickable" to provide corresponding input to device 500). Remote 510 also optionally includes buttons 516, 518, 520, 522, 524 and 526. Buttons 516, 518, 520, 522, 524 and 526 are optionally mechanical buttons or mechanical button alternatives that are able to sense contact with, or depression of, such buttons to initiate corresponding action(s) on, for example, device 500. In some embodiments, selection of "menu" button 516 by a user navigates device 500 backwards in a currently-executing application or currently-displayed user interface (e.g., back to a user interface that was displayed previous to the currently-displayed user interface), or navigates device 500 to a one-higher-level user interface than the currently-displayed user interface. In some embodiments, selection of "home" button 518 by a user navigates device 500 to a main, home, or root user interface from any user interface that is displayed on device 500 (e.g., to a home screen of device 500 that optionally includes one or more applications accessible on device 500). In some embodiments, selection of the "home" button 518 causes the electronic device to navigate to a unified media browsing application. In some embodiments, selection of "play/pause" button 520 by a user toggles between playing and pausing a currently-playing content item on device 500 (e.g., if a content item is playing on device 500 when "play/pause" button 520 is selected, the content item is optionally paused, and if a content item is paused on device 500 when "play/pause" button 520 is selected, the content item is optionally played). In some embodiments, selection of "+" 522 or "−" 524 buttons by a user increases or decreases, respectively, the volume of audio reproduced by device 500 (e.g., the volume of a content item currently-playing on device 500). In some embodiments, selection of "audio input" button 526 by a user allows the user to provide audio input (e.g., voice input) to device 500, optionally, to a voice assistant on the device. In some embodiments, remote 510 includes a microphone via which the user provides audio input to device 500 upon selection of "audio input" button 526. In some embodiments, remote 510 includes one or more accelerometers for detecting information about the motion of the remote.

Figure 5C:
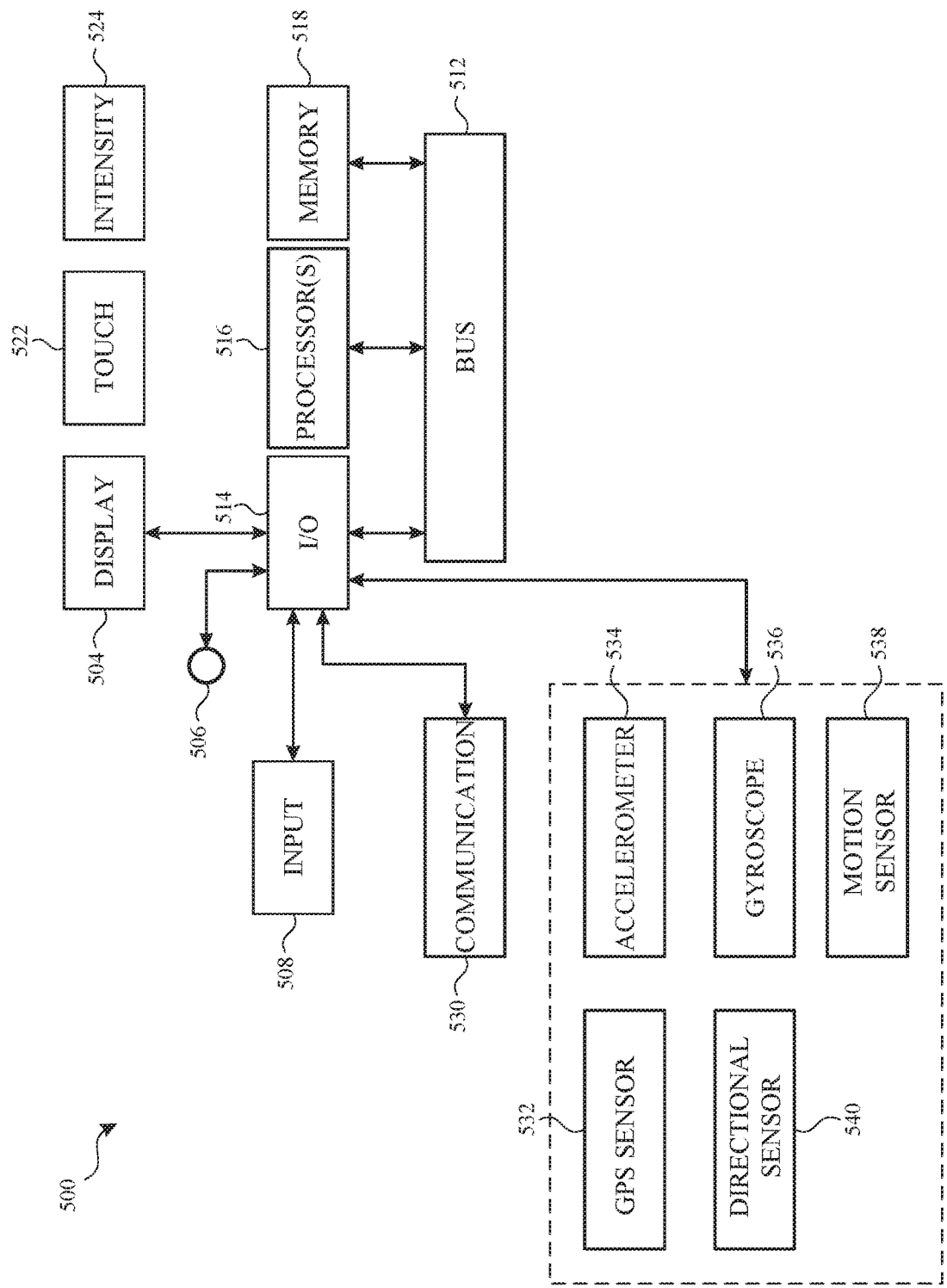

FIG. 5C depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes described with reference to FIGS. 6-7. A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5C, but can include other or additional components in multiple configurations.

As used here, the term "affordance" refers to a user-interactive graphical user interface object that is, optionally, displayed on the display screen of devices 100, 300, 500 and/or 511 (FIGS. 1A, 3, and 5A-5C). For example, an image (e.g., icon), a button, and text (e.g., hyperlink) each optionally constitute an affordance.

As used herein, "installed application" refers to a software application that has been downloaded onto an electronic device (e.g., devices 100, 300, 500, and/or 511) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:

an active application, which is currently displayed on a display screen of the device that the application is being used on;

a background application (or background processes), which is not currently displayed, but one or more processes for the application are being processed by one or more processors; and a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

One or more of the embodiments disclosed herein optionally include one or more of the features disclosed in the following patent applications: "User Interfaces For Interacting with Channels that Provide Content that Plays in a Media Browsing Application" (Attorney Docket No.: 106843171600 (P42089USP1), filed Mar. 24, 2019), "User Interfaces Including Selectable Representations of Content Items" (Attorney Docket No.: 106843171800 (P42091USP1), filed Mar. 24, 2019), and "User Interface Specific to Respective Content Items" (Attorney Docket No.: 106843171900 (P42092USP1), filed Mar. 24, 2019), each of which is hereby incorporated by reference.

Attention is now directed towards embodiments of user interfaces ("UI") and associated processes that are implemented on an electronic device, such as portable multifunction device 100, device 300, device 500, or device 511.

USER INTERFACES AND ASSOCIATED PROCESSES

Time Period-Based Curated Playlists

Users interact with electronic devices in many different manners, including using an electronic device to find, browse, and play back music in a music playback application. The embodiments described below provide ways in which an electronic device provides time period-based curated music playlists, thus enhancing the user's interactions with the electronic device. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

Figure 6A:
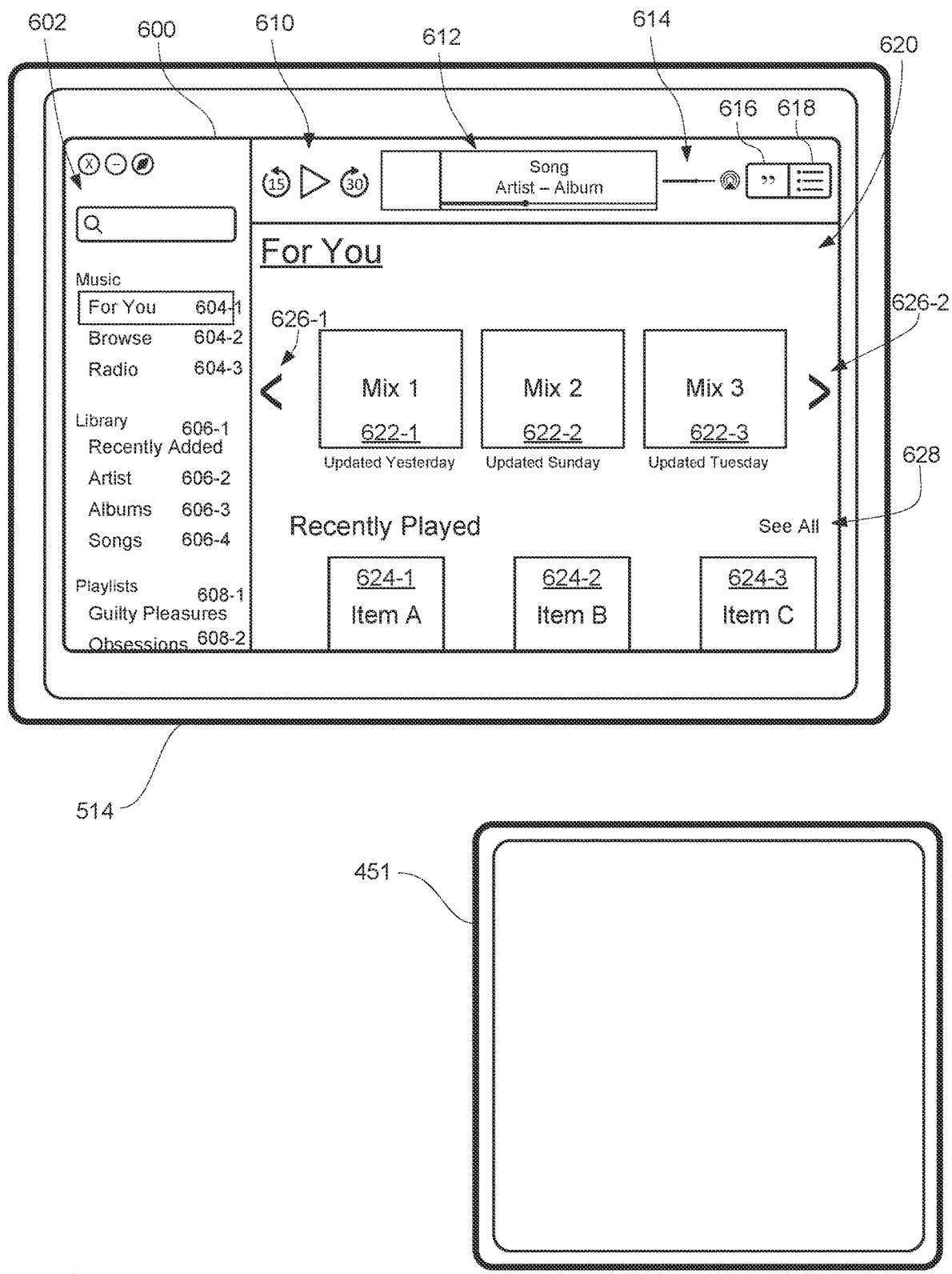
FIGS. 6A-6QQ illustrate exemplary ways in which an electronic device provides time period-based curated playlists in accordance with some embodiments of the disclosure.
Figure 6G:
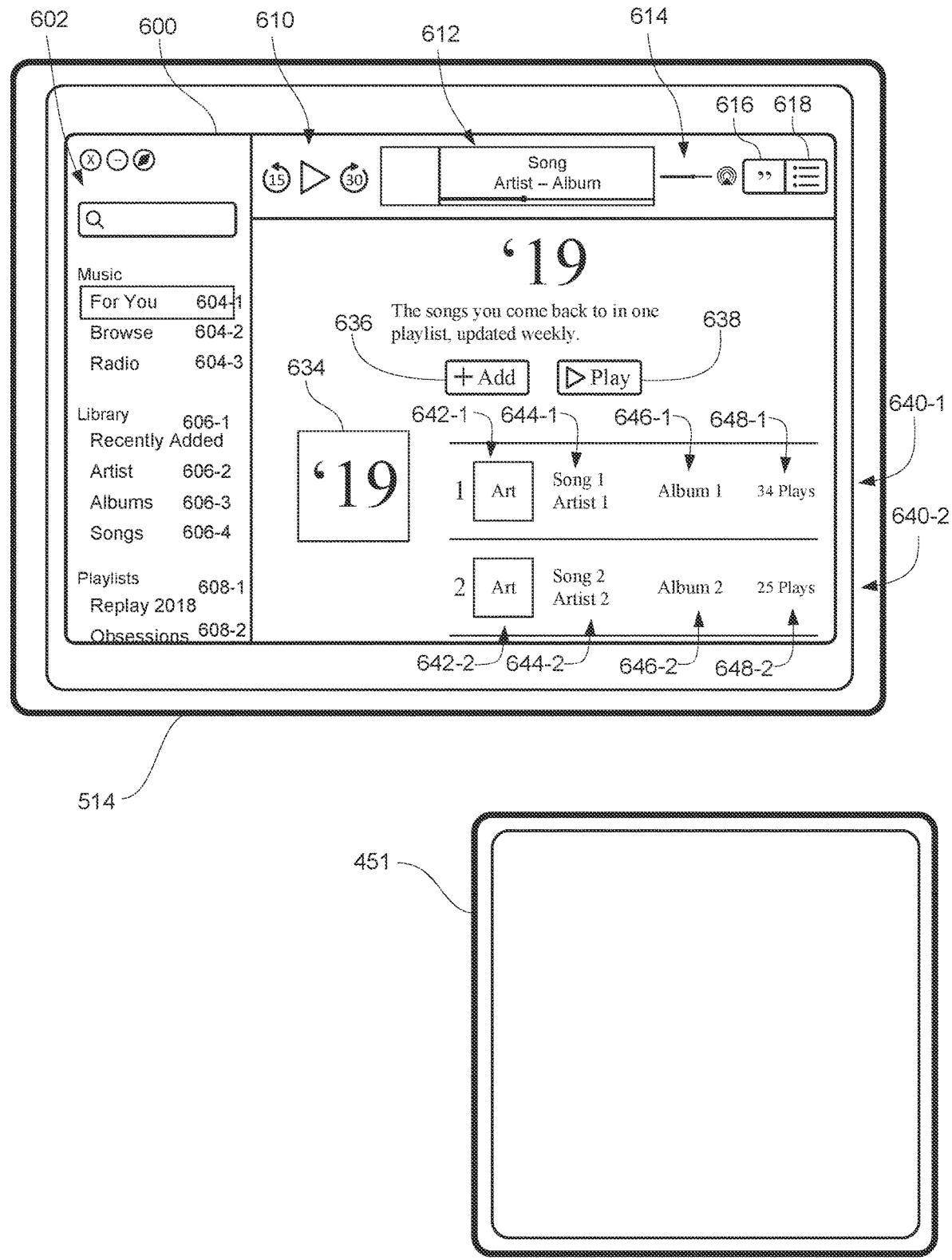
Figure 6H:
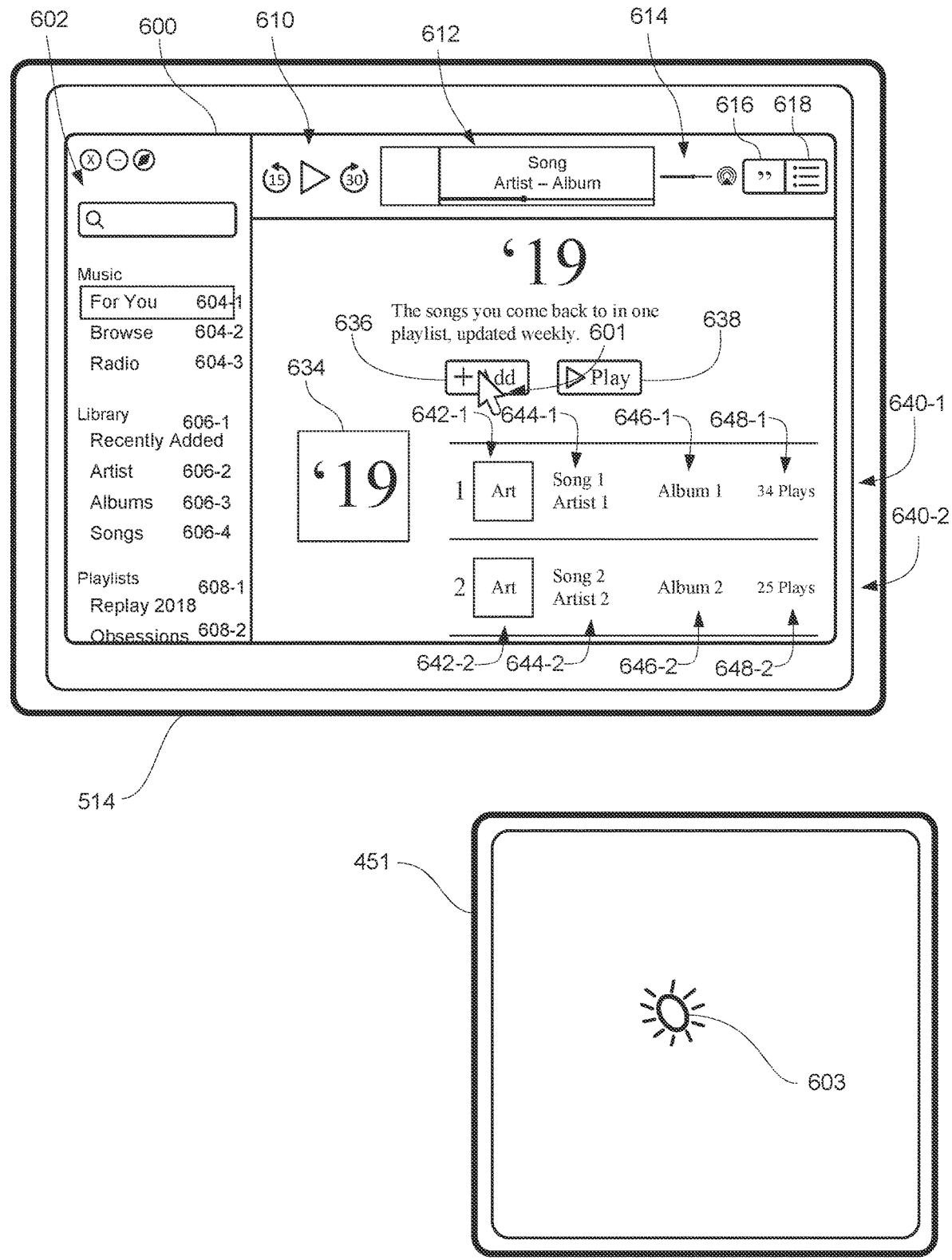
Figure 6I:
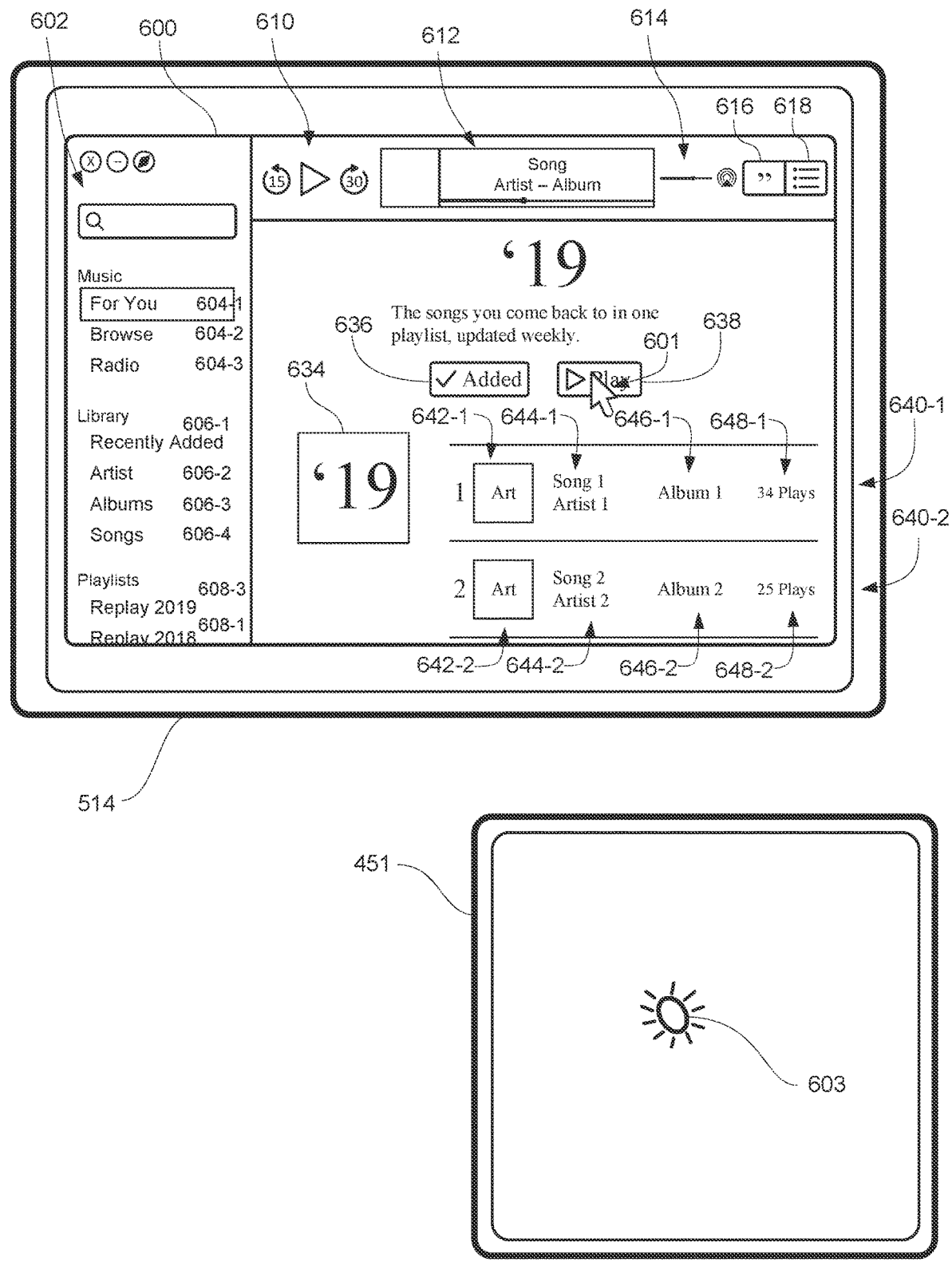
Figure 6J:
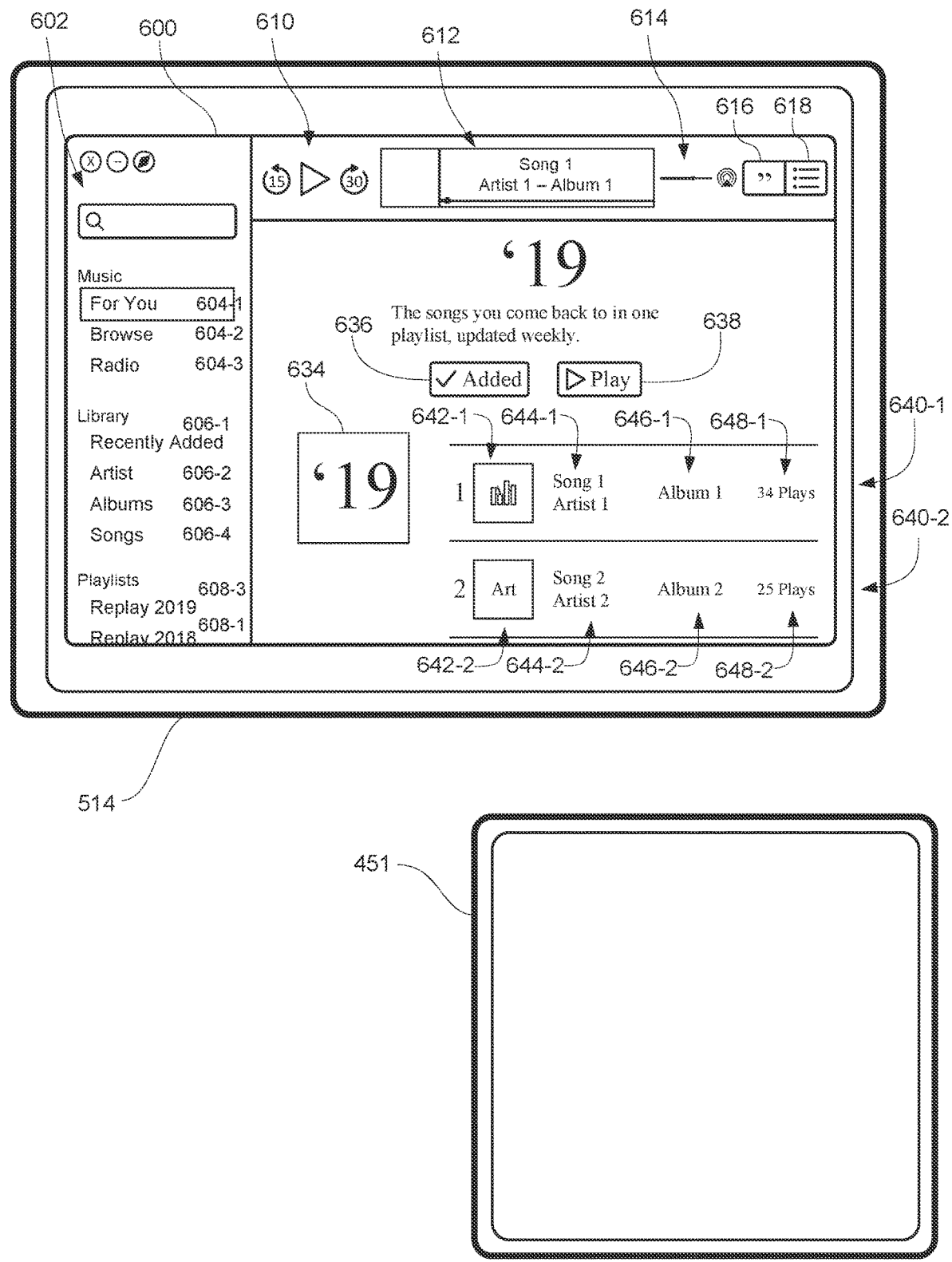
Figure 6K:
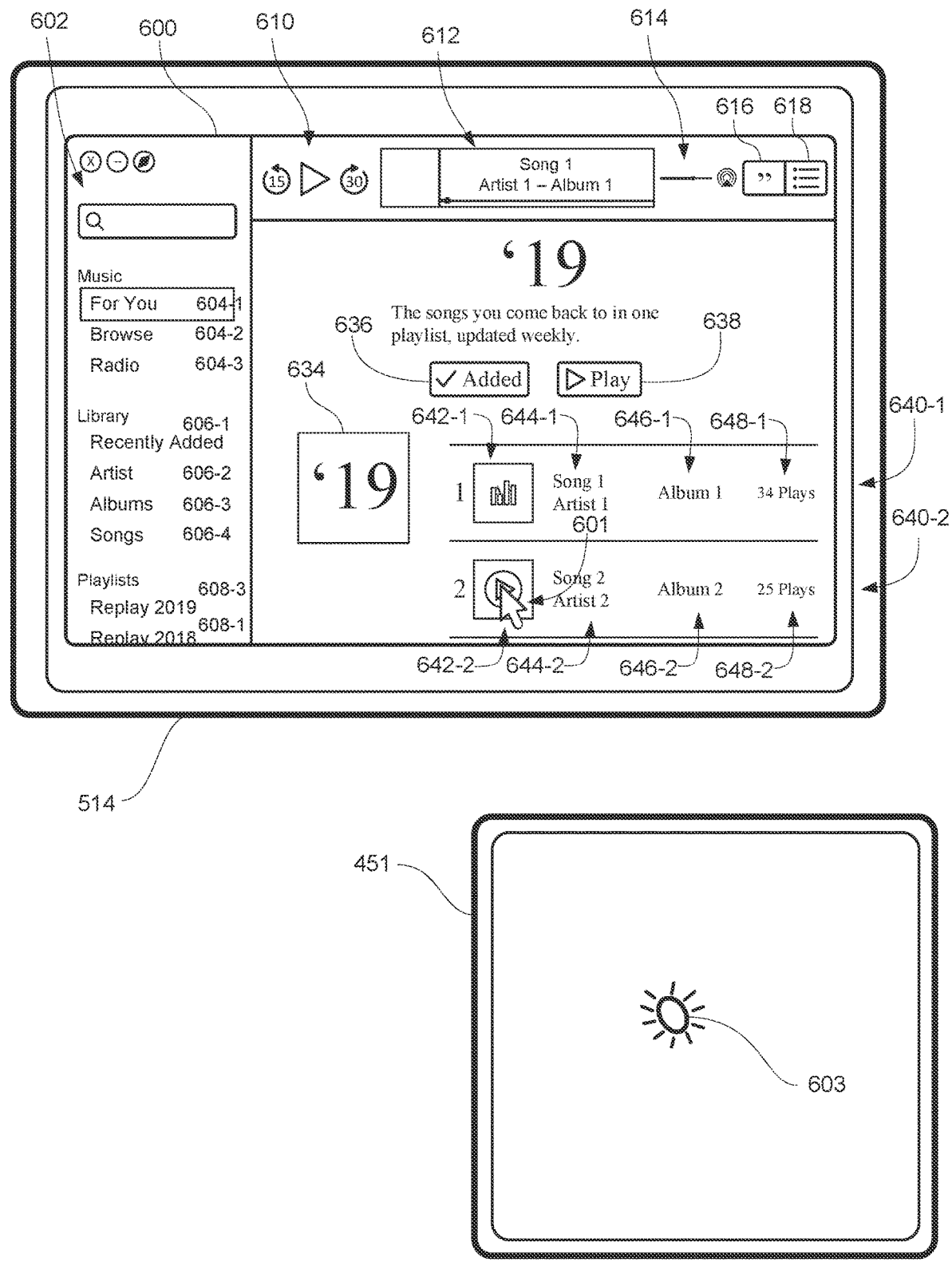
Figure 6L:
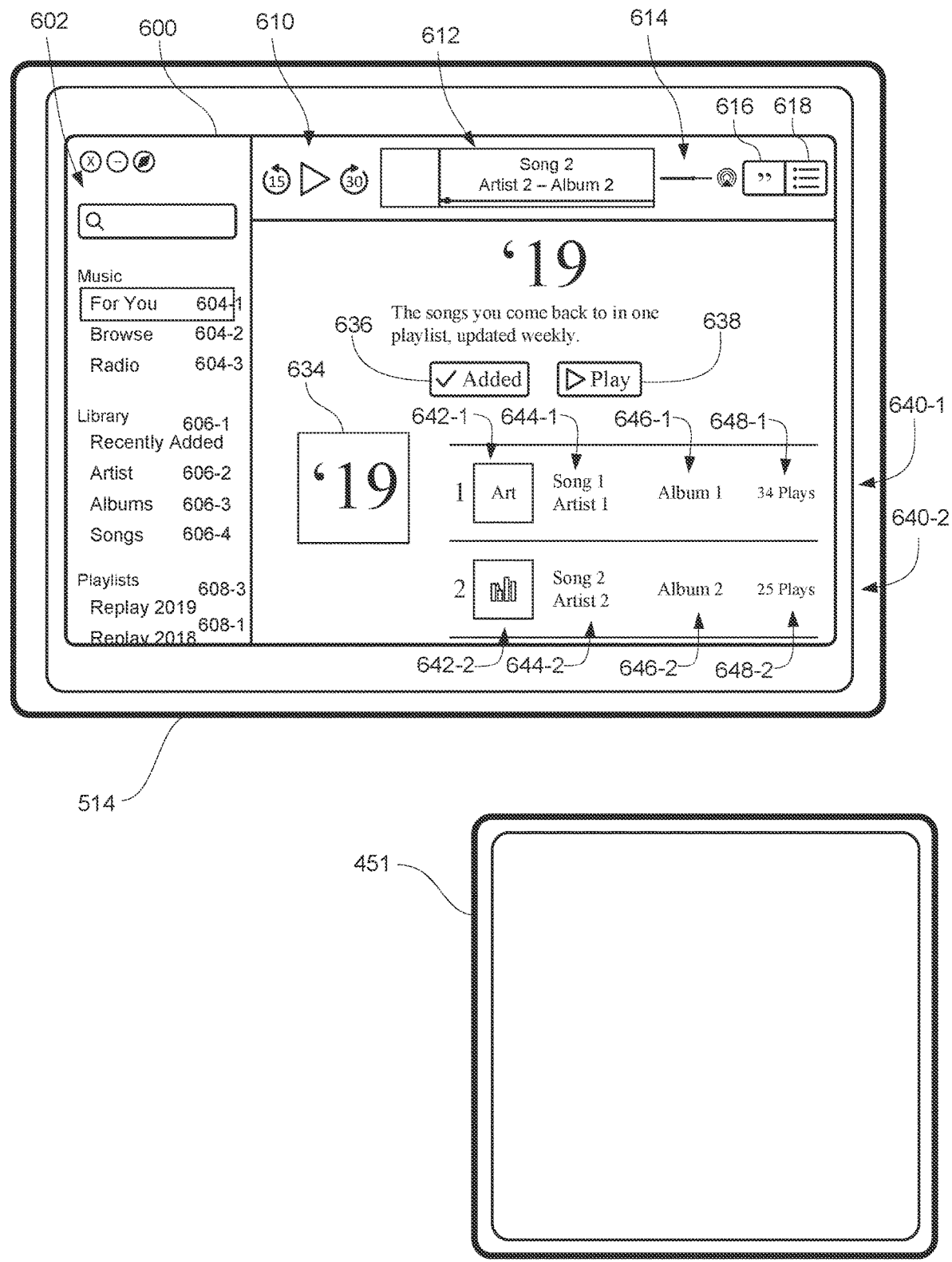
Figure 6M:
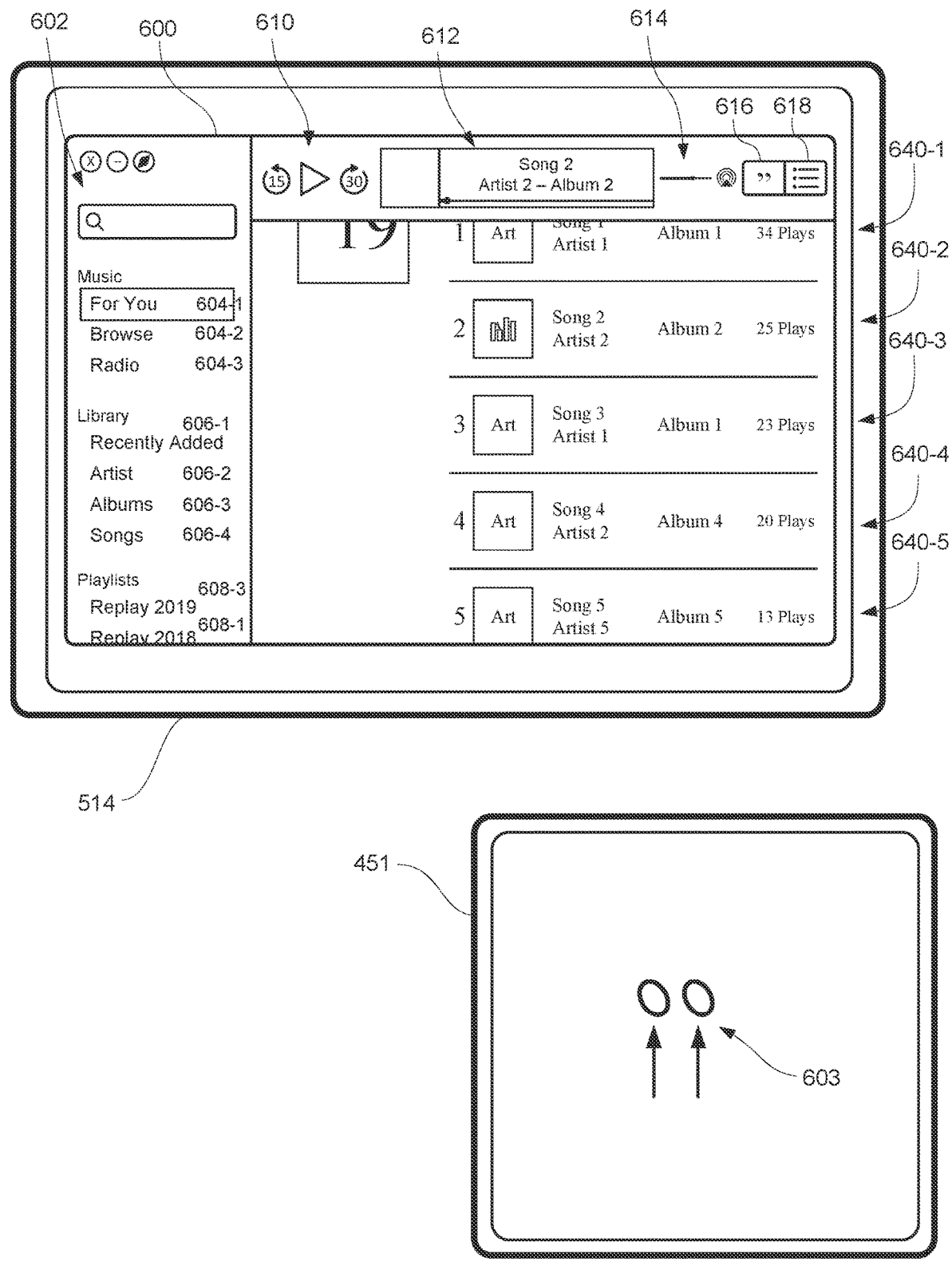
Figure 6N:
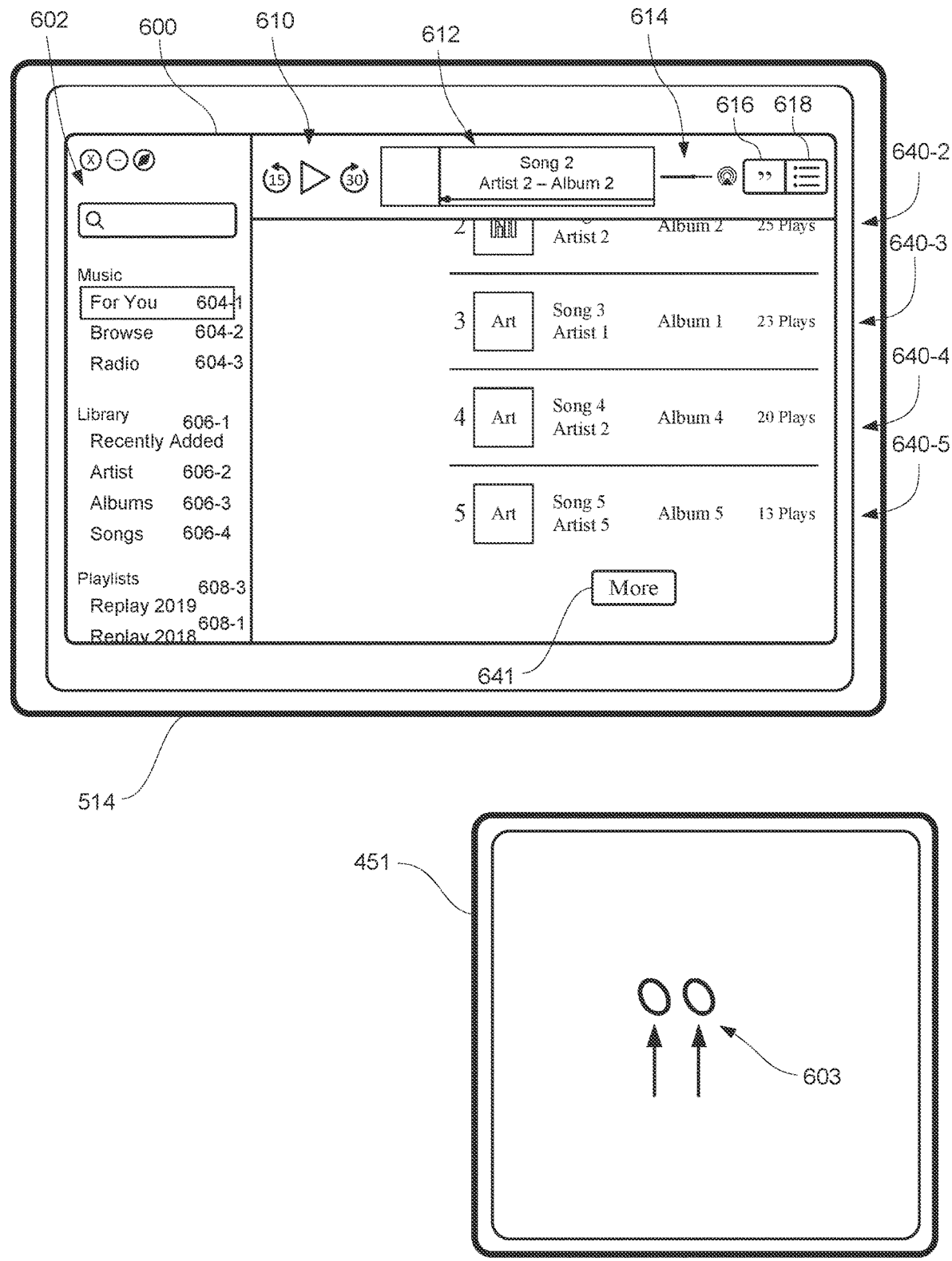
Figure 6O:
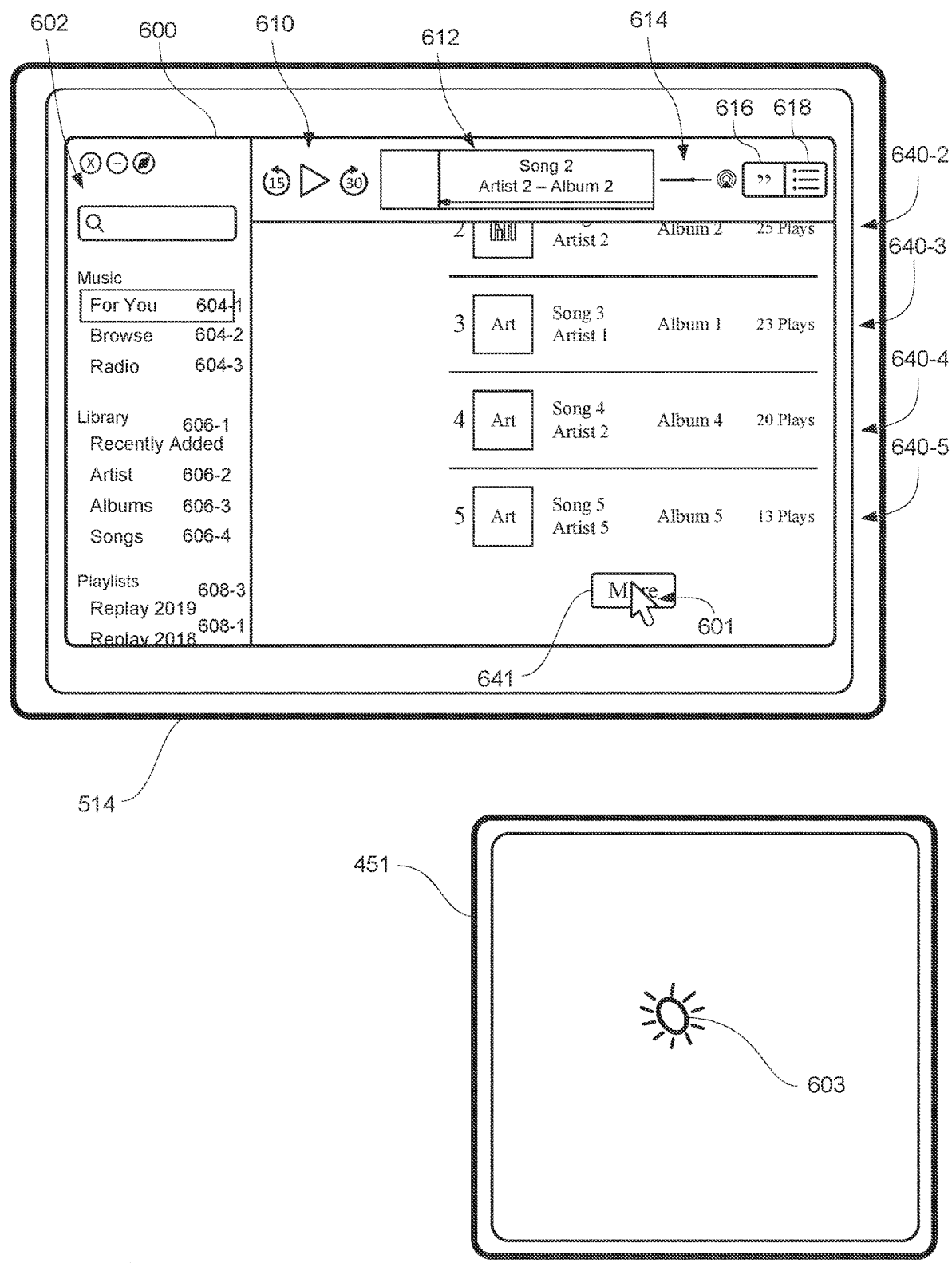
Figure 6P:
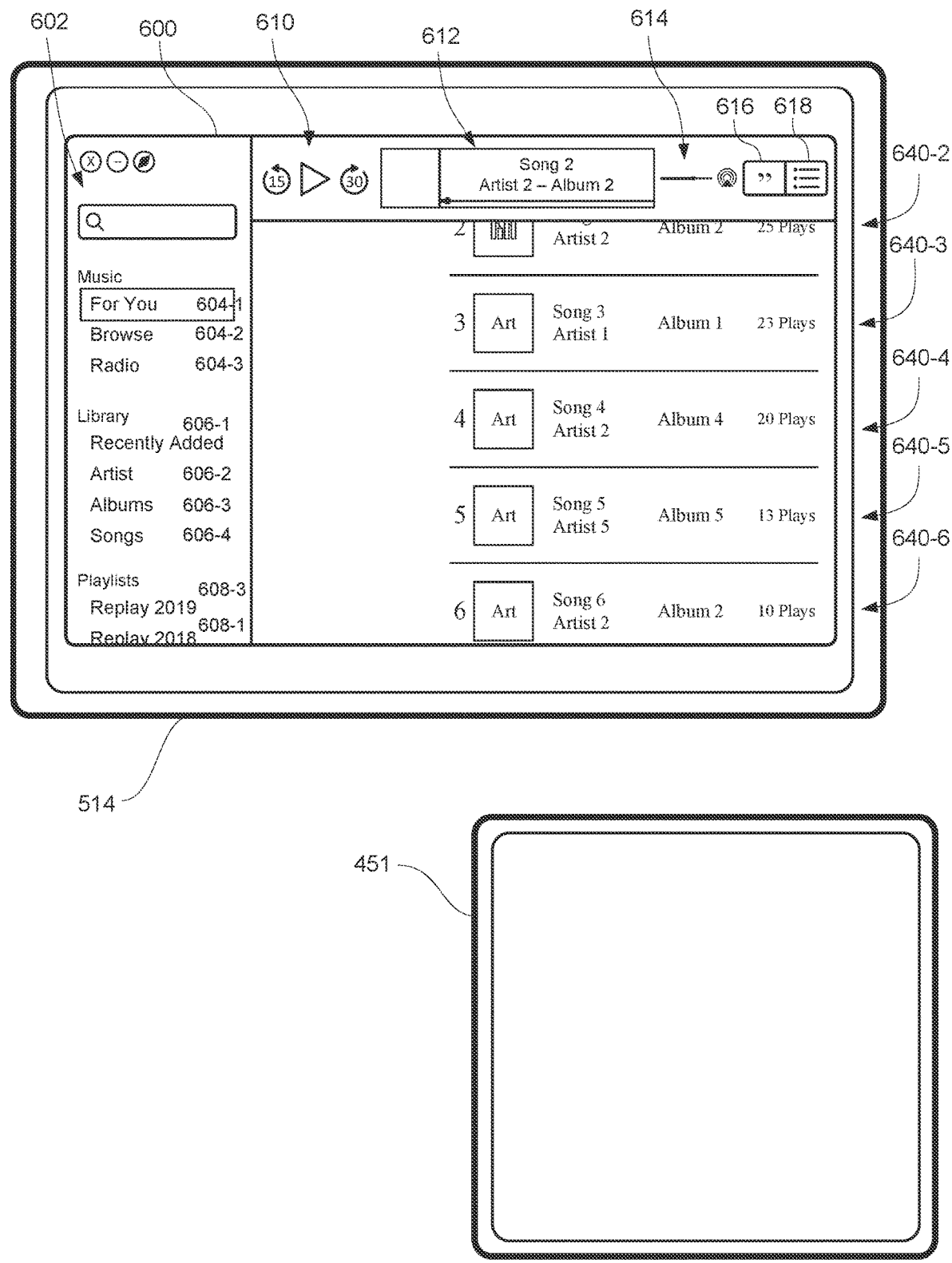
Figure 6Q:
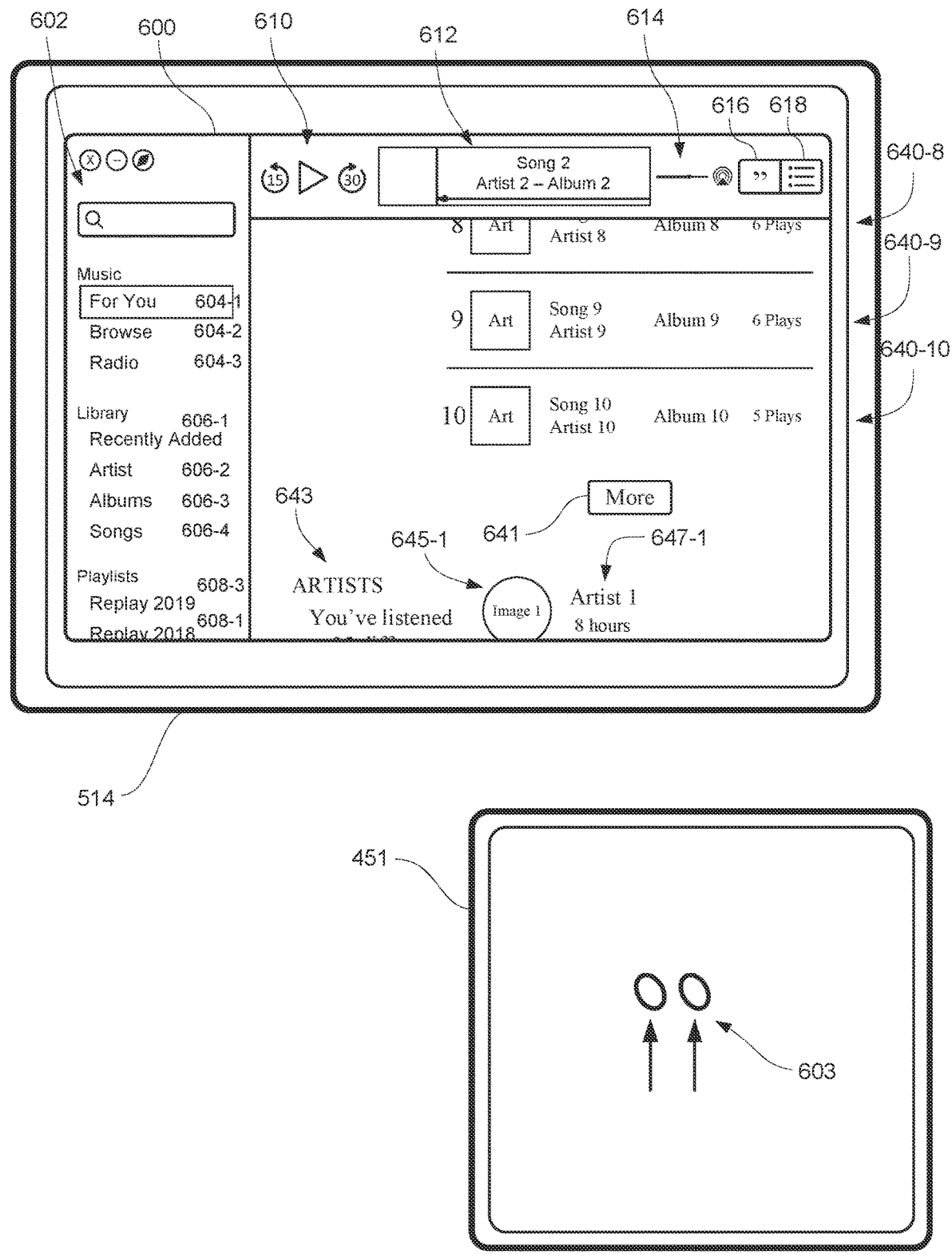

FIGS. 6A-6QQ illustrate exemplary ways in which an electronic device provides time period-based curated playlists in accordance with some embodiments of the disclosure. The embodiments in these figures are used to illustrate the processes described below, including the processes described with reference to FIGS. 7A-7K.

FIG. 6A illustrates an electronic device (such as electronic device 500, not shown) that is in communication with display 514 (e.g., such as a monitor, television or integrated display) and an input device (e.g., such as touch-sensitive surface 451). It is understood that the disclosure illustrates the use of touch-sensitive surface 451, but the input device can be any suitable input device such as a remote control, mouse, touchpad, etc. In some embodiments, device 500 is displaying a music playback application 600 (e.g., a user interface displayed by the music playback application 600). In some embodiments, music playback application 600 is an application installed on device 500.

In some embodiments, music playback application 600 includes three display regions. In some embodiments, music playback application 600 includes a music playback region, navigation panel 602, and a content browsing region, as will be described in further detail below.

In some embodiments, the music playback region is displayed at or near the top of music playback application 600. In some embodiments, the music playback region includes information about and playback controls for the song that is current playing (e.g., or was playing, if paused). In some embodiments, the music playback region is always displayed even if no song is being played or has been played. As shown in FIG. 6A, the music playback region includes playback information 612 that includes information the song currently playing, such as a representation of the song (e.g., an image, album art, song art, etc.), the title of the song, the name of the artist, and the date of the album. The music playback region includes playback controls 610, including a rewind control, a play/pause control, and a fast-forward control (e.g., or any combination of the above). The music playback region optionally includes a scrubber bar for scrubbing through the currently playing song. In some embodiments, the rewind control is selectable to rewind the song by a predetermined amount (e.g., 15 seconds, 30 seconds, 60 seconds, etc.). In some embodiments, play/pause control is selectable to play or pause the displayed song accordingly. In some embodiments, fast-forward control is selectable to fast-forward the playback of the song by a predetermined amount (e.g., 15 seconds, 30 seconds, 60 seconds, etc.). In some embodiments, the scrubber bar displays the current playback position of the song and is interactable to move the playback to a particular position (e.g., by selecting a respective part of the scrubber bar). In some embodiments, the music playback region includes audio controls 614. In some embodiment, the volume bar of audio controls 614 is interactable to change the volume of the playback (e.g., the system volume or the volume of just the music playback application 600). In some embodiments, audio controls 614 include an audio output device affordance that is selectable to set the audio output device (e.g., the device that will receive and play the audio signal provided by device 500). In some embodiments, the music playback region includes selectable options 616 and 618. In some embodiments, selectable option 616 is selectable to display the lyrics of the currently playing song. In some embodiments, selectable option 618 is selectable to display the songs in the playback queue (e.g., songs which will be played next, optionally including the current song and/or previously played songs).

In FIG. 6A, navigation panel 602 includes a search field that is selectable to search for music within the music playback application 600. In some embodiments, navigation panel 602 includes one or more selectable options that are selectable to cause the content browsing region to display one or more content items associated with the selected option. For example, in FIG. 6A, navigation panel 602 includes different sections corresponding to selectable options for displaying different user interfaces in the content browsing region (e.g., different pages). For example, selectable options 604-1 to 604-3 correspond to pages for browsing and finding music available for purchase and/or access, but not necessarily included in the library of the user, selectable options 606-1 to 606-4 correspond to pages for content that the user has added to his or her library, and selectable options 608-1 to 608-2 correspond to pages of the user's music playlists. In some embodiments, selectable option 604-1 is selectable to display content (e.g., songs, videos, etc.) recommendations for the user available for access via the music playback application 600, selectable option 604-2 is selectable to browse for content available for access via the music playback application 600, and selectable option 604-3 is selectable to browse for radio channels available for access via the music playback application 600. In some embodiments, selectable option 606-1 is selectable to display items that were recently added to the user's library, selectable option 606-2 is selectable to display a list of artists that the user has added to the user's library (or artists of songs that the user has added to the user's library), selectable option 606-3 is selectable to display a list of albums that the user has added to the user's library, and selectable option 606 is selectable to display songs that the user has added to the user's library. In some embodiments, selectable option 608-1 is selectable to display the "Guilty Pleasures" playlist (e.g., a playlist of content that the user has previously generated, saved, etc.), and selectable option 608-2 is selectable to display the "Obsessions" playlist (e.g., a playlist of content that the user has previously generated, saved, etc.). In some embodiments, the playlists are user generated. In some embodiments, the playlists are automatically generated or otherwise curated for the user. In some embodiments, a user is able to create or add more playlists and/or delete playlists from the music playback application 600. It is understood that navigation panel 602 is scrollable to reveal more or different selectable options, such as more playlists. It is also understood that each section of panel 602 optionally includes more or fewer selectable options than those illustrated herein.

In FIG. 6A, selectable option 604-1 is currently selected (e.g., as shown by the solid box around selectable option 604-1, which is optionally not displayed in the user interface but is shown in the figures for ease of description). In some embodiments, because selectable option 604-1 is currently selected, the content browsing region displays user interface 620. In some embodiments, user interface 620 displays content that has been curated for the user (e.g., content that is recommended to the user based on the user's past content consumption activity and/or the user's previous ratings (e.g., likes/dislikes) of content). In FIG. 6A, user interface 620 includes a row of representations of music mixes that are available to the user (e.g., representations 622-1 to 622-3). In some embodiments, the music mixes row include automatically generated music mixes that are recommended to the user based on the user's consumption activity. In some embodiments, each music mix is generated with a different focus or genre (e.g., pop, rock, classical, new music, chill music, favorites, etc.) and is updated periodically (e.g., every week, every month, etc.). In some embodiments, each music mix in the music mix row includes an indicator of when the mix was last updated. In some embodiments, each representation includes the title of the music mix and a mosaic of one or more cover art images associated with a subset of the songs in the respective music mix. In some embodiments, chevrons 626-1 and 626-2 are displayed to the left and right of the row of music mixes, respectively, that are selectable to navigate leftwards or rightwards, respectively, to reveal further music mixes. It is understood that chevrons 626-1 and 626-2 can be included in any of the rows of content discussed herein to perform the functionality of scrolling leftwards or rightwards. In some embodiments, a user can scroll leftwards or rightwards by perform a leftward or rightward navigation input (e.g., a left scroll or right scroll gesture on an input device). In some embodiments, each of the music mix representations is selectable to display the songs included in the music mixes (e.g., a user interface showing the contents of the music mixes).

In some embodiments, user interface 620 includes further rows of content items corresponding to other categories of content (e.g., such as a row for recently played songs including representations 624-1 to 624-3). It is understood that user interface 620 is vertically scrollable to reveal further rows of content items that are not displayed herein. In some embodiments, each row of items includes a selectable option to display all songs in the respective category (e.g., selectable option 628). It is understood that selectable option 628 can be included in any of the rows of content discussed herein.

In some embodiments, the representations discussed above are selectable to cause playback of the respective song or music mix. In some embodiments, the representations are selectable to cause display of a user interface specific to the respective song or music mix (e.g., a user interface for the music mix or song).

Figure 6R:
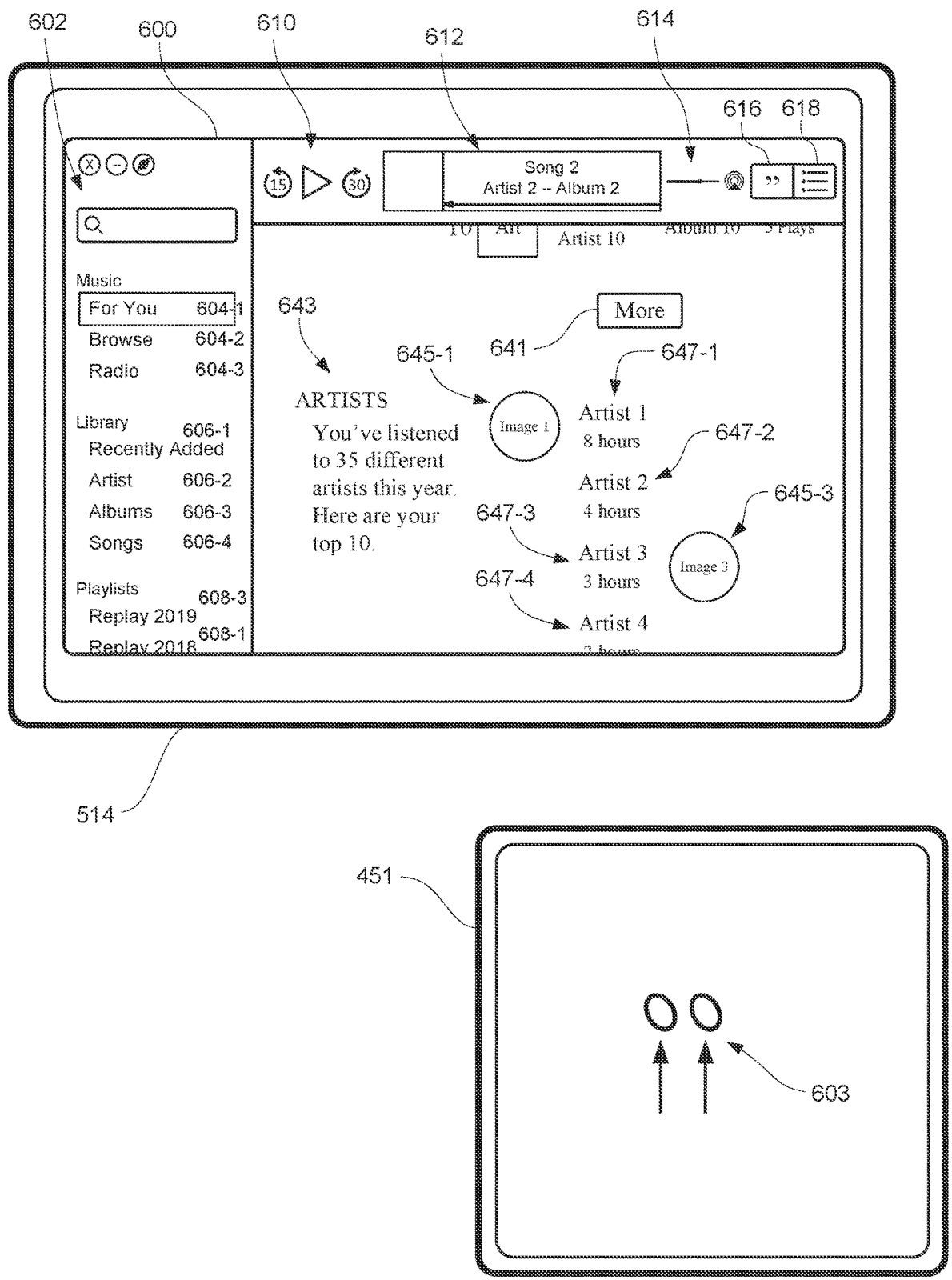
Figure 6S:
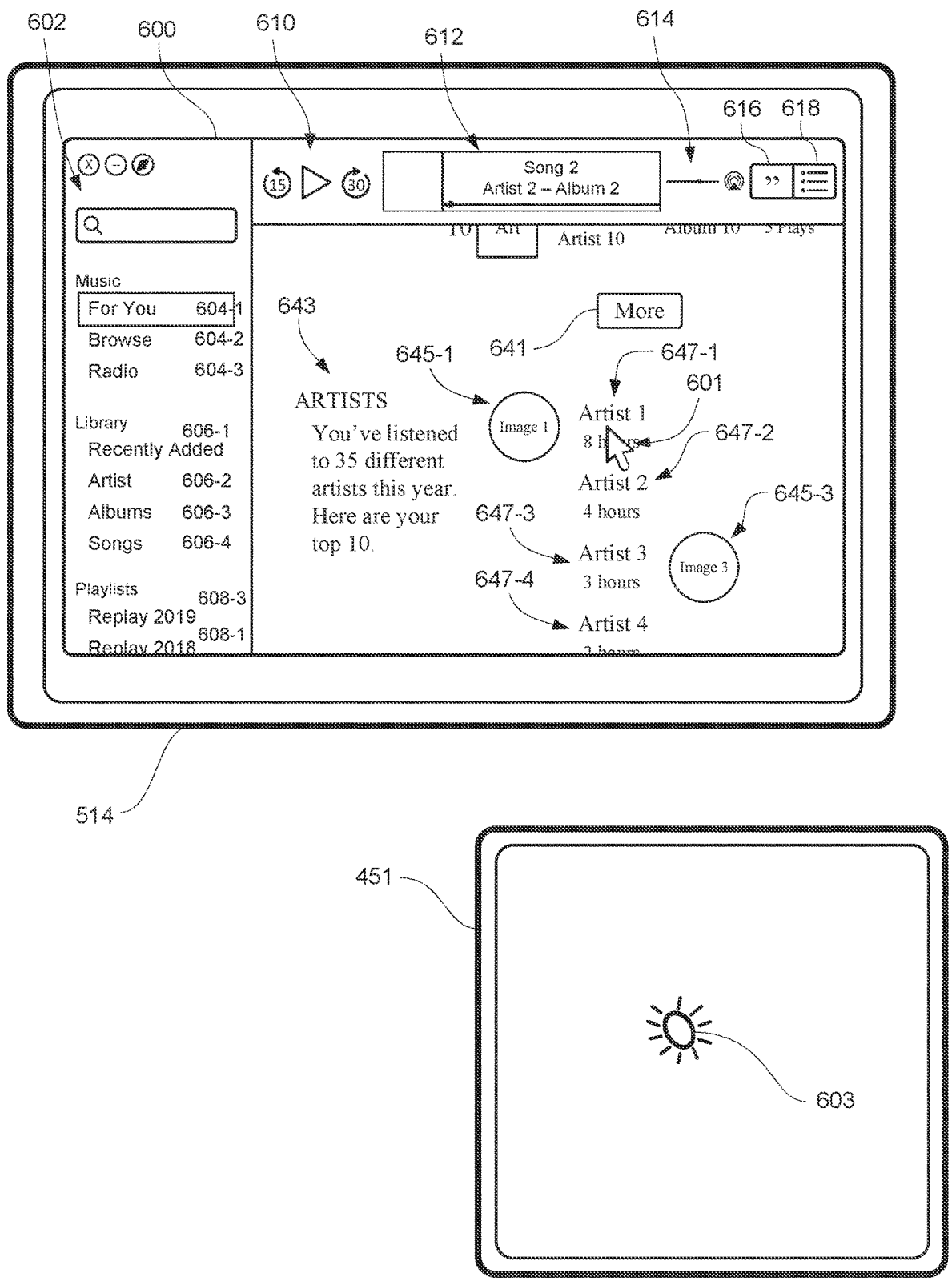
Figure 6T:
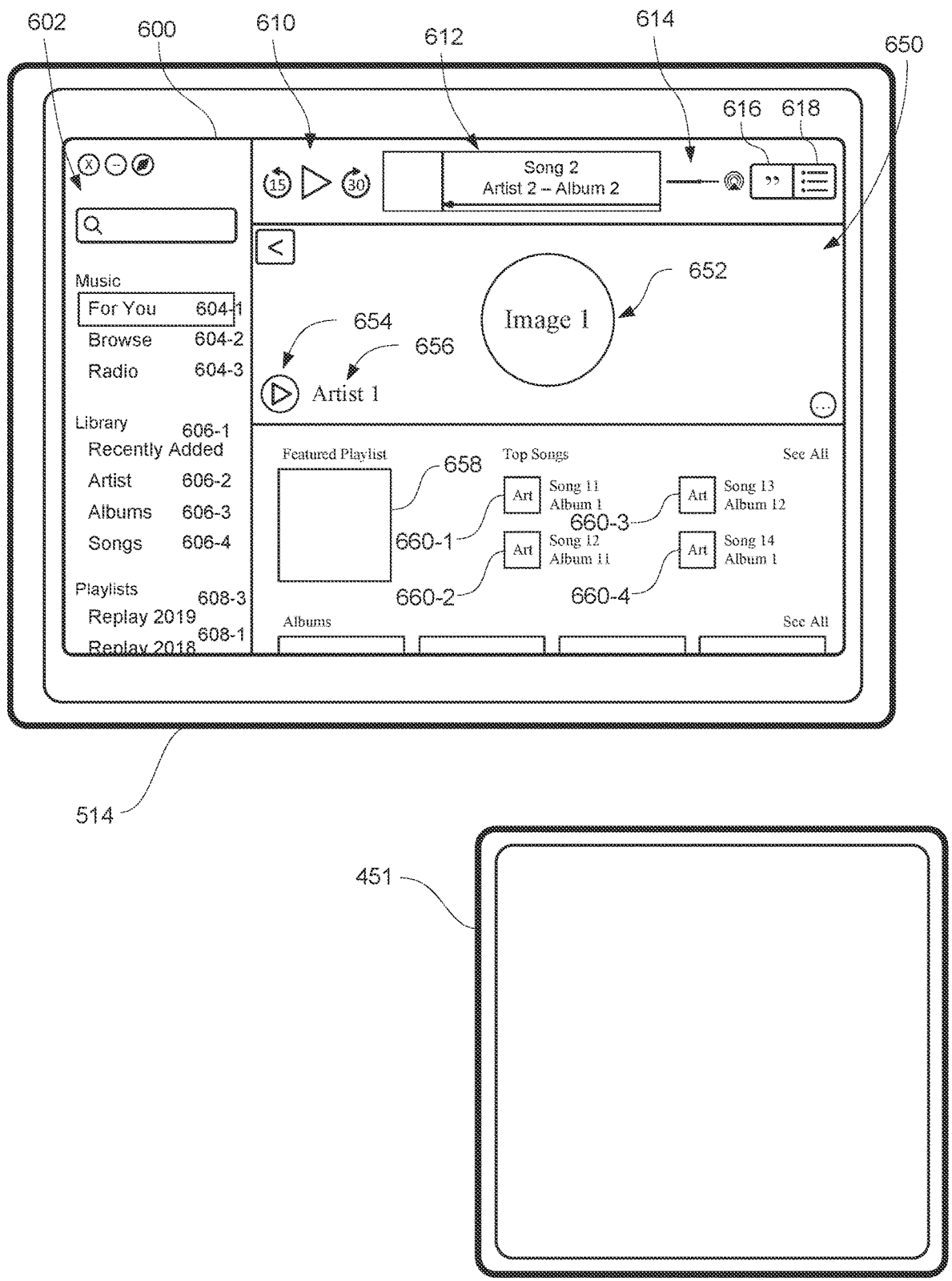
Figure 6U:
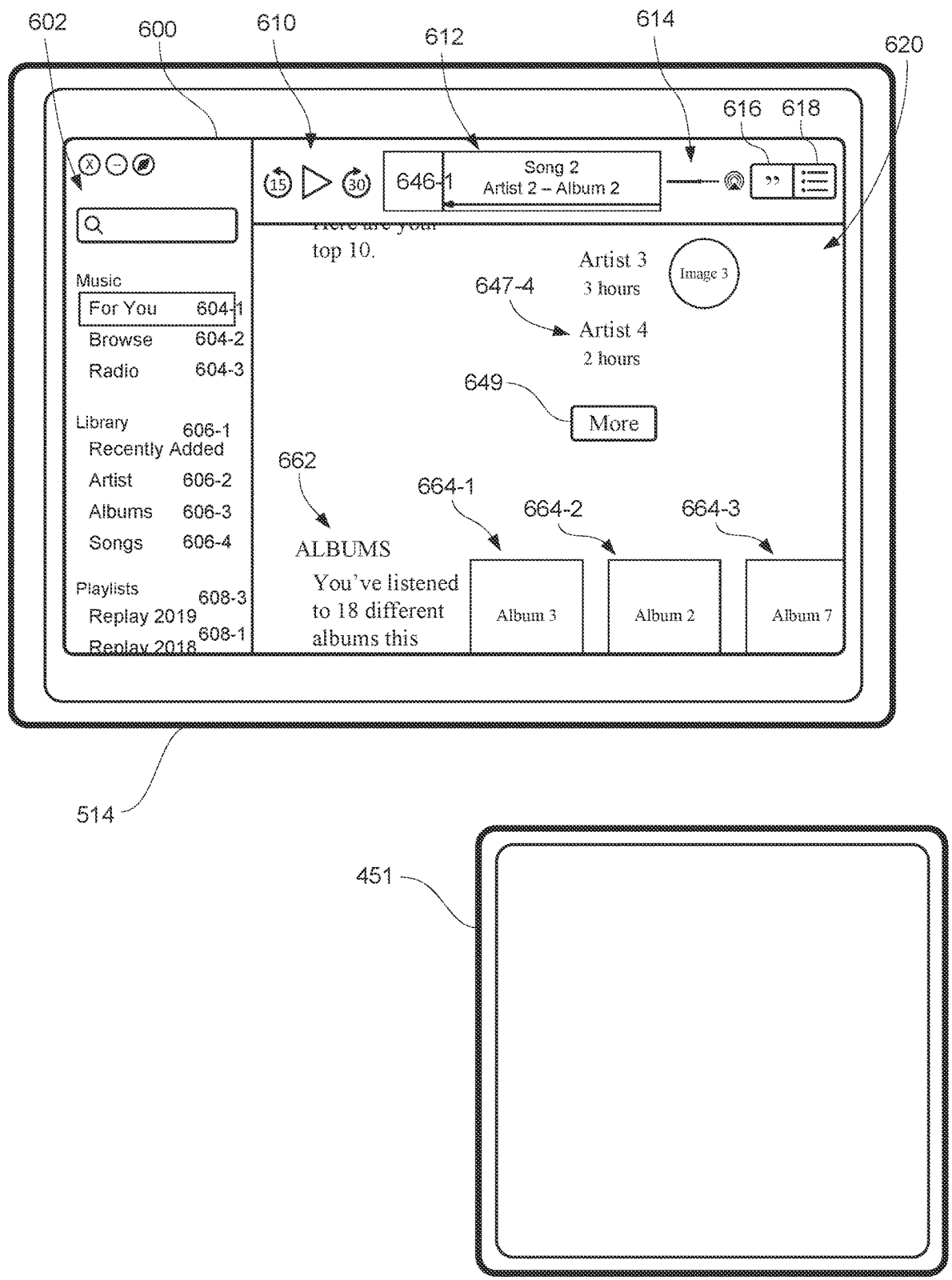
Figure 6X:
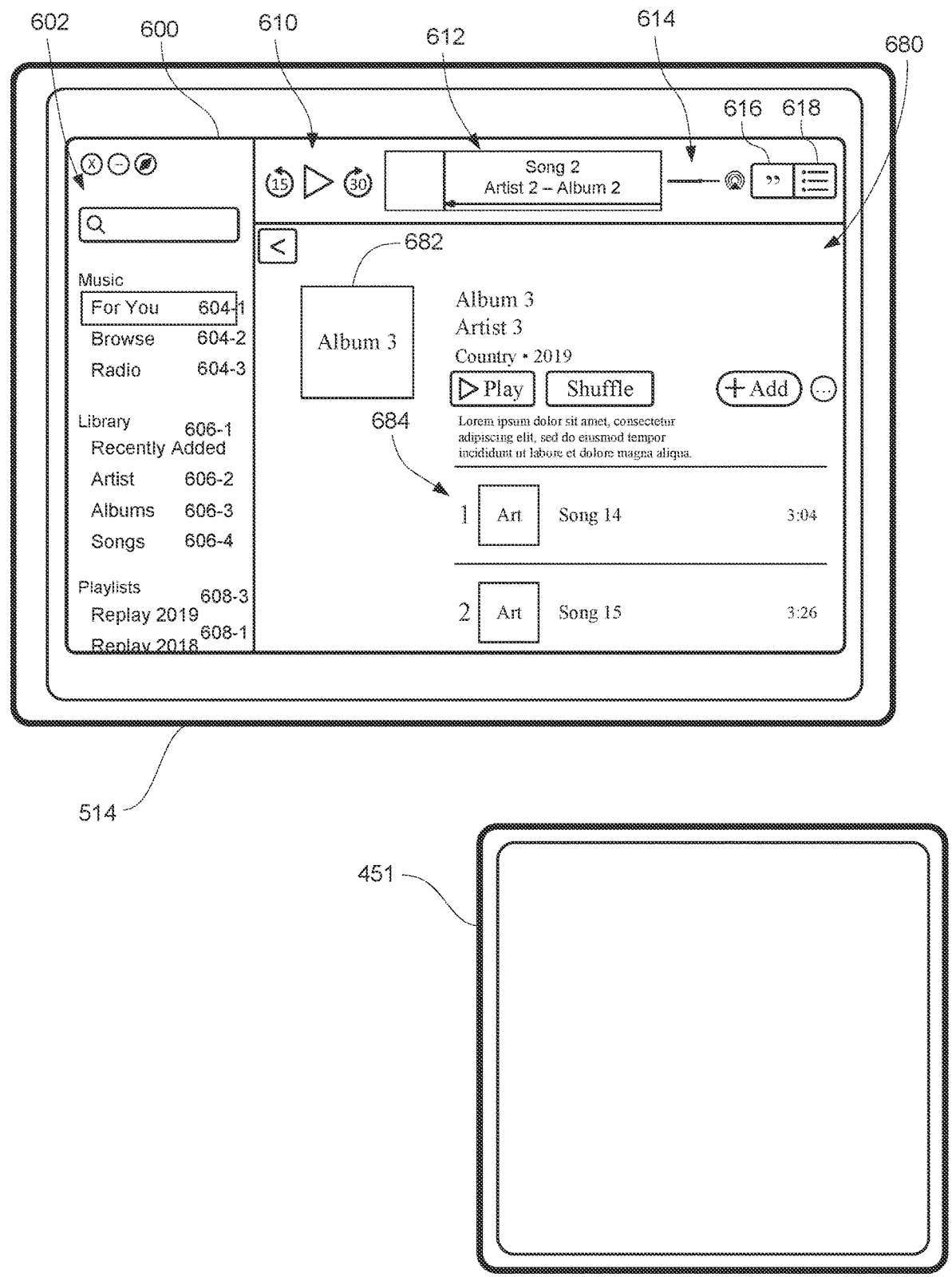
Figure 6Y:
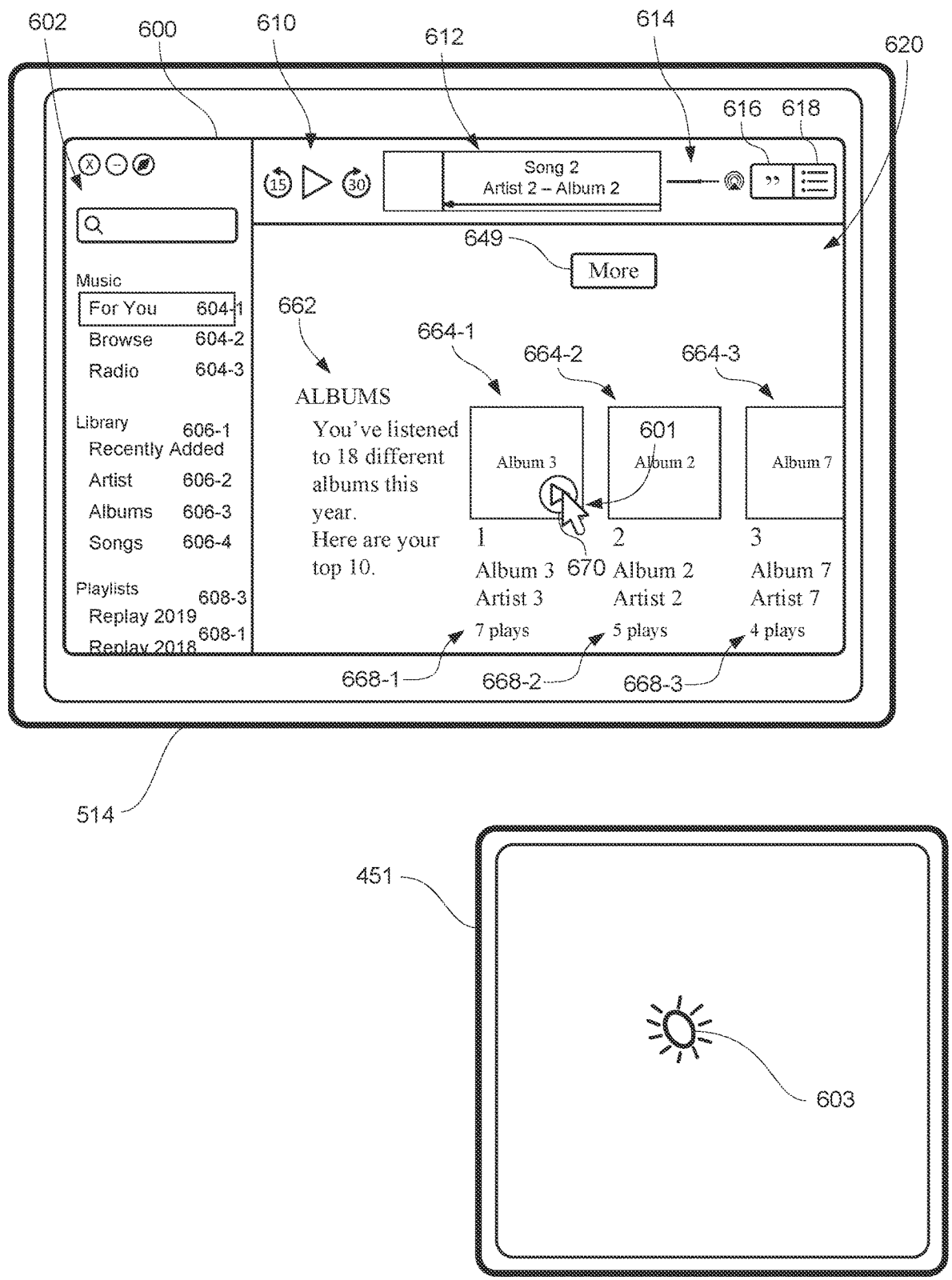
Figure 6Z:
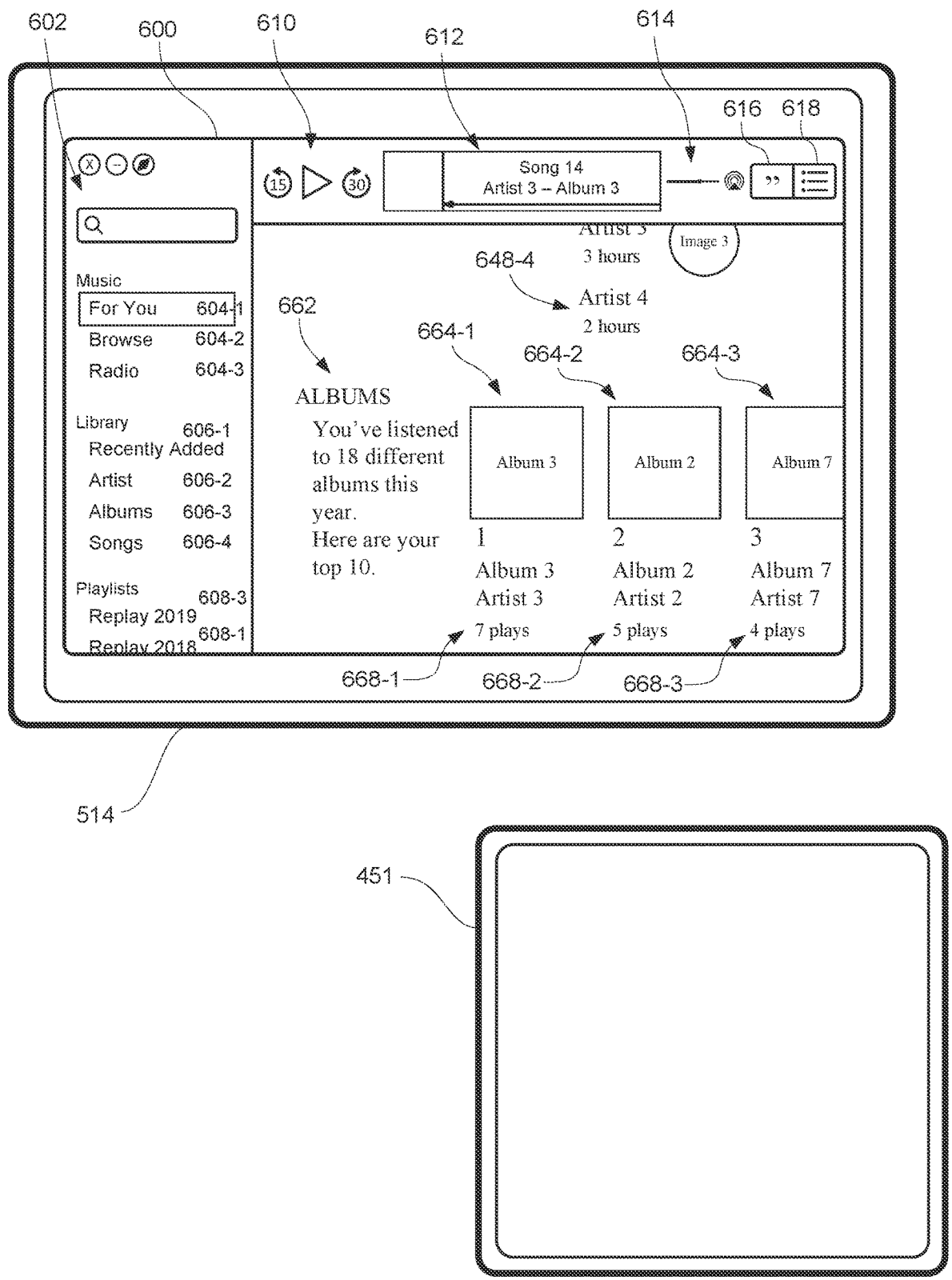
Figure 6B:
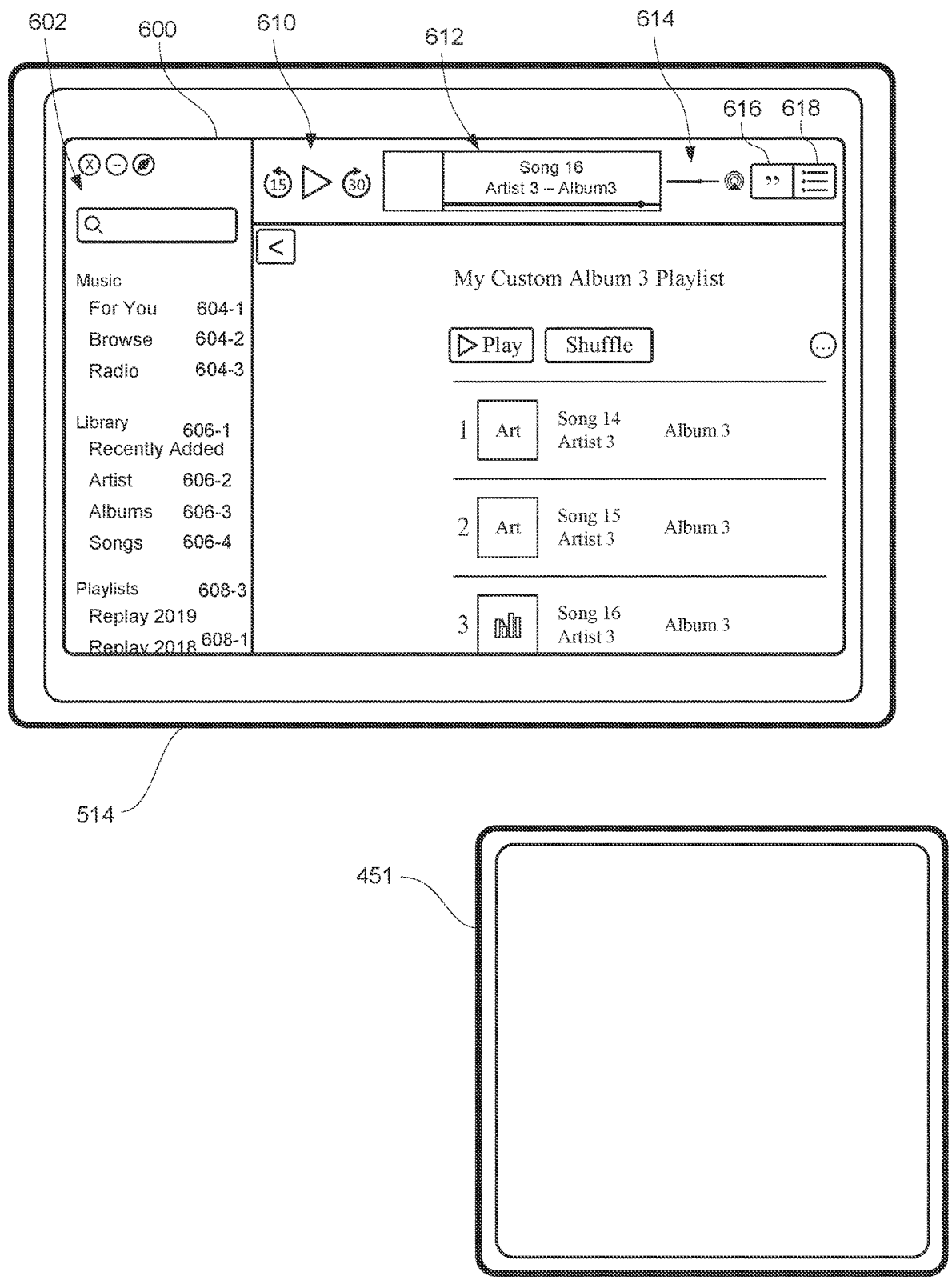

In FIG. 6B, a user input 603 corresponding to an upward navigational input is received (e.g., an upward or downward swipe on a touch pad or touch screen, an upward or downward scroll on a scroll wheel, or a downward selection on a scroll bar). In some embodiments, in response to the navigational input, user interface 620 scrolls upwards to reveal further rows of content, as shown in FIG. 6B.

FIG. 6B illustrates the electronic device when the current date is Jan. 15, 2019. In FIG. 6B, the user of the electronic device (or the user account that is logged into the music application 600) has had a sufficient amount of content consumption for the year 2018 to satisfy the content consumption criteria for the generation of a 2018 replay mix, which is optionally a playlist that includes content that the user has consumed during the year 2018 (the details of which will be described in further detail below). In some embodiments, because the user has had sufficient content consumption, user interface 620 includes banner 630 corresponding to the 2018 replay mix. As shown, banner 630 promotes or otherwise informs the user that a replay mix for 2018 is generated and available to the user. In some embodiments, banner 630 indicates that the 2018 replay mix corresponds to music that the user has listened to in 2018. In some embodiments, banner 630 is selectable to display a 2018 replay mix user interface as will be described later.

In some embodiments, the replay mix generation criteria include a consumption criteria. In some embodiments, the replay mix generation criteria include a date criteria. In some embodiments, the replay mix generation criteria include a subscription criteria. In some embodiments, the replay mix generation criteria comprise any combination of the consumption criteria, date criteria and subscription criteria. The consumption criteria optionally require that a user have consumed, within the relevant time period (e.g., 2017, 2018, year-to-date, etc.), a threshold amount of content. In some embodiments, the threshold amount of content comprises a threshold number of songs (e.g., 5 unique songs, 10 unique songs, 30 unique songs, 50 unique songs), a threshold number of plays for the threshold number of songs (e.g., 3 plays each, 5 plays each, 10 plays each, etc.), and/or any combination of the above. In some embodiments, the date criteria require that a threshold amount of days have elapsed since the beginning of the relevant time period (e.g., 1 month, 2 months, 3 months). In some embodiments, the subscription criteria require that the user have subscribed to the music subscription service during the relevant time period. In some embodiments, if the replay mix generation criteria for a respective year is satisfied, a replay mix is generated for the respective year (e.g., generated at the electronic device or a remote server and provided to the electronic device) and a banner for the respective year is provided on user interface 620. In some embodiments, if the replay mix generation criteria for a respective year is not satisfied, a replay mix is not generated for the respective year and a banner for the respective year is not provided on user interface 620.

Figure 6C:
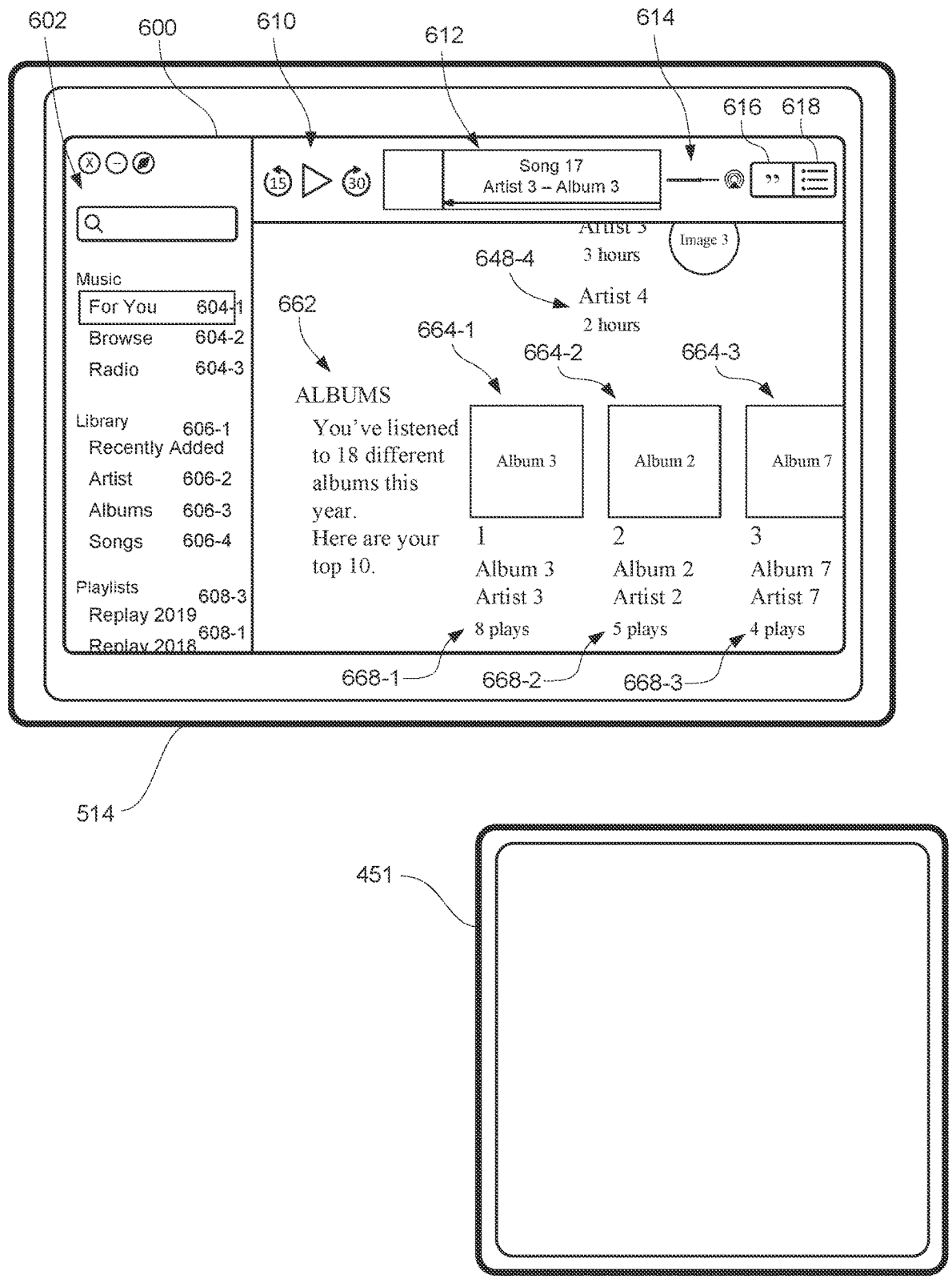

For example, as shown in FIG. 6C, the current date at the electronic device is Feb. 1, 2019, and the user has had sufficient content consumption for 2019. Thus, in FIG. 6C, the user satisfies the consumption criteria but not the date criteria for a 2019 replay mix. In such an embodiment, a replay mix is not generated and no banner is displayed for the 2019 replay mix because the replay mix generation criteria is not satisfied for 2019. Also shown in FIG. 6C, the user has had insufficient content consumption for 2018. Thus, because the consumption criteria is not satisfied for a 2018 replay mix, even though the date criteria is satisfied (e.g., it is beyond a threshold amount of days beyond the beginning of 2018), a replay mix has not been generated for 2018 and a banner is not displayed on user interface 620. Thus, in such embodiments, user interface 620 displays further rows of content, such as the "pop" row, which includes songs in the "pop" genre that are recommended for the user (e.g., song 632-1, song 632-2, and song 632-3) that are optionally selectable to initiate playback of the selected songs.

In some embodiments, whether a banner for a particular year is displayed on user interface 620 includes different or additional requirements as compared to the replay mix generation criteria. In some embodiments, after a threshold amount of days/time after the end of the relevant period for a respective replay mix (e.g., 1 month after, 2 months after, 3 months after, etc.), the banner for that time period will no longer be displayed for that time period's replay mix. For example, if the content consumption criteria and the date criteria is satisfied for 2018 (e.g., the replay mix generation criteria for 2018 is satisfied), then a 2018 replay mix is generated and a banner is displayed advertising the 2018 replay mix in January of 2019 and February of 2019. However, in March of 2019, even though the replay mix generation criteria for 2018 is/was satisfied, a banner for the 2018 replay mix will cease to be displayed in user interface 620 because it has been more than a threshold amount of days after the end of the relevant period (e.g., three months after the relevant period, the relevant period being the first day of 2018 to the last day of 2018). In some embodiments, the threshold amount of days for ceasing display of the banner for a particular year is the same as the threshold amount of days of the date criteria for the next year's replay mix. Thus, in such embodiments, if the content consumption is satisfied for the next year (e.g., 2019), user interface 620 will appear to replace the banner for the replay mix for the previous year (e.g., 2018) with a banner for the replay mix for the next year (e.g., 2019). In some embodiments, though, as shown in FIG. 6C, if the replay mix generation criteria is not satisfied for the next year, then no banner is displayed for either year. In some embodiments, even if the replay mix generation criteria is satisfied for the previous year (e.g., 2018), if the replay mix generation criteria is not satisfied for the next year, then no banner is displayed for either year because it has been more than a threshold amount of days after the end of the previous year (e.g., if the current date is March 2019). In some embodiments, only one banner is displayed at any one time (e.g., the most recent replay mix).

In some embodiments, as long as a particular year's replay mix is generated, a banner is always shown, even if the current or previous year's generation criteria is not satisfied. Thus, in some embodiments, user interface 620 will always include a banner for a replay mix. For example, if the 2018 and 2019 criteria is not satisfied but the 2017 generation criteria is satisfied, then user interface 620 will continue to display a banner advertising the 2017 replay mix until the point in which a more recent year's replay mix generation criteria is satisfied (at which point, the banner will be replaced with the more recent year's replay mix's banner).

FIG. 6D illustrates an embodiment in which the current date is Mar. 1, 2019 and the user has sufficient content consumption for 2019. In the embodiment illustrated in FIG. 6D, Mar. 1, 2019 satisfies the date criteria. Thus, because the date criteria is satisfied and the user has sufficient content consumption for 2019, the replay mix generation criteria for 2019 is satisfied. In such embodiments, a replay mix has been generated for 2019 and banner 630 is displayed on user interface 620 indicating that a replay mix has been generated for 2019. As shown in FIG. 6D, because the current date is within the relevant time period (e.g., within 2019), banner 630 indicates that the 2019 replay mix is of music that the user has listened to so far (e.g., in 2019 to date). In some embodiments, the description on banner 630 is updated to indicate that the 2019 replay mix is of music the user has listened to in 2019 (e.g., as opposed to "so far") on a predetermined date before, at, or after the end of the relevant time period (e.g., Dec. 1, 2019, Dec. 15, 2019, Dec. 31, 2019, Jan. 1, 2020, etc.).

FIG. 6E illustrates an embodiment in which the current date is Mar. 1, 2019 and the user does not have sufficient content consumption for 2019. In the embodiment illustrated in FIG. 6E, Mar. 1, 2019 satisfies the date criteria. As described above, because the user does not have sufficient content consumption for 2019, despite the date criteria being satisfied, the replay mix generation criteria for 2019 is not satisfied. In such embodiments, no replay mix has been generated for 2019 and a banner is not displayed on user interface 620 indicating that a replay mix has been generated for 2019. In some embodiments, when the replay mix generation criteria for the current year is not satisfied, user interface 620 includes an indication that the replay mix generation criteria for the current year is not satisfied. For example, user interface 620 optionally includes a banner (not shown) that indicates that the user should listen to more music to generate a replay mix for the year.

Figure 6F:
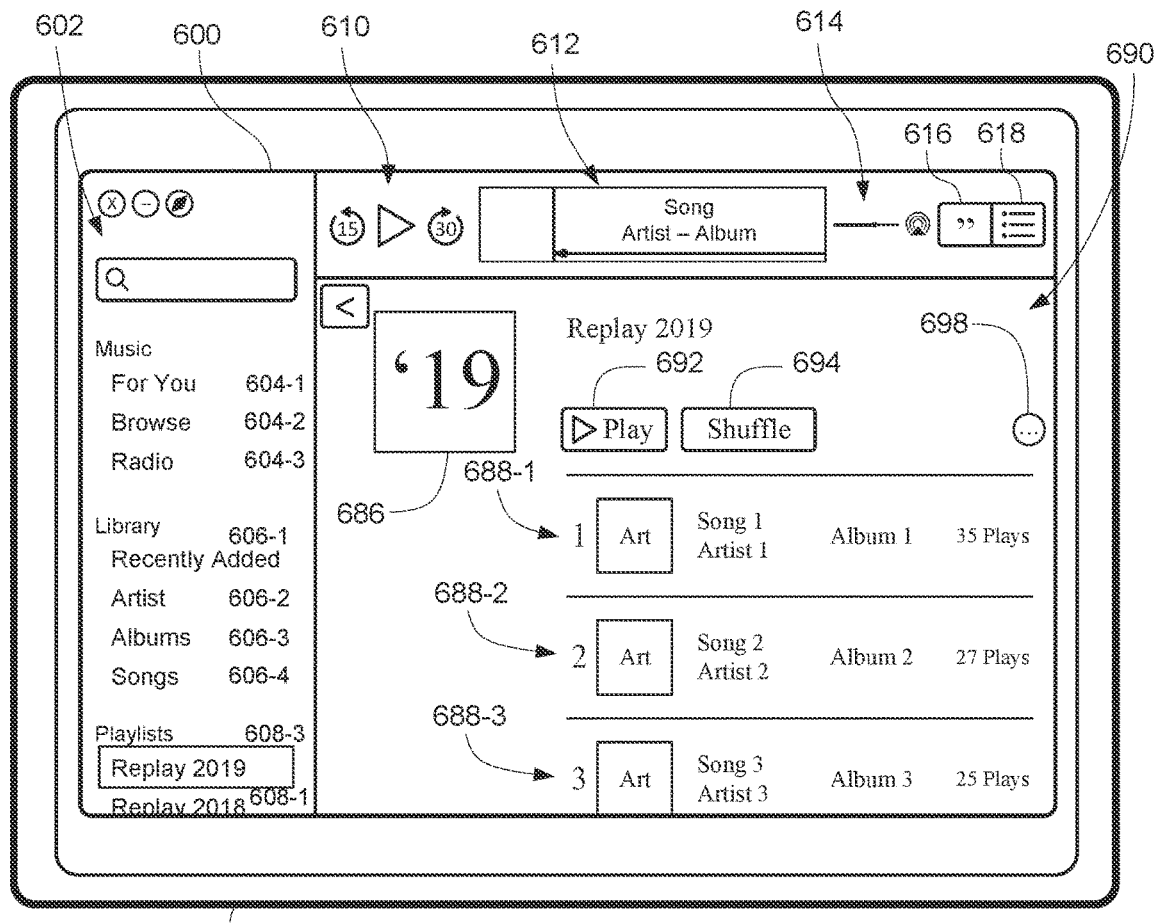
Figure 6G:
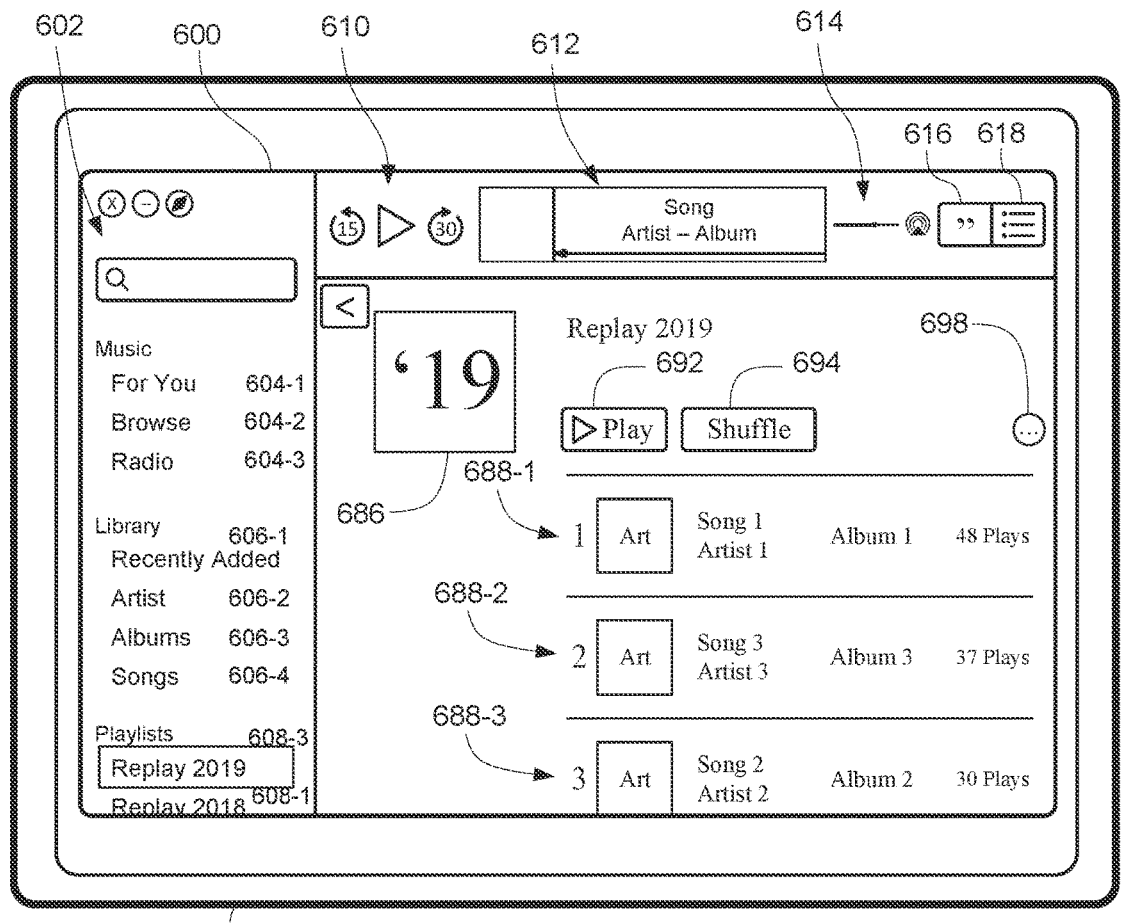
Figure 6H:
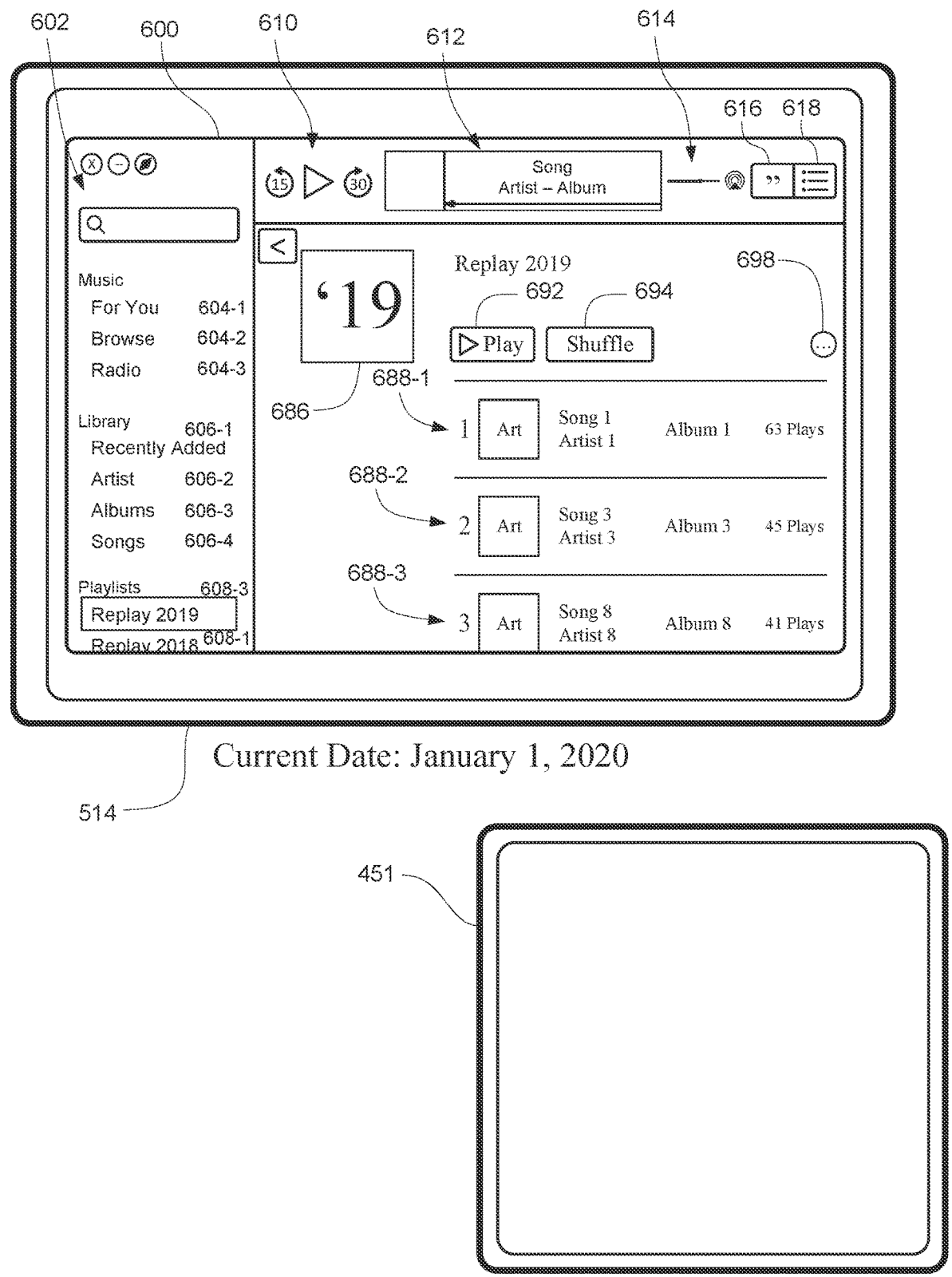
Figure 6I:
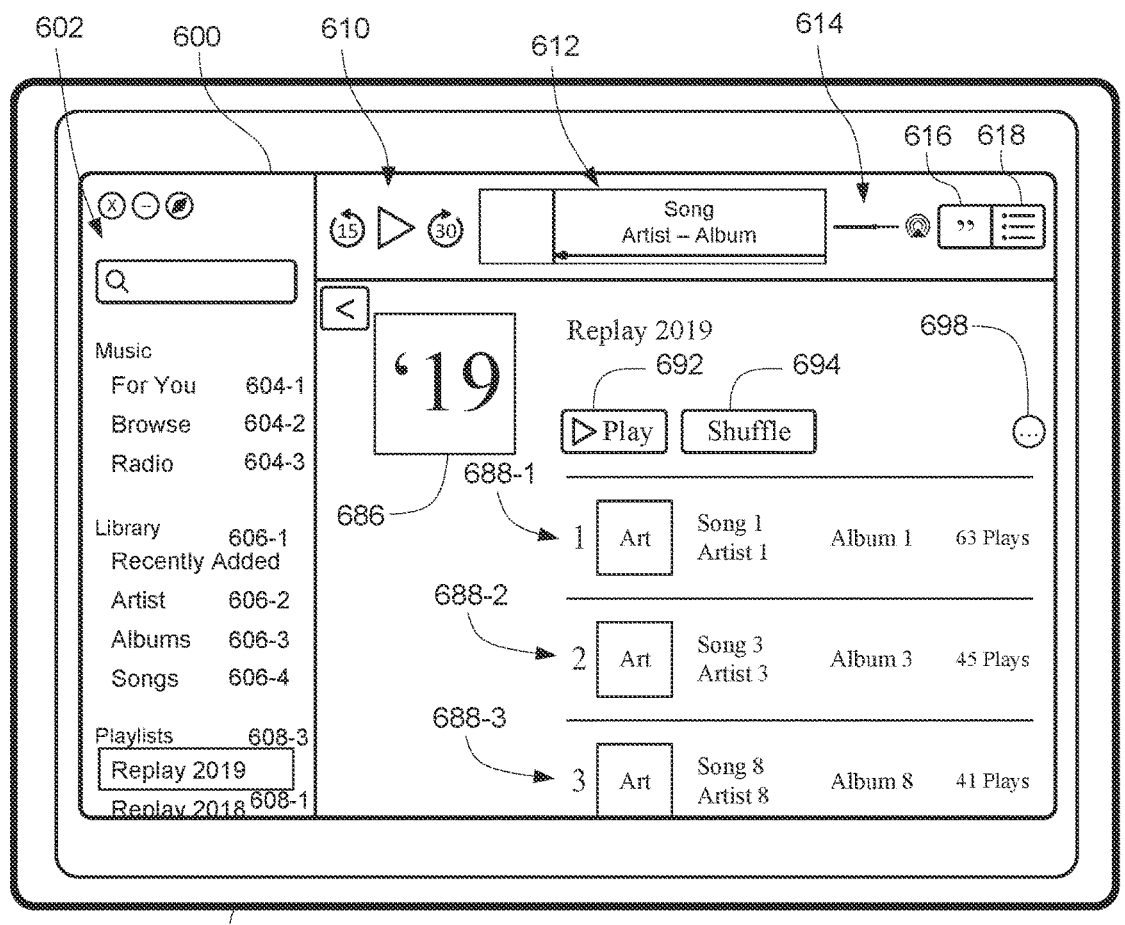
Figure 6J:
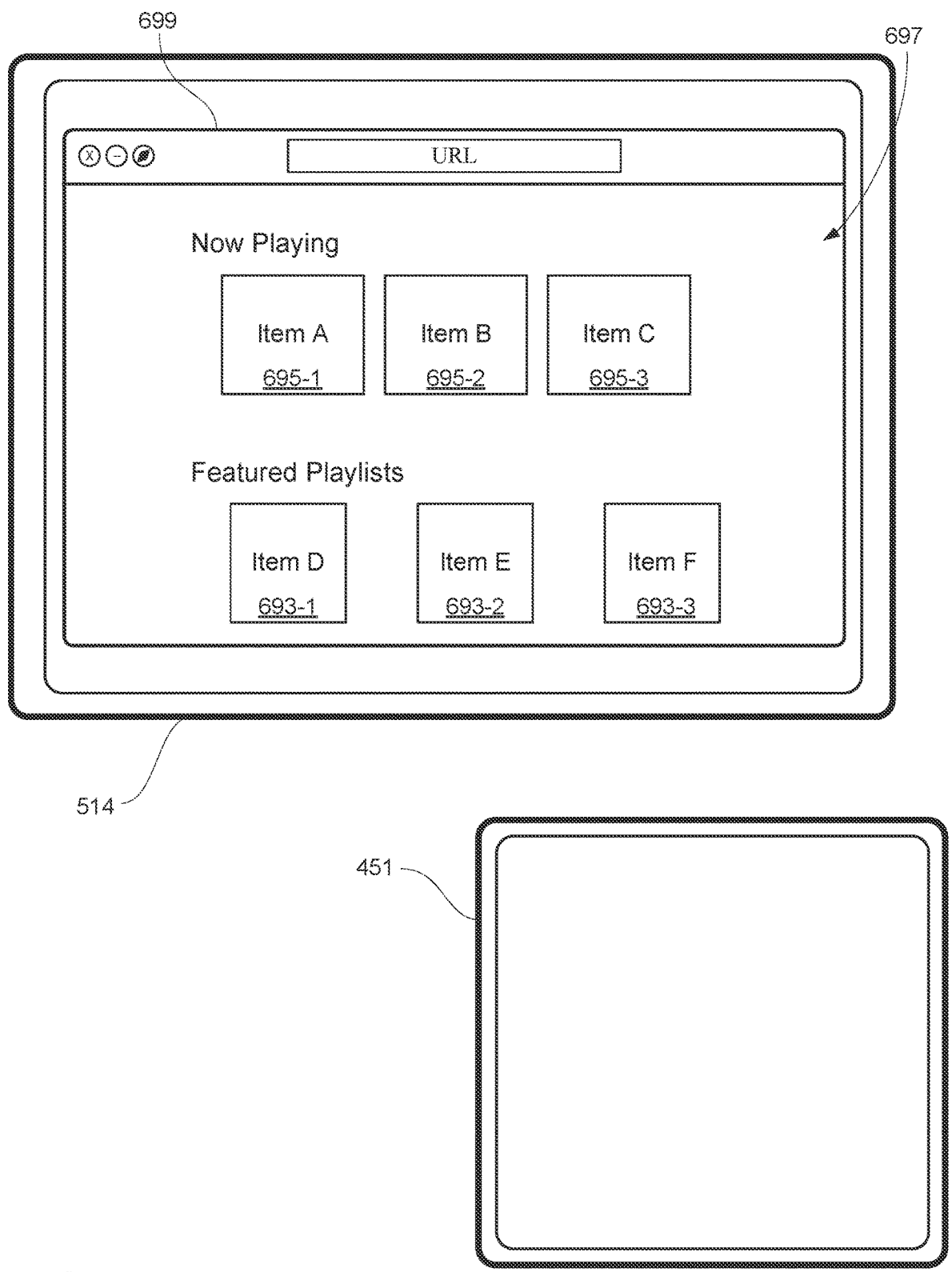
Figure 6L:
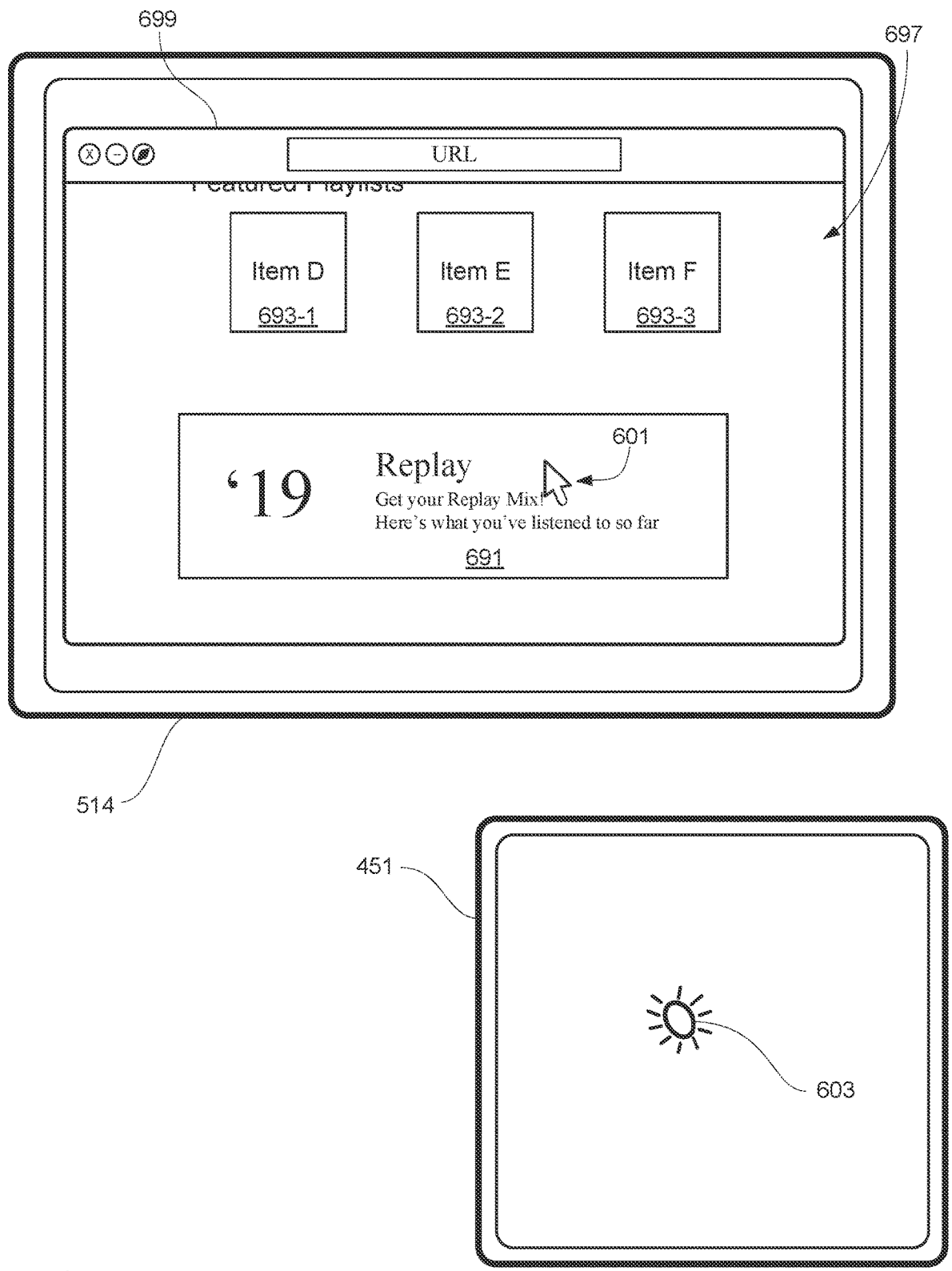
Figure 6M:
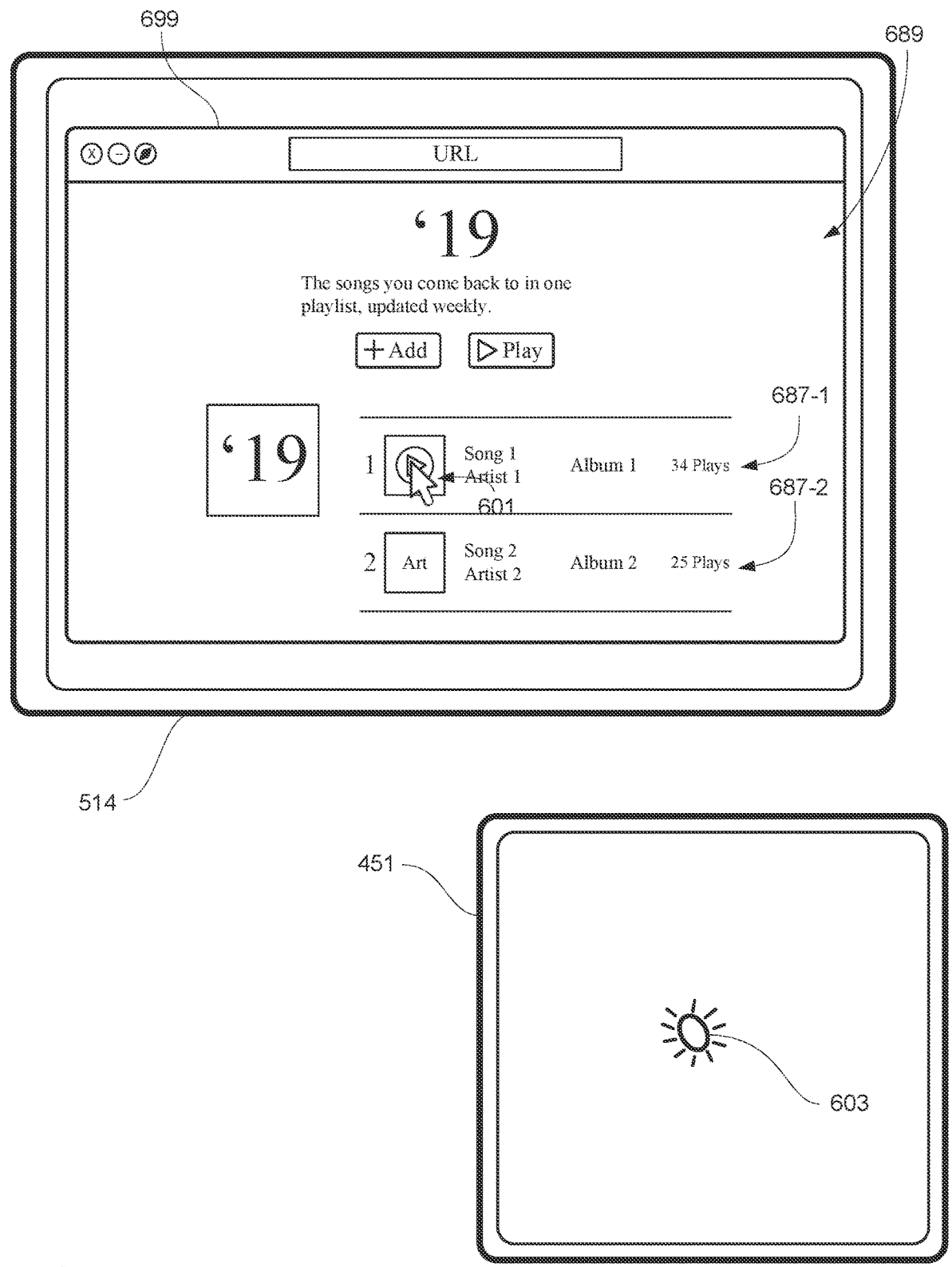
Figure 6N:
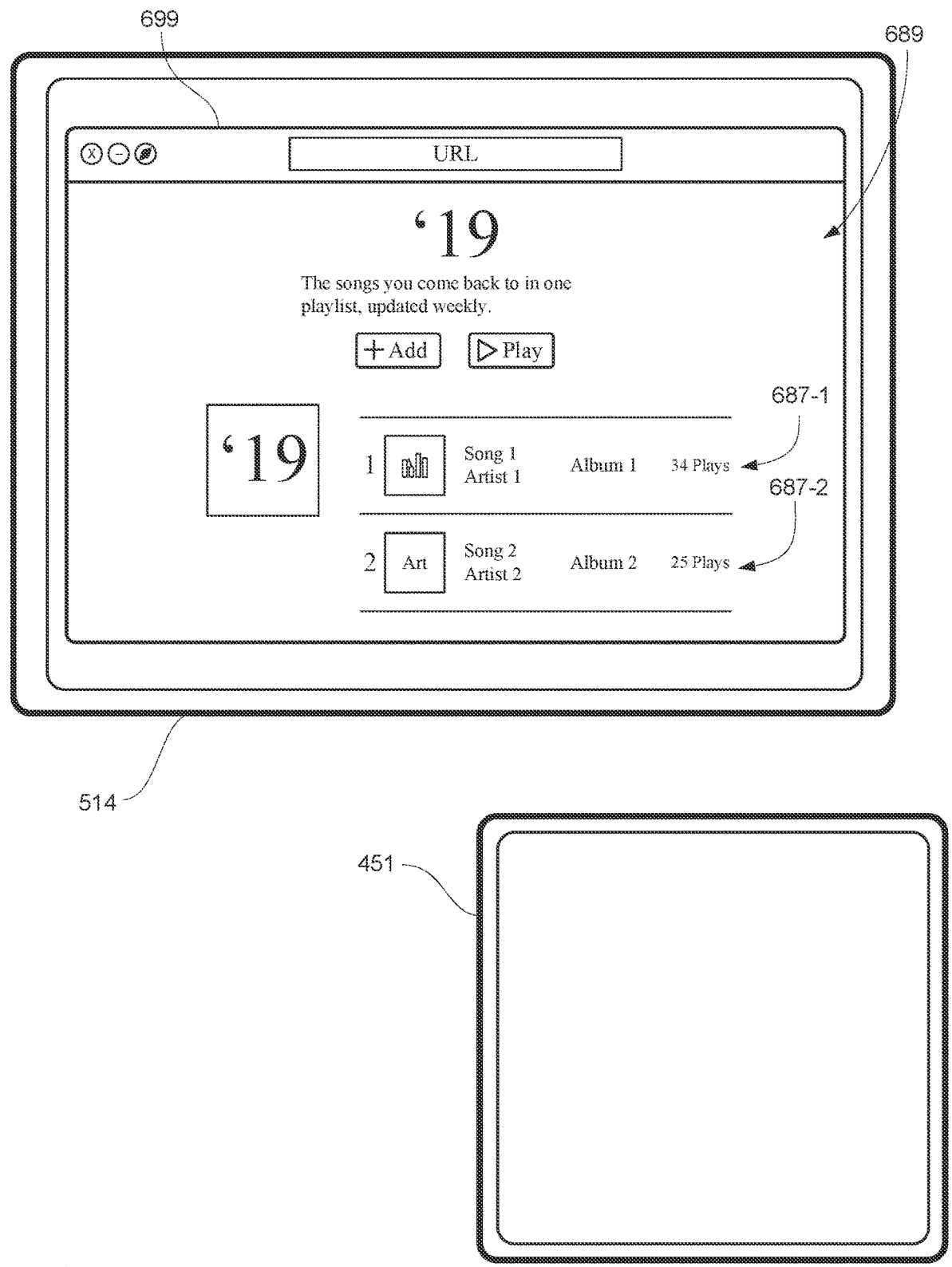
Figure 6O:
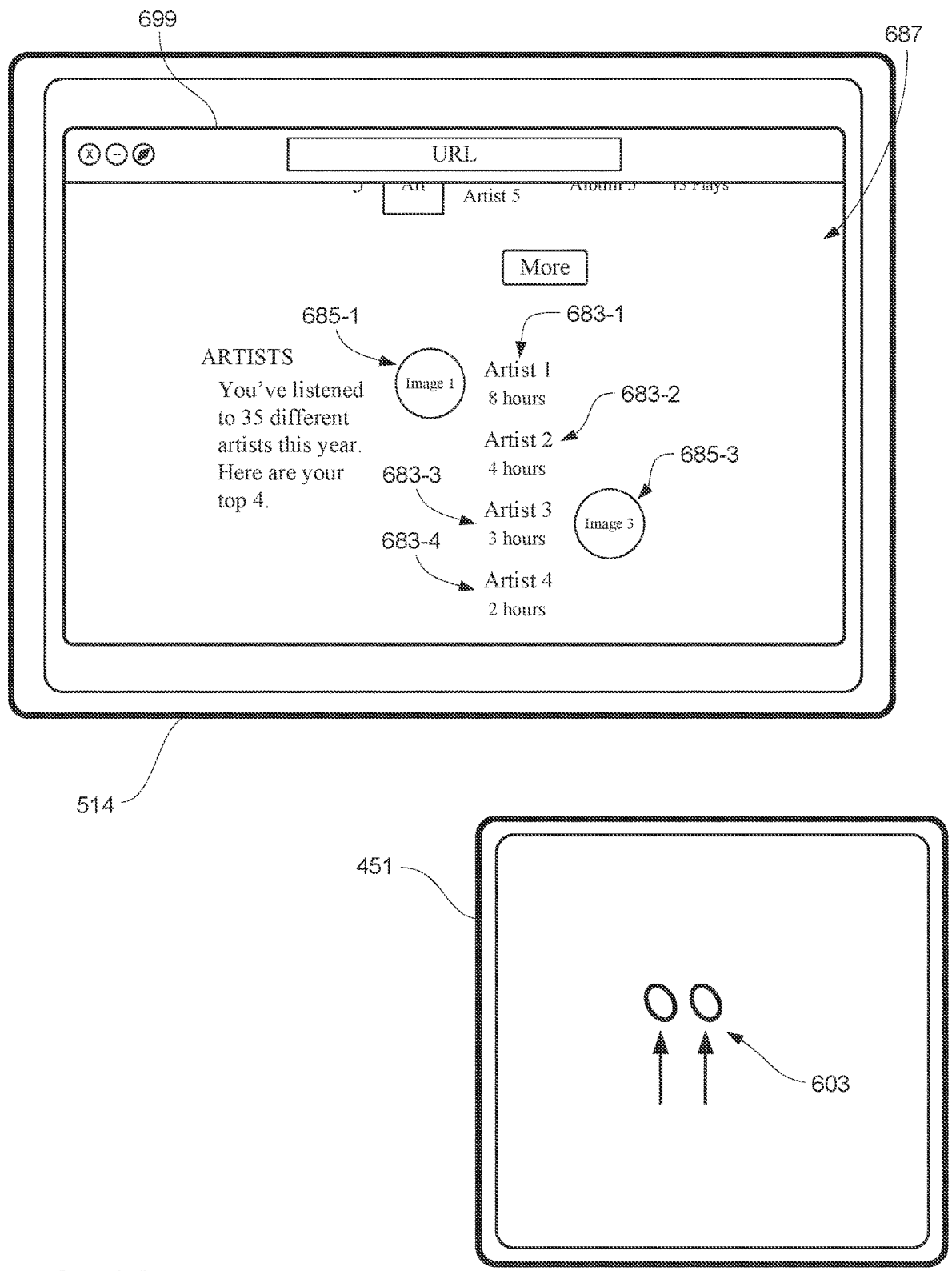
Figure 6P:
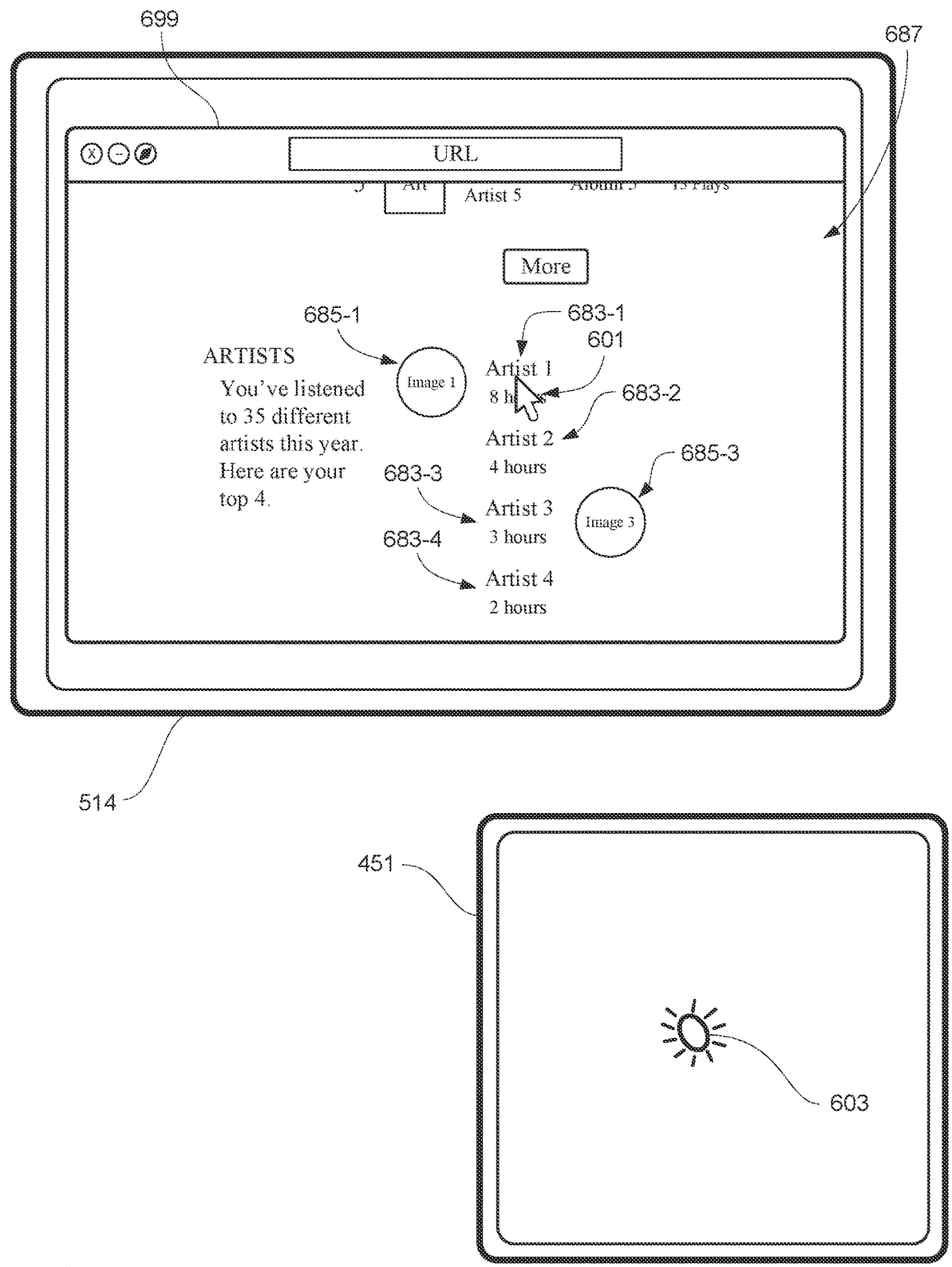
Figure 6Q:
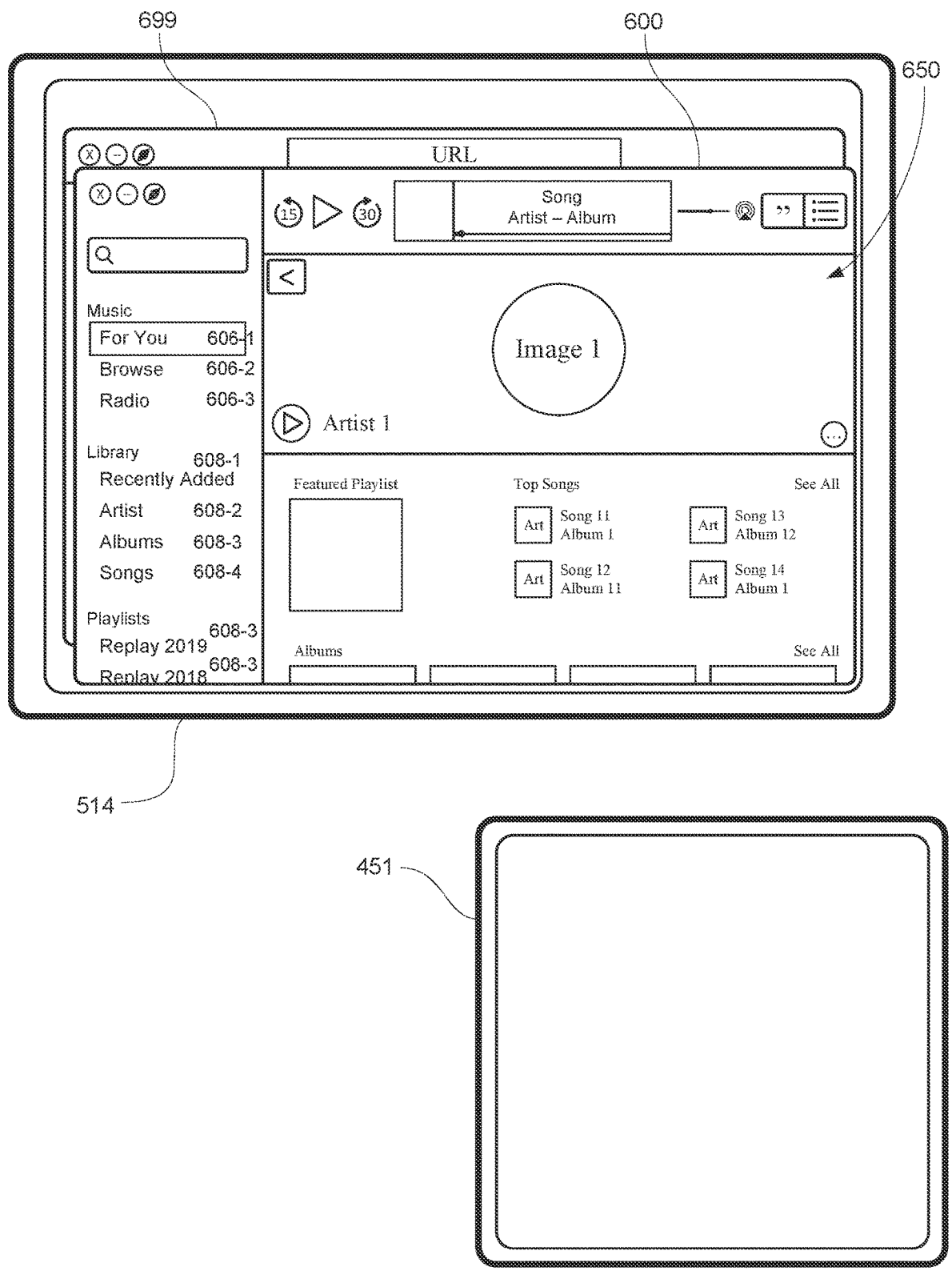
Figure 7A:
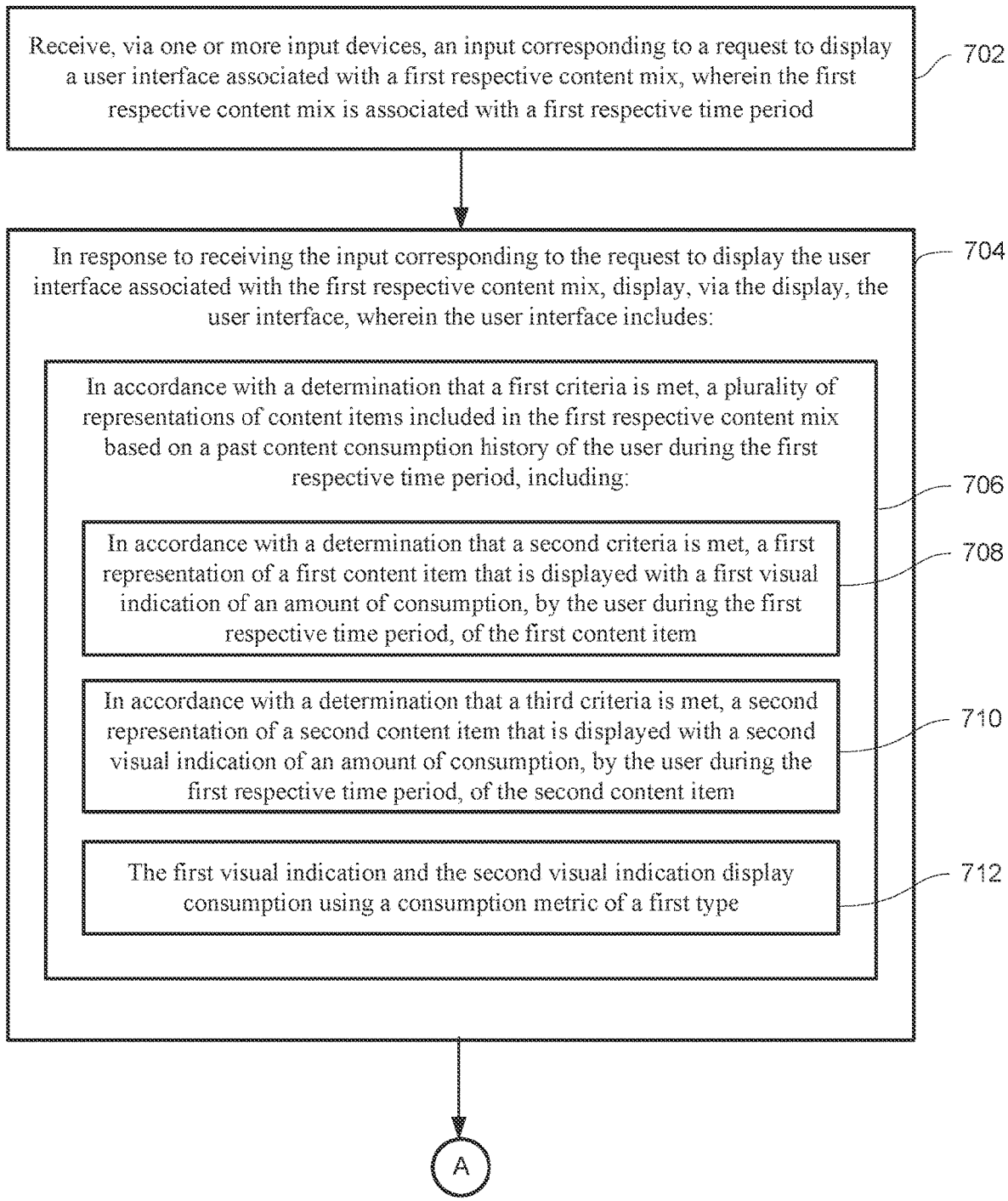
Figure 7B:
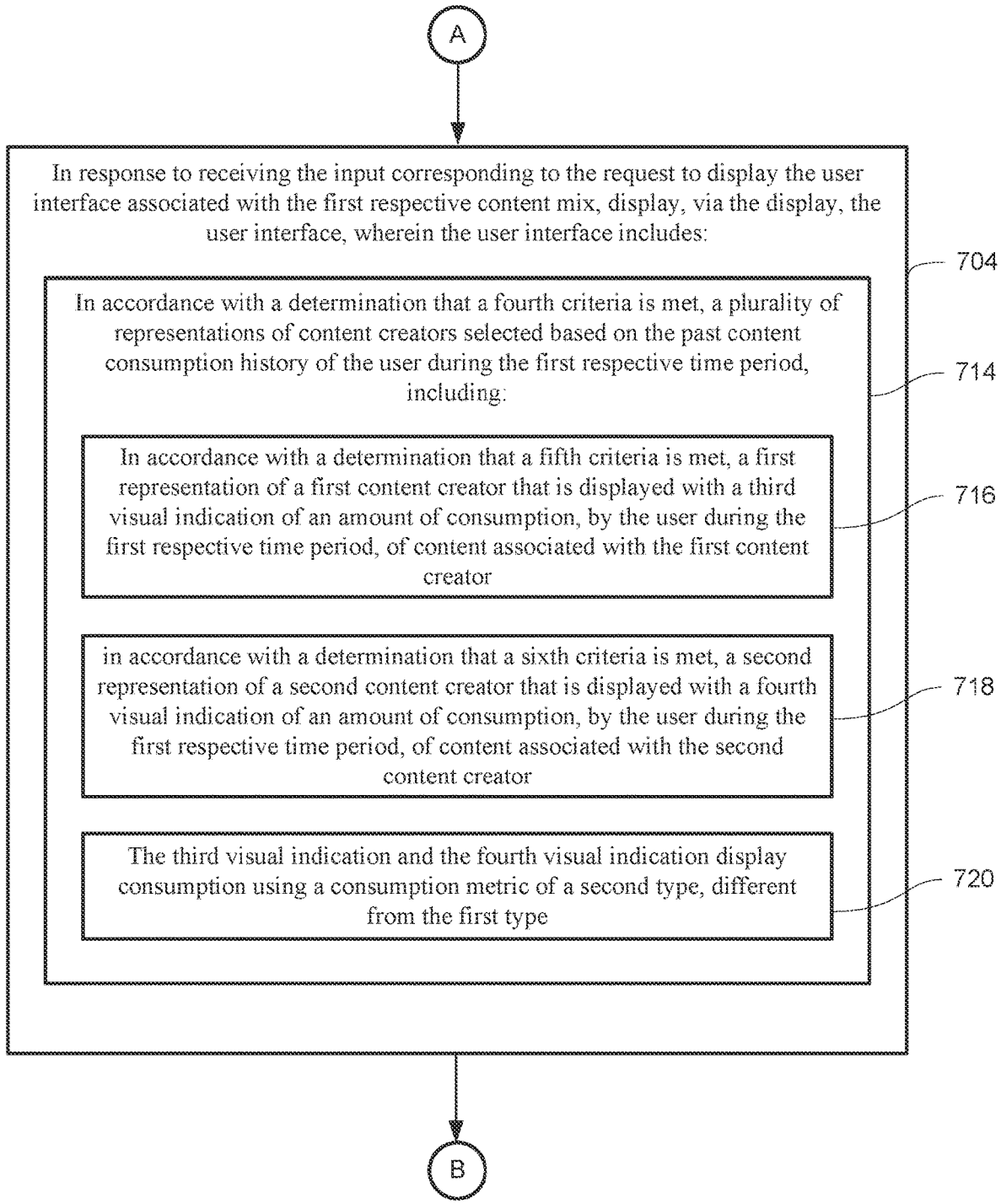
Figure 7C:
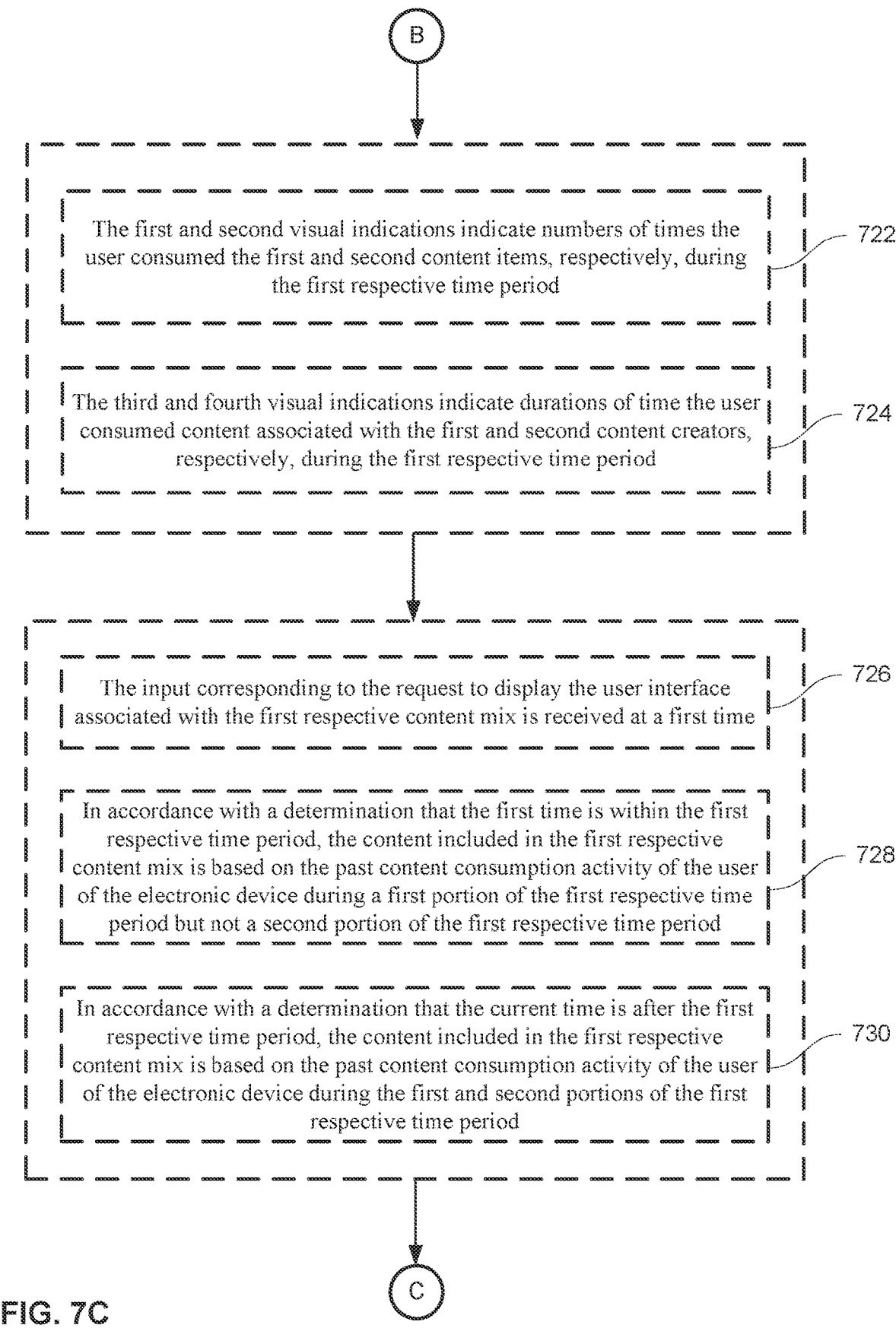
Figure 7D:
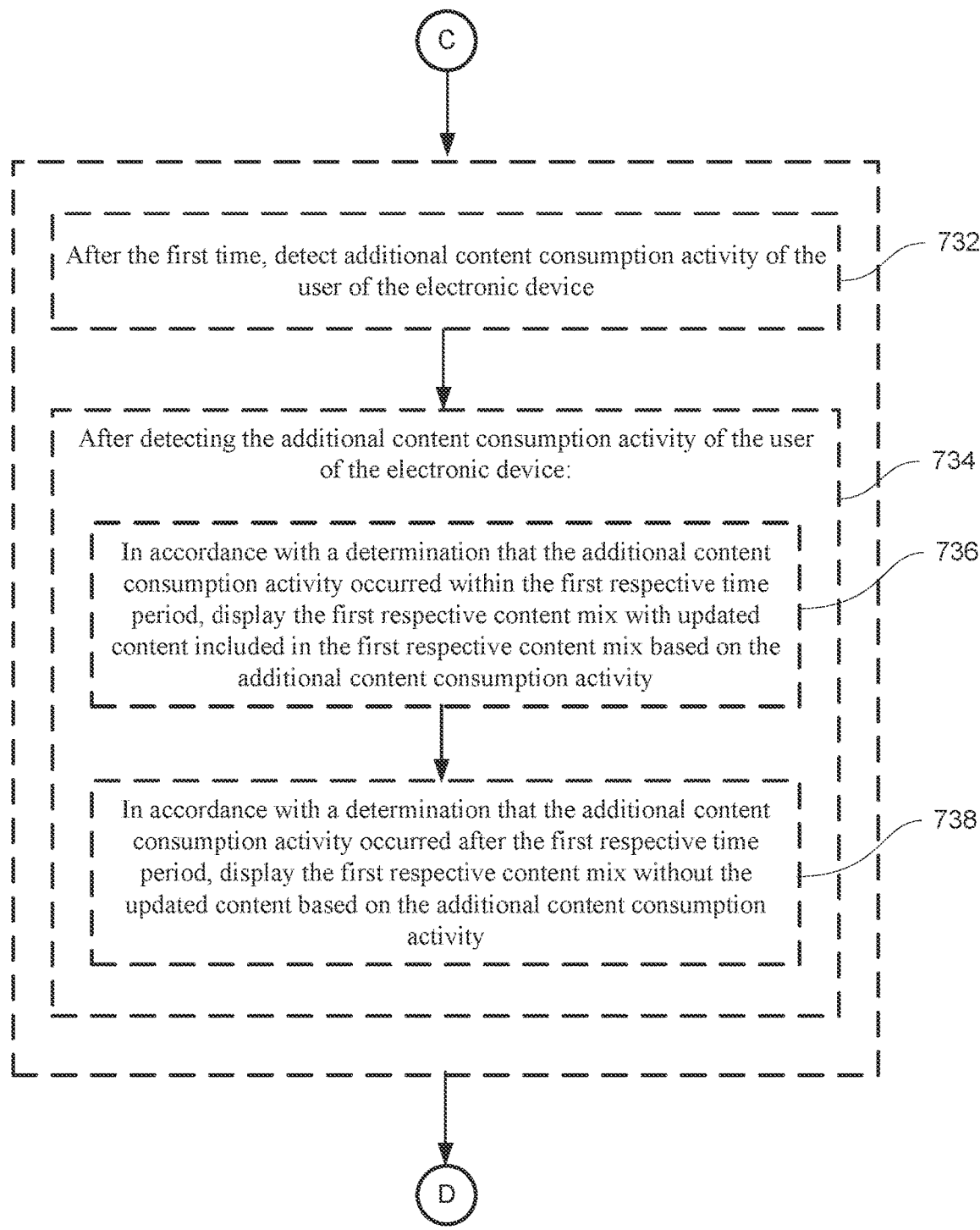
Figure 7E:
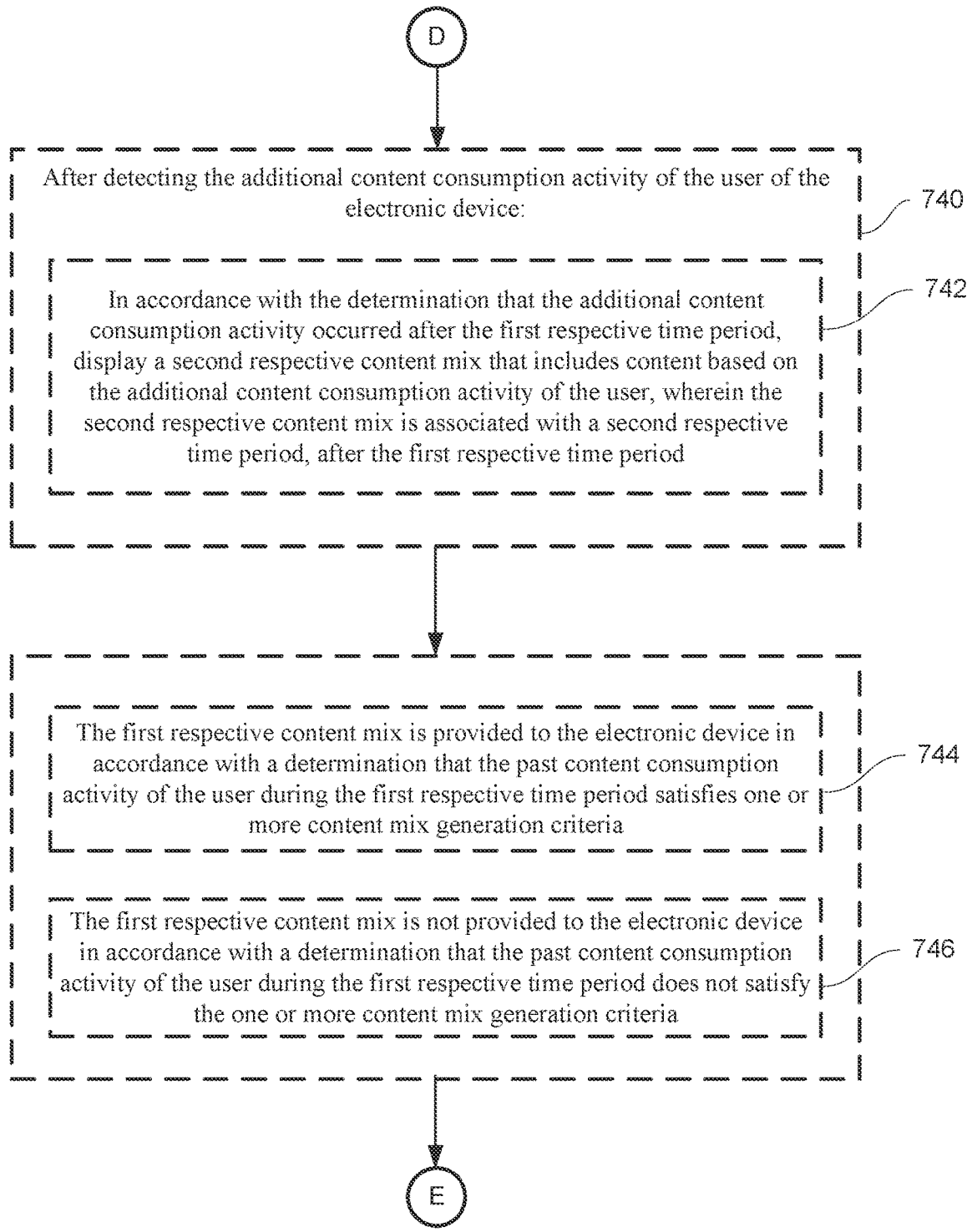
Figure 7F:
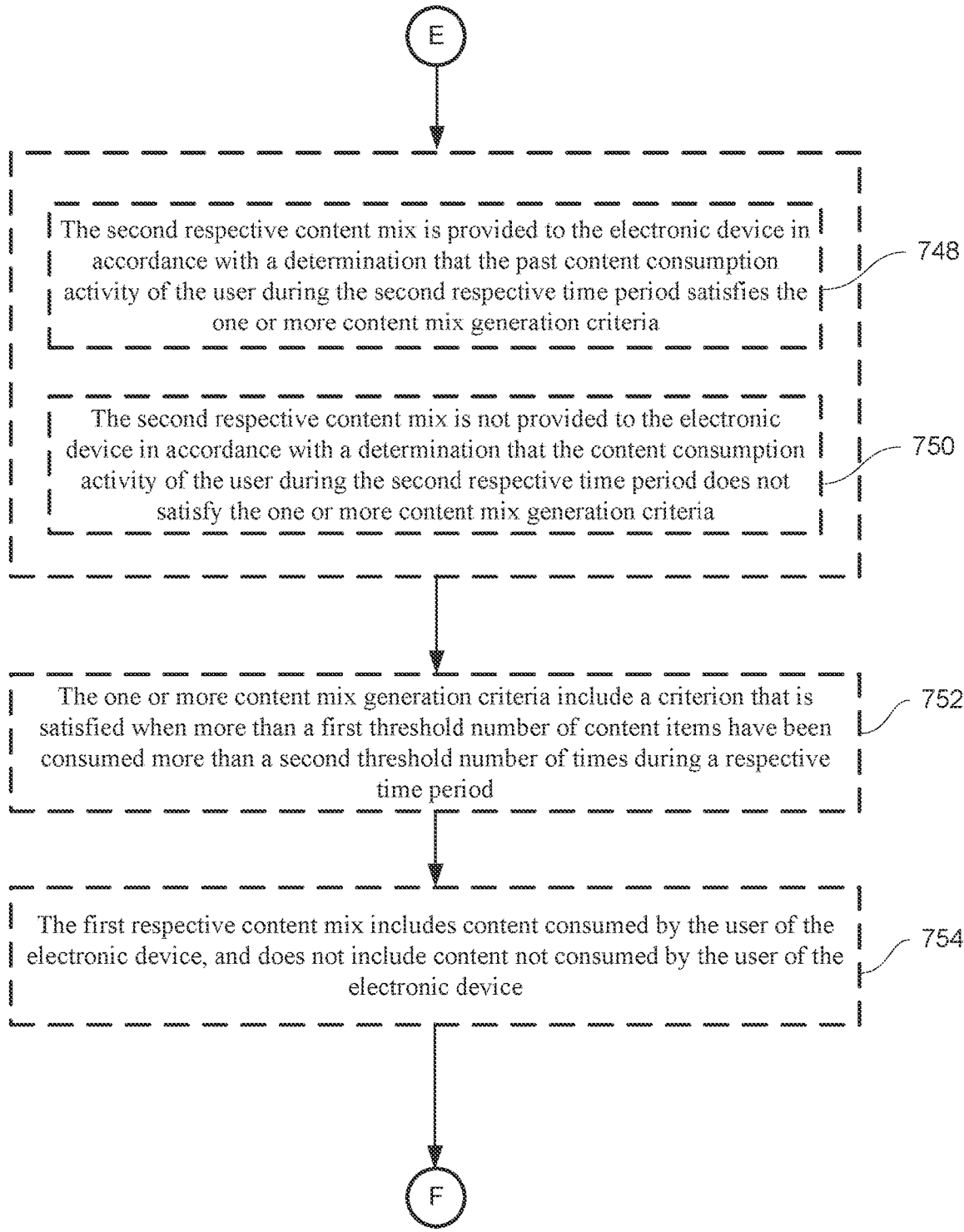
Figure 7G:
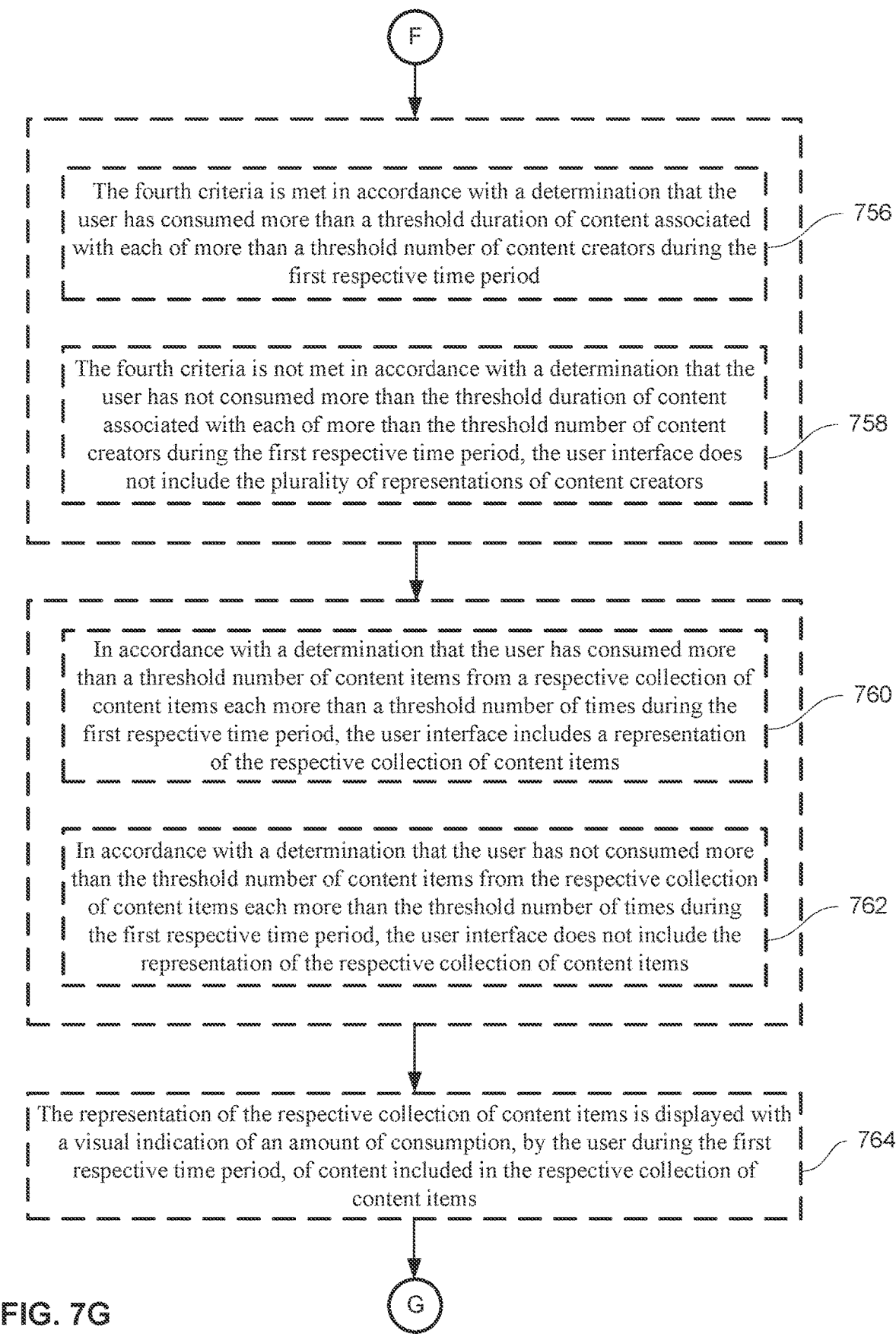
Figure 7H:
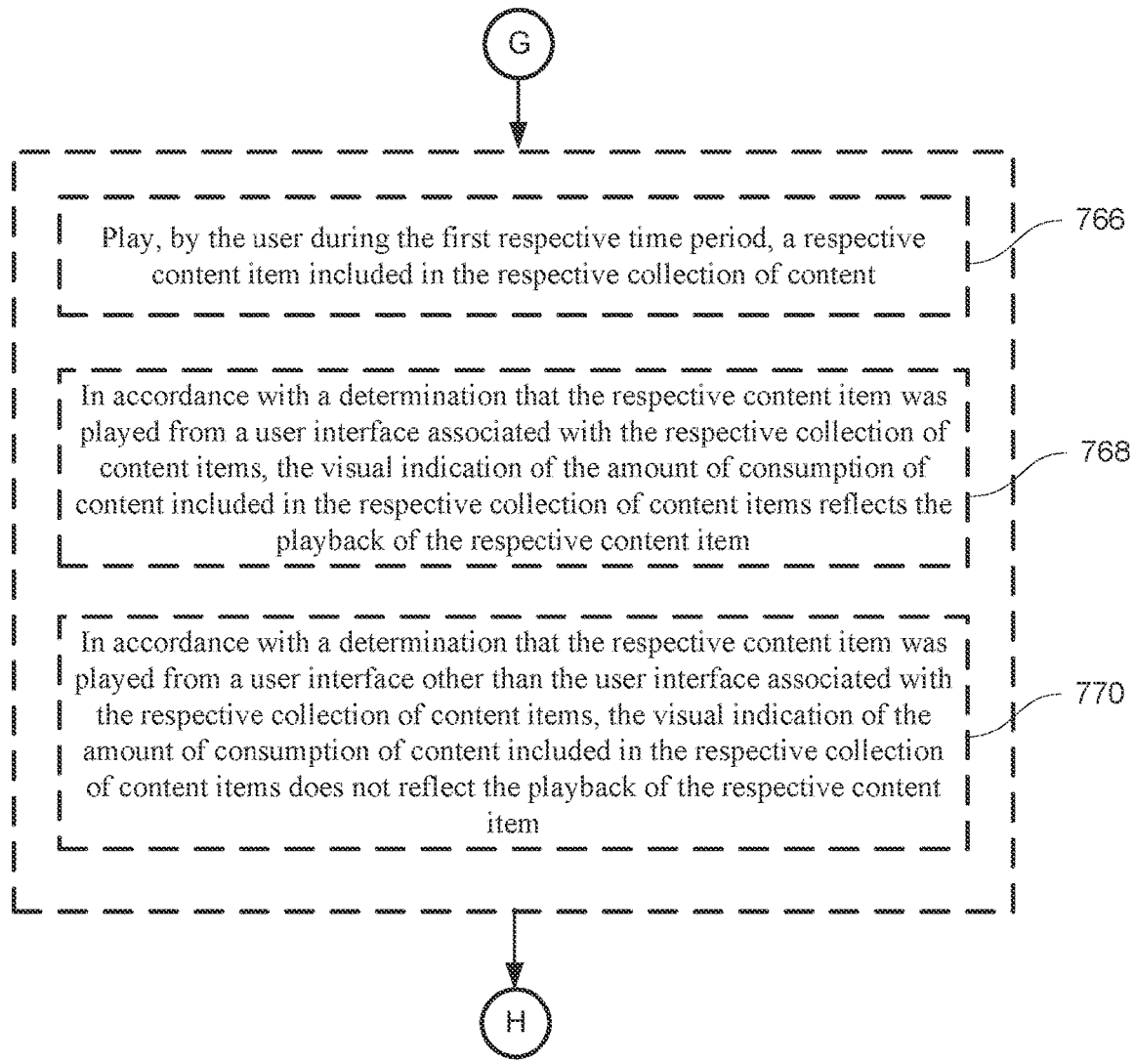
Figure 71:
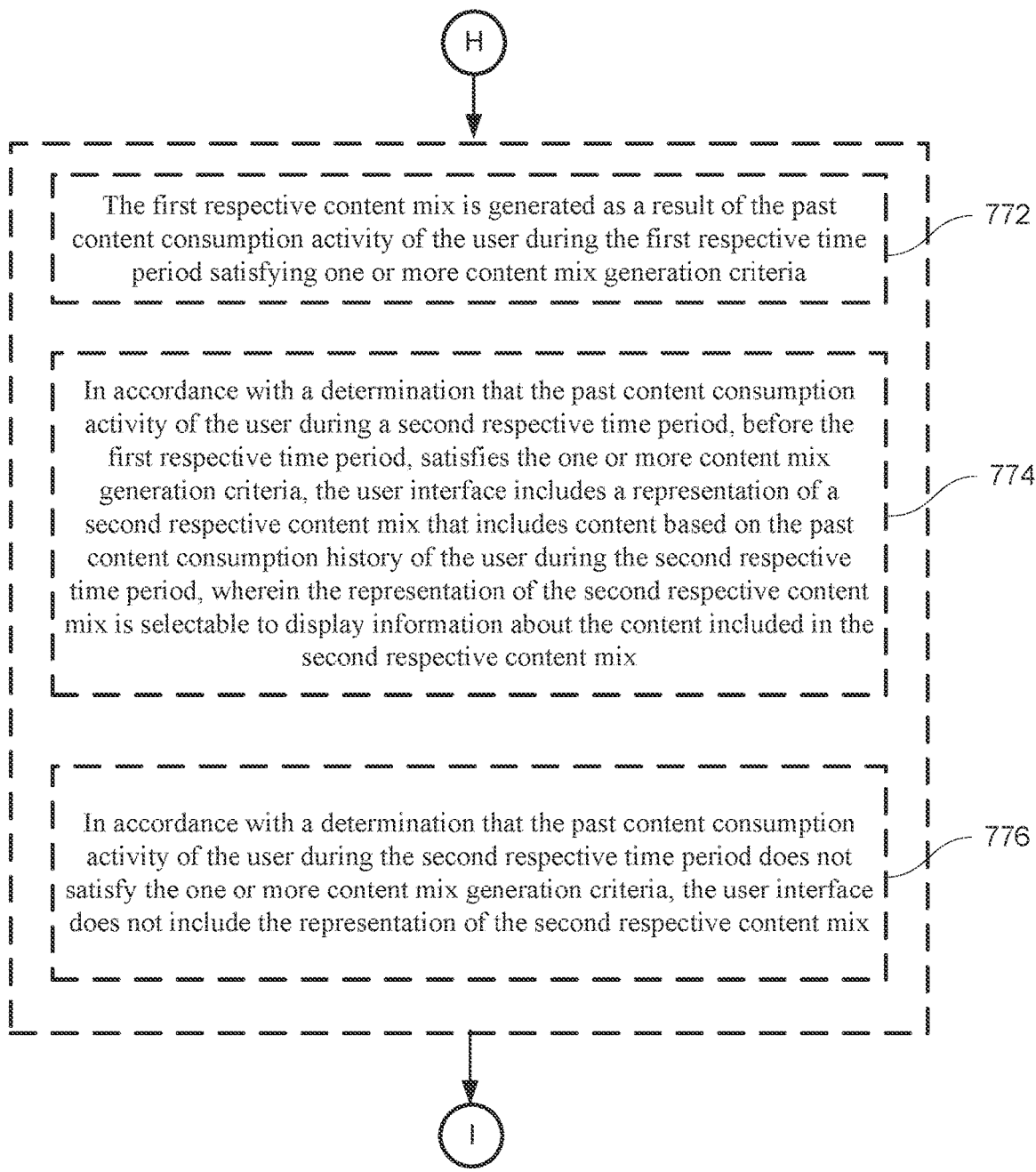
Figure 7J:
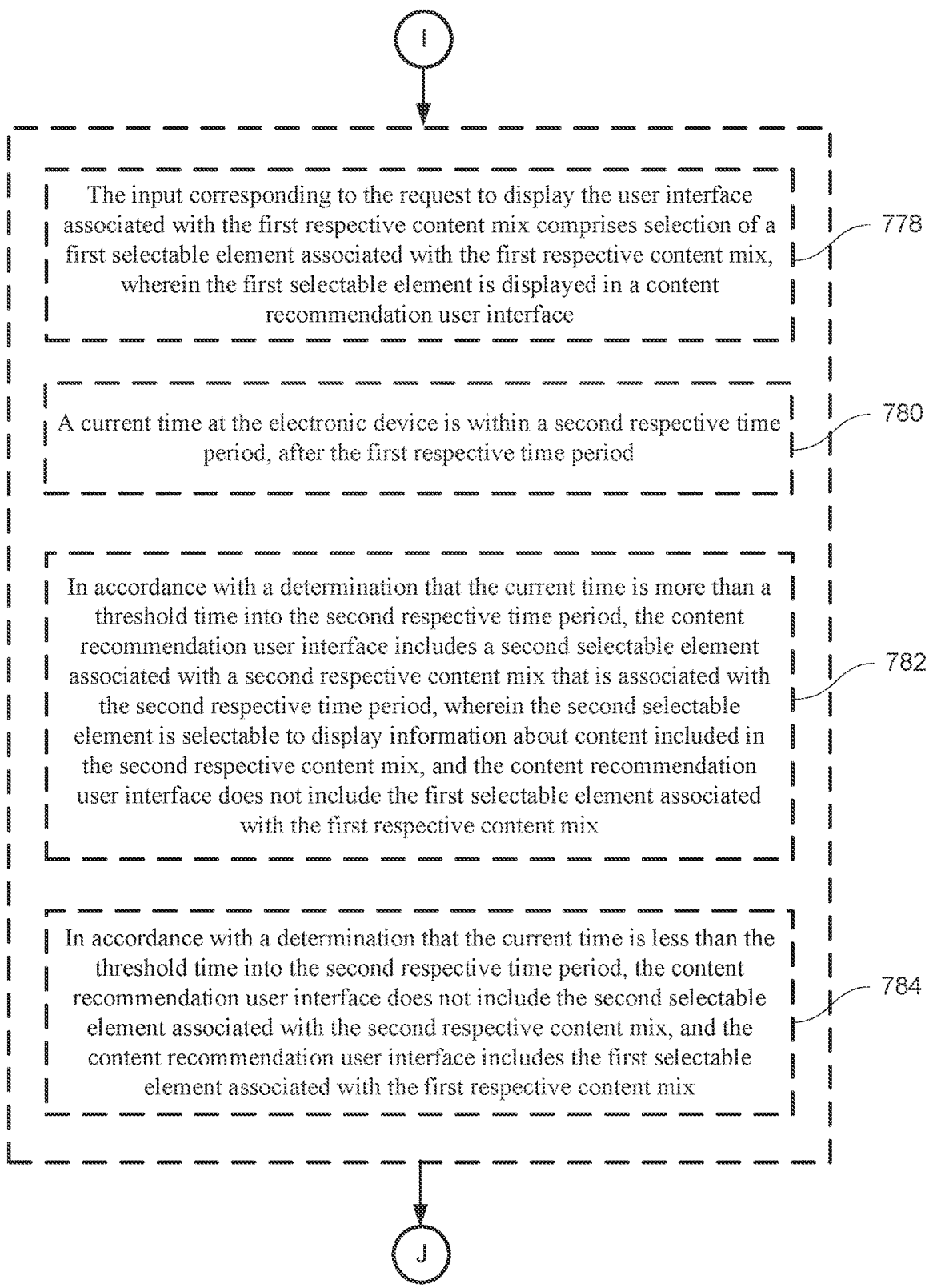
Figure 7K:
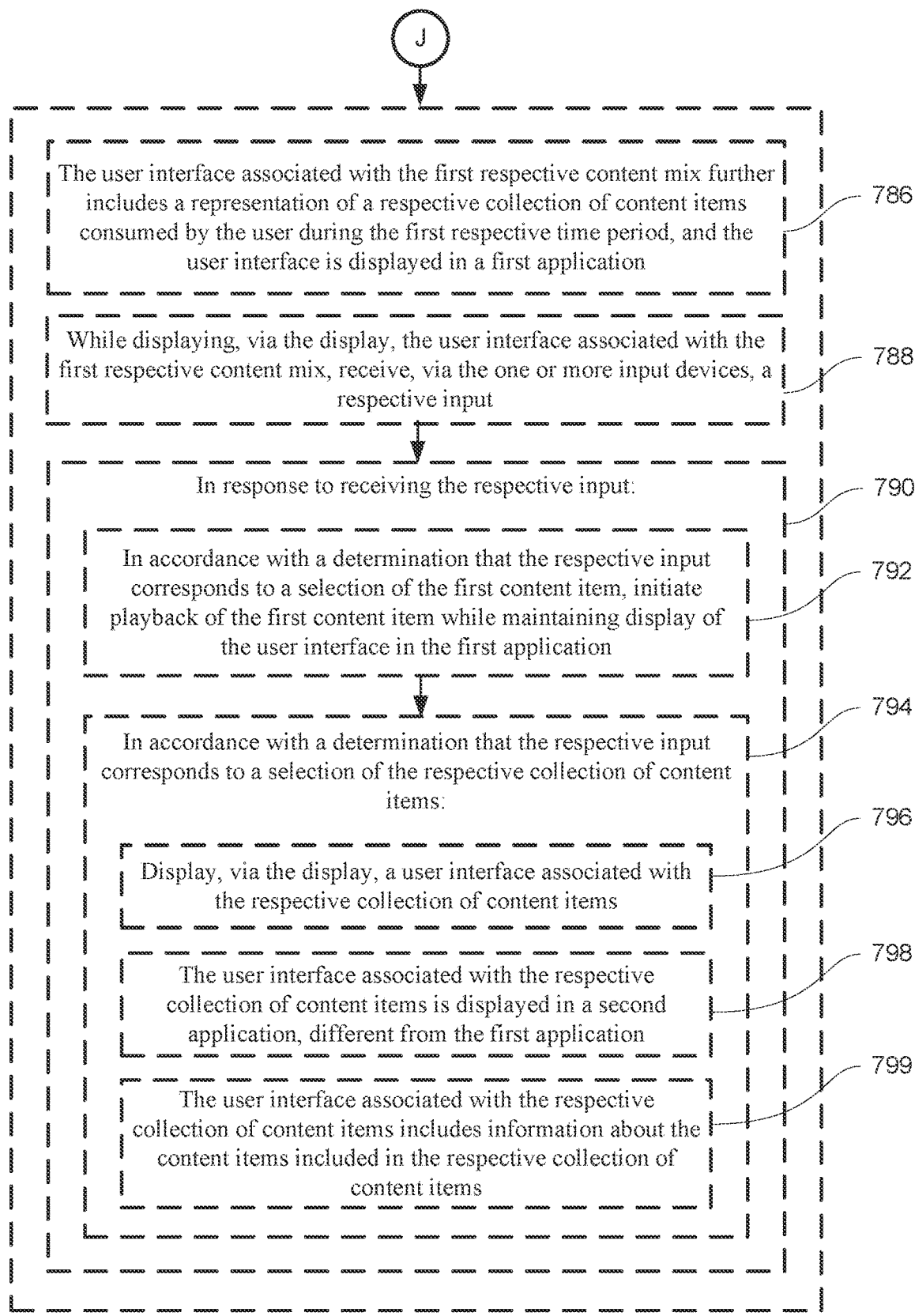

In some embodiments, the banner indicating that a replay mix has been generated is selectable to view the replay mix. For example, in FIG. 6F, the current date is Mar. 1, 2019 (e.g., satisfying the date criteria) and the user has sufficient content consumption for 2019 (e.g., satisfying the content consumption criteria), and banner 630 is displayed on user interface 620. In FIG. 6F, a user input 603 is received selecting banner 630. In some embodiments, in response to the user input, music playback application 600 displays the replay mix for 2019 in the content browsing region, as shown in FIG. 6G.

In FIG. 6G, user interface 620 is displaying the replay mix for 2019. In some embodiments, as described above, the replay mix for 2019 is an automatically generated playlist of the user's most listened to songs for 2019. In some embodiments, if the current date is still within 2019, then the replay mix is an automatically generated playlist of the user's most listened to songs of the year-to-date. In some embodiments, the list of songs is sorted by most listened-to to least listened-to. In some embodiments, for a song to be included in the replay mix, the user must have listened to the respective song at least a threshold number of times (e.g., 2 times, 3 times, 5 times, 10 times). Thus, for example, the replay mix only includes and ranks songs that the user has listened to at least three times in 2019. In some embodiments, the replay mix is updated weekly, which includes changing the order of the replay mix and/or changing the songs that are included in the replay mix as 2019 progresses. In some embodiments, the replay mix is fixed when the relevant period ends. For example, on Jan. 1, 2020, the replay mix for 2019 becomes fixed and will no longer be automatically updated or changed.

In some embodiments, the user interface for the 2019 replay mix includes more content than just the list of songs included in the replay mix, as will be described in more detail below. As shown in FIG. 6G, the user interface for the 2019 replay mix includes the title and the description of the replay mix and selectable options 636 and 638 (e.g., buttons). In some embodiments, selectable options 636 and 638 are selectable to add the replay mix to the user's library and to begin playback of the replay mix, respectively, as will be described in further detail below. In some embodiments, the user interface for the 2019 replay mix includes a graphic/image 634 representing the 2019 replay mix.

As shown in FIG. 6G, the user interface for the 2019 replay mix includes the list of songs included in the replay mix sorted by the number of plays for each song. For example, entry 640-1 corresponding to the first entry on the replay mix indicates the song that the user has listened to the most so far in 2019 (if the current date is still within 2019 and the replay mix is still being updated) or during all of 2019 (if the current date is past 2019 and the replay mix is fixed). In some embodiments, entry 640-1 includes a graphic/image 642-1 of the album or song art of the respective song (e.g., song 1), description 644-1 of the title and/or artist of the song, description 646-1 of the album of the song, and play count 648-1. In some embodiments, play count 648-1 indicates how many times the user has listened to the respective song during the relevant period (e.g., 2019 to-date if the current date is within 2019 or all of 2019 if past 2019). In some embodiments, one "play count" is considered a full playback of the song (from beginning to the end). In some embodiments, one "play count" is considered a playback of a threshold amount of the song (e.g., 50% of the song, 75% of the song, 90% of the song, etc.). In FIG. 6G, the user interface includes entry 640-2 corresponding to the second entry on the replay mix indicating the song that the user has listened to the second most. Entry 640-2 includes a graphic 642-2 of the album or song art of the second song, description 644-2 of the title and/or artist of the song, description 646-2 of the album of the song, and play count 648-2.

In FIG. 6H, a user input 603 is received selecting selectable option 636. In some embodiments, in response to the user input, music playback application 600 adds the 2019 replay mix to the user's library and/or playlist list, as shown in FIG. 6I. In FIG. 6I, a "Replay 2019" playlist 608-3 has been added to the playlist section of navigation panel 602. As will be described in further detail, selecting playlist 608-3 will display the 2019 replay mix. In FIG. 6I, after the 2019 playlist mix has been added to the user's library and/or playlist list, selectable option 636 is updated from the text "Add" to "Added" and the "+" symbol is changed to a check mark. In some embodiments, the visual characteristic of selectable option 636 is changed after the playlist is added (e.g., the words are greyed out or the selectable option itself is greyed out).

In FIG. 6I, a user input 603 is received selecting selectable option 638. In some embodiments, in response to the user input, music playback application 600 begins playback of the 2019 replay mix from the top of the replay mix (e.g., from the first song in the replay mix), as shown in FIG. 6J. In FIG. 6J, playback information 612 is updated to show that "Song 1" by "Artist 1" from the "Album 1" album is now playing. In some embodiments, graphic 642-1 is updated to display an equalizer overlay that indicates that the first song in the replay mix is currently playing. In some embodiments, playback continues down through the replay mix (e.g., from the first song to the second song, etc.).

In FIG. 6K, the user has moved cursor 601 to hover over graphic 642-2. In some embodiments, in response to cursor 601 hovering over graphic 642-2, graphic 642-2 is updated to display a play icon, as shown in FIG. 6K. In FIG. 6K, a user input 603 is received selecting graphic 642-2 corresponding to entry 640-2 (e.g., "Song 2"). In some embodiments, in response to the user input, music playback application 600 ends playback of Song 1 and begins playback of Song 2, as shown in FIG. 6L. In FIG. 6L, graphic 642-1 is updated to remove the equalizer overlay and graphic 642-2 is updated to include the equalizer overlay. In some embodiments, playback continues down through the replay mix (e.g., from the second song to the third song, etc.).

In FIG. 6M, a user input 603 corresponding to an upward navigational input is received (e.g., an upward or downward swipe on a touch pad/screen, an upward or downward scroll on a scroll wheel, or a downward selection on a scroll bar). In some embodiments, in response to the navigational input, user interface 620 scrolls upwards to reveal further songs in the 2019 replay mix, as shown in FIG. 6M. In FIG. 6M, entry 640-3 through 640-5 are now shown corresponding to the third through fifth song in the 2019 replay mix. In some embodiments, the 2019 replay mix includes up to a predetermined number of songs (e.g., 50, 100, 200 different, unique songs). For example, even if the user listened to 500 songs, only the top 100 played songs will be selected for inclusion in the top songs list. In some embodiments, the user interface for the 2019 replay mix does not initially display every song in the 2019 replay mix. In some embodiments, the user interface for the 2019 replay mix initially shows only a subset of songs and the user is able to cause more songs to be displayed (e.g., initially display 5, 20, 25 songs).

For example, in FIG. 6N, a user input 603 corresponding to an upward navigational input is received (e.g., an upward or downward swipe on a touch pad, an upward or downward scroll on a scroll wheel, or a downward selection on a scroll bar). In some embodiments, in response to the navigational input, user interface 620 scrolls upwards to reveal selectable option 641 (e.g., button), as shown in FIG. 6N. Selection of selectable option 641 causes more entries from the 2019 replay mix to be displayed on the user interface. Thus, the user interface initially only includes a predetermined number of songs (e.g., 5 songs, 10 songs, 20 songs, 25 songs, etc.), and the user can select an option to display more songs.

For example, in FIG. 6O, a user input 603 is received selecting selectable option 641. In some embodiments, in response to the user input, user interface 620 displays more entries of songs in the 2019 replay mix, as shown in FIG. 6P (e.g., entry 640-6 and below). In FIG. 6Q, a user input 603 corresponding to an upward navigational input is received (e.g., an upward or downward swipe on a touch pad, an upward or downward scroll on a scroll wheel, or a downward selection on a scroll bar). In some embodiments, in response to the navigational input, user interface 620 scrolls upwards to reveal further songs in the 2019 replay mix, as shown in FIG. 6Q.

As shown in FIG. 6Q, navigating past the songs on the 2019 replay mix reveals other content relevant to the user's playback history during the relevant period. For example, in FIG. 6Q, user interface 620 includes top artists section 643. In some embodiments, top artists section 643 is only displayed on user interface 620 if the top artists criteria is satisfied. The top artists criteria optionally include a requirement that the user listen to content (e.g., songs) from a threshold number of artists (e.g., 3 artists, 5 artists, 10 artists, etc.) for at least a threshold amount of time (e.g., 1 hour, 3 hours, 5 hours, 10 hours). For example, the top artists criteria is satisfied if the user has listened to an hour of content from at least three artists each and not satisfied if the user has not listened to an hour of content from at least three artists each. In some embodiments, if the user has listened to content from an artist for at least an hour, then the respective artist is eligible to be included in the top artist list. In some embodiments, the top artist list includes up to a predetermined number of top artists (e.g., 10, 15, 30, 50 artists). For example, even if the user listened to 100 artists for at least an hour each, only the top 10 listened-to artists will be selected for inclusion in the top artists list. Similar to the top songs list, the top artist list optionally initially displays a subset of the top artist list (e.g., 2, 5, 7, etc. artists) and a user is able to cause further artists to be displayed. It is understood that "listening to an artist" includes "listening to content from that artist."

In some embodiments, top artists section 643 includes a list of the user's most listened-to artists, sorted from most listened-to to least listened-to. Each entry on the list includes a description of the artist including the name and the amount of time that the user has listened to the respective artist. For example, in FIG. 6Q, entry 647-1 corresponds to Artist 1 and indicates that the user has listened to eight hours of music from "Artist 1". In some embodiments, entry 647-1 includes an image 645-1 of the artist. In some embodiments, not each entry includes an image of the respective artist.

In FIG. 6R, a user input 603 corresponding to an upward navigational input is received (e.g., an upward or downward swipe on a touch pad, an upward or downward scroll on a scroll wheel, or a downward selection on a scroll bar). In some embodiments, in response to the navigational input, user interface 620 scrolls upwards to reveal further entries of artists in the top artists list, as shown in FIG. 6R. In FIG. 6R, user interface 620 displays entry 647-2, 647-3 and 647-4 corresponding to Artist 2, Artist 3, and Artist 4. Artist 2 corresponds to a second most listened-to artist, Artist 3 corresponds to the third most listened-to artist, and Artist 4 corresponds to the fourth most listened-to artist. In some embodiments, an image is not displayed for each entry. In some embodiments, an image is displayed for every other artist entry (e.g., entry 647-1 and 647-3). In some embodiments, the artist images are displayed on alternating sides. For example, image 645-1 is on the left side of entry 647-1 and image 645-3 is on the right side of entry 647-3. In some embodiments, each entry is selectable to display a user interface for the respective artist.

In FIG. 6S, a user input 603 is received selecting entry 647-1 corresponding to Artist 1. In some embodiments, in response to the user input, music playback application 600 displays user interface 650 in the content browsing region corresponding to Artist 1, as shown in FIG. 6T. User interface 650 includes an image 652 of the artist, a play button 654, the name of the artist 656, and content from the artist. In some embodiments, play button 654 is selectable to begin playback of the artist's top songs. In some embodiments, user interface 650 includes a featured playlist 658 by the artist and the artist's top songs (e.g., songs 660-1 to 660-4). In some embodiments, user interface 650 further includes a list of the artist's albums. In some embodiments, user interface 650 includes other content and information associated with the artist.

Returning to the user interface for the 2019 replay mix, FIG. 6U illustrates user interface 620 scrolled further downwards. In FIG. 6U, the bottom of the artists section 643 includes a selectable option 649 to display more artists in the top artists list, similar to selectable option 641. In FIG. 6U, user interface 620 includes top albums section 662. In some embodiments, top albums section 662 is only displayed on user interface 620 if the top albums criteria are satisfied. The top albums criteria include a requirement that the user listen to at least a threshold number of songs (e.g., 2 songs, 3 songs, 5 songs, etc.) from at least a threshold number of albums (e.g., 3 albums, 5 albums, 10 albums, 20 albums, etc.). For example, the top albums criteria are satisfied if the user has listened to at least three different songs on ten albums, each, and not satisfied if the user has not listened to three different songs on ten different albums. In some embodiments, the top albums list includes at most a predetermined number of top albums (e.g., 10, 15, 30, 50 albums). In some embodiments, what is considered to be one "play" of an album includes listening to at least a threshold amount of different songs (e.g., 3 songs, 5 songs, 8 songs, etc.) from the album in one session. A session optionally refers to one continuous playback sequence (e.g., without interrupting the playback with playback of a song that is not on the album). In some embodiments, listening to at least a threshold amount of different songs from the album across multiple sessions is considered one "play" of the album (e.g., listening to a first track, then interrupting playback to listen to other songs that are not on the album, and then returning to the album at a different time to listen to the second and third track). In some embodiments, listening to a threshold number of songs in one session, and then listening to a non-overlapping set of songs in another session counts as a single "play" of the album (e.g., listening to the first three tracks in an album in one session, then returning and listening to the fourth through seventh song in the album in another session). In some embodiments, listening to a threshold number of songs in one session, and then listening to a non-overlapping set of songs in another session counts as two "plays" of the album. Thus, in some embodiments, if the user has performed a threshold amount of "plays" of an album (e.g., 1, 3, 5, etc.), then the respective album is eligible to be included in the top albums list. Once the user has had at least one "play" of at least a threshold number of albums (e.g., 5 albums, 10 albums, 20 albums, etc.), then the top albums criteria is satisfied and a top albums section 662 is displayed on user interface 620.

In some embodiments, only playback of the songs from an album in a particular manner is considered to be a proper "play" of the album. For example, playback of the album via a user interface specific for the album (e.g., the album's page) is considered a proper "play" of the album. In some embodiments, playback of the album by selecting a play icon on the album's cover art is considered a proper "play" of the album. In some embodiments, playback of songs in an album that are included in a user generated playlist are not considered a proper "play" of the album. For example, if the user creates a custom playlist and includes all the songs from a particular album in the correct order, playback of the playlist is optionally not considered a proper "play" of the album. In another example, if the user creates a custom playlist and includes at least three songs from a particular album, playback of the entire playlist is also not considered a proper "play" of the album.

In some embodiments, top albums section 662 includes a list of the user's most listened-to albums, sorted from most listened-to to least listened-to. In some embodiments, the top albums list includes up to a predetermined number of albums (e.g., 5, 10, 20, etc. albums). For example, even if the user listened to at least three songs from 100 albums, only the top 10 listened to albums will be selected for inclusion in the top albums list. Each entry on the list includes a description of the album including the cover art of the album, the name of the album, the name of the artist, and the number of times the user has played the respective album. For example, in FIG. 6V, entry 668-1 includes cover art 664-1 and corresponds to Album 3 from Artist 3 and indicates that the user has listened to Album 3 7 times; entry 668-2 includes cover art 664-2 and corresponds to Album 2 from Artist 2 and indicates that the user has listened to Album 2 5 times; and entry 668-3 includes cover art 664-3 and corresponds to Album 7 from Artist 7 and indicates that the user has listened to Album 7 4 times. In some embodiments, top albums section 662 initially displays a subset of the top albums list (e.g., 2, 3, 4, etc. top albums). In some embodiments, top albums section 662 is horizontally scrollable to reveal further albums in the top albums list.

In FIG. 6W, the user has moved cursor 601 to hover over cover art 664-1. In some embodiments, in response to cursor 601 hovering over cover art 664-1, cover art 664-1 is updated to display play icon 670, as shown in FIG. 6W. In FIG. 6W, a user input 603 is received selecting cover art 664-1 corresponding to Album 3 by Artist 3 (e.g., outside of play icon 670). In some embodiments, in response to the user input, music playback application 600 displays user interface 680 in the content browsing region, as shown in FIG. 6X. As shown in FIG. 6X, user interface 680 is a user interface specific for the selected album. User interface 680 includes an image 682 of the album (e.g., album cover art), the album title, the artist name, a play button, a shuffle button, an add button, a description of the album, and a list of songs 684 in the album. In some embodiments, the play button is selectable to begin playback of the album (e.g., from the first track to the last track). In some embodiments, the shuffle button is selectable to begin a shuffled playback of the album. In some embodiments, the add button adds the album to the user's library and/or playlist list.

Returning to the user interface for the 2019 replay mix, FIG. 6Y illustrates receiving a user input 603 selecting play icon 670 for Album 3. In some embodiments, in response to the user input, music playback application 600 begins playback of Album 3 (e.g., starting at the first track), as shown in FIG. 6Z. As described above, because the user is listening to Album 3 through playback of the official entry of Album 3, the user's current listening session of Album 3 is counted as a proper "play" of Album 3. Thus, as shown in FIG. 6AA, after the user continues playback of Album 3 for a threshold amount of songs (e.g., 3 songs, 5 songs, etc.), the play count for Album 3 reflects the user's play of Album 3 (e.g., the play count updates from 7 plays to 8 plays). For example, in FIG. 6AA, the user has listened to Songs 14-16 from Album 3 and just began currently playing Song 17, which in the embodiment shown in FIG. 6AA is considered a "play" of the album. It is understood that although the play count for Album 3 is described as updating in response to the user playing Album 3, the updating of the play count may be performed periodically (e.g., weekly, monthly, etc.), rather than at the time that the play occurs.

Conversely, FIGS. 6BB-6CC illustrate a situation in which playback of the songs in the album do not count as a proper play of the album. In FIG. 6BB, music playback application 600 is displaying a custom playlist that the user has created to mimic Album 3, including Songs 14, 15, and 16. In FIG. 6BB, the user has listened to Songs 14 and 15 and is completing playback of Song 16. However, as described above, because the custom playlist shown in FIG. 6BB is not the official Album 3 that is recognized by the music playback application 600, the user's playback of the customized playlist is not considered a proper "play" of Album 3 (e.g., music playback application 600 does not recognize the user's custom playlist as Album 3). In FIG. 6CC, the user has completed playback of Song 16 and is starting playback of Song 17. Thus, even though the user has listened to three songs from Album 3 (e.g., thus would otherwise be considered a "play" of Album 3 in the embodiment shown in FIG. 6CC), because playback occurred within the customized playlist rather than from an official album or album user interface, the play count of Album 3 is not increased to reflect the playback of the three songs from Album 3. In FIG. 6CC, the play count of Album 3 remains at 8 plays and is not incremented to 9 plays. Thus, as described above, in some embodiments, for playback of an album to be considered a play that is reflected in the play count for an album on the user interface for the replay mix, the playback must occur from an official album listing or user interface.

In FIG. 6DD, a user input 603 corresponding to an upward navigational input is received (e.g., an upward or downward swipe on a touch pad, an upward or downward scroll on a scroll wheel, or a downward selection on a scroll bar). In some embodiments, in response to the navigational input, user interface 620 scrolls upwards to reveal previous replay mixes section 672, as shown in FIG. 6DD. In some embodiments, previous replay mixes section 672 is only displayed on user interface 620 if there are previous replay mixes available. For example, if replay mixes have been generated for the user for certain years (e.g., satisfying the replay mix generation criteria for those years), then previous replay mixes section 672 is displayed and the available replay mixes are displayed in previous replay mixes section 672. If, however, no previous replay mixes exist (e.g., the user has never satisfied the replay mix generation criteria), then user interface 620 does not include a previous replay mixes section 672.

As shown in FIG. 6DD, previous replay mixes section 672 includes entry 674-1 corresponding to the replay mix for 2018, entry 674-2 corresponding to the replay mix for 2016, and entry 674-3 corresponding to the replay mix for 2015 (e.g., the user's content consumption activity in 2017 did not satisfy replay mix generation criteria for 2017). In some embodiments, the previous replay mixes are displayed reverse chronologically (e.g., from most recent to least recent). In some embodiments, the previous replay mixes section 672 is horizontally scrollable to reveal more previous replay mixes. In some embodiments, each entry includes a graphic and/or a selectable option to add the respective replay mix to the user's library and/or playlist list. For example, entry 674-1 includes a graphic representation of the 2018 replay mix and selectable option 675-1, entry 674-2 includes a graphic representation of the 2016 replay mix and selectable option 676-2, and entry 674-3 includes a graphic representation of the 2015 replay mix and selectable option 676-3. In response to the user selecting selectable options 676-1, 676-2, and 676-3, the selectable option is updated from "Add" and the plus sign to "Added" and a checkbox. In some embodiments, the visual characteristic of the selectable option changes when the replay mix is added (e.g., the content is greyed or the selectable option is greyed). For example, as shown in FIG. 6DD, the user has added the replay mix for 2018 to the user's library, but not the replay mixes for 2016 and 2015.

As shown in FIG. 6DD, the replay mix generation criteria is not satisfied for 2017, but is satisfied for 2018, 2016, and 2015. Thus, previous replay mixes section 674 includes an entry for 2018, 2016, and 2015, but no entry for 2017. In some embodiments, selection of the replay mix graphic representation causes music playback application 600 to display a user interface for the respective replay mix in the content browsing region. In some embodiments, selection of the graphic causes display of a user interface similar to the user interface described above for 2019 (e.g., including the top songs section, top artists section, top albums section, and/or the previous replay mixes section). In some embodiments, selection of the graphic causes display of a user interface for only the top songs of the respective replay mix (e.g., not including the top artists section, top albums section, or previous replay mixes section), similar to user interface 690 described below with respect to FIG. 6FF. In some embodiments, hovering a cursor over the graphic representation for a respective previous replay mix causes display of a play icon (e.g., similar to play icon 670 described above with respect to FIG. 6Y) to be displayed on an area of the graphic, which is selectable to cause music playback application 600 to begin playback of the respective previous replay mix.

In FIG. 6EE, a user input 603 is received selecting playlist 608-3 corresponding to the replay mix for 2019 that the user has added to the user's playlist list. In some embodiments, in response to the user input, music playback application 600 displays user interface 690 in the content browsing region corresponding to the user interface for the 2019 replay mix, as shown in FIG. 6FF.

In FIG. 6FF, user interface 690 includes an image 686 of the replay mix (e.g., the 2019 replay mix logo/graphic), the playlist title, play button 692, shuffle button 694, contextual menu button 698, optionally a description of the replay mix, a list of the songs in the replay mix, or any combination of the above. In some embodiments, play button 692 is selectable to begin playback of the replay mix (e.g., from the first track to the last track). In some embodiments, shuffle button 694 is selectable to begin a shuffled playback of the replay mix. In some embodiments, contextual button 698 is selectable to display a contextual menu for interacting with the replay mix (e.g., remove the replay mix, share the replay mix, like the replay mix, etc.). In some embodiments, the list of songs in the replay mix is the same list of songs described above with respect to FIGS. 6G-6Q. In FIG. 6FF, user interface 690 is vertically scrollable to display more songs in the replay mix. In some embodiments, the replay mix includes up to a predetermined amount of songs (e.g., 50 songs, 100 songs, 200 songs, etc.). In some embodiments, user interface 690 lists all songs in the replay mix, without requiring the user to select a "More" selectable option to display more songs in the replay mix (such as in FIG. 6O). In some embodiments, user interface 690 does not include a top artists section, top albums section, or a previous playlist mixes section.

In some embodiments, as described above, the replay mix is updated constantly or periodically during the relevant period. For example, user interface 690 corresponds to the 2019 replay mix. Thus, while the current date is within 2019, the replay mix is updated to reflect changes in the user's playback history (e.g., number of times the user listened to particular songs). For example, in FIG. 6FF, the current date is Nov. 1, 2019. Thus, the top three songs in the user's 2019 replay mix is Song 1 with 35 plays so far in 2019 (e.g., entry 688-1), Song 2 with 27 plays so far in 2019 (e.g., entry 688-2), and Song 3 with 25 plays so far in 2019 (e.g., entry 688-3).

In FIG. 6GG, the current date progressed to Dec. 1, 2019 (from Nov. 1, 2019). Thus, user interface 690 for the 2019 replay mix includes the user's playback activity from November 1 to December 1 (in addition to the user's playback activity from January 1 to November 1 in 2019). For example, in FIG. 6GG, entry 688-1 has been updated to indicate that Song 1 has been listened to 48 times (e.g., the user has listened to Song 1 13 times from November 1 to December 1). Entry 688-2 has been updated to indicate that the second-most played song is now Song 3 by Artist 3 from Album 3 (e.g., instead of Song 2) with 37 plays (e.g., the user has listened to Song 3 12 times from November 1 to December 1). Entry 688-3 has been updated to indicate that the third-most played song is now Song 2 (e.g., instead of Song 3) with 30 plays (e.g., the user has listened to Song 2 3 times from November 1 to December 1). Thus, as shown, while the current time is still within the relevant period of the replay mix (e.g., 2019), the replay mix updates to reflect the user's playback activity during the relevant period.

In FIG. 6HH, the current date progressed to Jan. 1, 2020 (from Dec. 1, 2019). Thus, the relevant period has just ended and the 2019 replay mix has become fixed. Thus, user interface 690 for the 2019 replay mix includes the user's playback activity from December 1 to December 31. For example, in FIG. 6HH, entry 688-1 has been updated to indicate that Song 1 has been listened to 63 times (e.g., the user has listened to Song 1 15 times from December 1 to December 31). Entry 688-2 has been updated to indicate that Song 3 is still the second-most played song with 45 plays (e.g., the user has listened to Song 3 8 times from December 1 to December 31). Entry 688-3 has been updated to indicate that the third-most played song is now Song 8 (e.g., instead of Song 2) with 41 plays. Thus, the replay mix becomes fixed on Dec. 31, 2019 or Jan. 1, 2020 and is no longer automatically updated or changed.

For example, in FIG. 6II, the current date has progressed to Feb. 1, 2020 (from Jan. 1, 2020). However, because Jan. 1, 2020 to Feb. 1, 2020 is not in the relevant period for the 2019 replay mix, any playback of music during this period does not have any effect on the 2019 replay mix (but optionally would have an effect on the 2020 replay mix). Thus, in FIG. 6II, user interface 690 corresponding to the 2019 replay mix displays the same list of songs, in the same order with the same play counts, as in FIG. 6HH (e.g., on Jan. 1, 2020).

FIGS. 6JJ-6QQ illustrate a music playback interface displayed in a web browser application 699 (e.g., a user interface displayed by the web browser application 699). For example, a user can navigate, using a web browser, to a particular website to access a similar music playback service as described above with respect to FIGS. 6A-6II. For example, in FIG. 6JJ, browser 699 is navigated to a music playback website 697. In some embodiments, music playback website 697 includes a row of available songs (e.g., song 695-1, 695-2, and 695-3) and a row of featured playlists (e.g., playlist 693-1, 693-2, and 693-3). In some embodiments, music playback website 697 can include any or all of the elements of music playback application 600 described above including a music playback region, a navigation panel, and a content browsing region. For simplicity, FIG. 6JJ illustrates only a content browsing region.

In FIG. 6KK, a user input 603 corresponding to an upward navigational input is received (e.g., an upward or downward swipe on a touch pad, an upward or downward scroll on a scroll wheel, or a downward selection on a scroll bar). In some embodiments, in response to the navigational input, music playback website 697 scrolls upwards to reveal further rows of content including banner 691, as shown in FIG. 6KK. In some embodiments, banner 691 is similar to banner 630 described above with respect to FIG. 6D corresponding to the 2019 replay mix. In some embodiments, banner 691 is displayed on music playback website 697 because the content consumption criteria is satisfied and the date criteria is satisfied (e.g., because the current date is Mar. 1, 2019).

In FIG. 6LL, a user input 603 is received selecting banner 691. In some embodiments, in response to the user input, music playback website 697 displays user interface 689 corresponding to the replay mix for 2019 in the content browsing region, as shown in FIG. 6MM. In some embodiments, user interface 689 is similar to user interface 620 described above with respect to FIGS. 6G-6EE, including the top songs, top artists section, top albums section, and/or previous replay mixes section.

In FIG. 6MM, a user input 603 is received selecting the graphic for song 1 (e.g., entry 687-1). In some embodiments, in response to the user input, the music playback website begins playback of Song 1, as shown in FIG. 6NN. In FIG. 6OO, a user input 603 corresponding to an upward navigational input is received (e.g., an upward or downward swipe on a touch pad, an upward or downward scroll on a scroll wheel, or a downward selection on a scroll bar). In some embodiments, in response to the navigational input, user interface 689 scrolls upwards to reveal the top artists section, similar to top artists section 643 described above, including entries 683-1 to 683-4 of the user's top four artists for 2019.

In FIG. 6PP, a user input 603 is received selecting entry 683-1 corresponding to Artist 1. In some embodiments, in response to the user input, the music playback website causes music playback application 600 to be displayed, with user interface 650 displayed in the content browsing region of music playback application 600, as shown in FIG. 6QQ. In some embodiments, user interface 650 is similar to user interface 650 described above with respect to FIG. 6T. Thus, in some embodiments, music playback website is able to cause playback of songs without launching or otherwise displaying the corresponding music playback application. In some embodiments, the music playback website launches or otherwise displays the corresponding music playback application to display certain user interfaces, such as a user interface for artists (e.g., user interface 650). In some embodiments, this functionality is not limited to just the user interface for artists and extends to user interfaces for albums or user interfaces for replay mixes themselves (e.g., detection of an input from the web browser application for viewing an album user interface (e.g., user interface 680 in FIG. 6X) causes the web browser application to launch/display the music playback application in which the album user interface is displayed, rather than displaying that user interface in the web browser application). In some embodiments, the music playback website is able to display any or all of the above-described user interfaces within the music playback website without launching or otherwise displaying the corresponding music playback application.

FIGS. 7A-7K are flow diagrams illustrating a method 700 of providing time period-based curated playlists in accordance with some embodiments of the disclosure. The method 700 is optionally performed at an electronic device such as device 100, device 300, device 500, and device 511 as described above with reference to FIGS. 1A-1B, 2-3, 4A-4B and 5A-5C. Some operations in method 700 are, optionally combined and/or order of some operations is, optionally, changed.

As described below, the method 700 provides ways to providing time period-based curated playlists. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, an electronic device (e.g., Apple TV, Mac, or iOS device) in communication with a display and one or more input devices (e.g., a mobile device (e.g., a tablet, a smartphone, a media player, or a wearable device) including a touch screen, or a computer including one or more of a keyboard, mouse, trackpad, and touch screen, or a media device in communication with a television) receives (702), via the one or more input devices, an input corresponding to a request to display a user interface associated with a first respective content mix, wherein the first respective content mix is associated with a first respective time period, such as input 603 in FIG. 6F (e.g., the first respective content mix is an automatically generated (e.g., without user input selecting which content items to include or exclude) content mix that includes one or more songs, videos, movies, etc. that the user consumed (e.g., viewed, listened to, etc.) during the first respective time period).

In some embodiments, in response to receiving the input corresponding to the request to display the user interface associated with the first respective content mix, the electronic device displays (704), via the display, the user interface, such as in FIG. 6G. In some embodiments, the user interface includes: in accordance with a determination that a first criteria is met (e.g., enough plays of enough different songs), a plurality of representations of content items included in the first respective content mix based on a past content consumption history of the user during the first respective time period (706), such as entries 640-1 and 640-2 in FIG. 6G (e.g., selectable representations of content items that are selectable to initiate playback of those content items).

In some embodiments, the plurality of representations of content items includes: in accordance with a determination that a second criteria is met (in some embodiments, the second criteria is different from the first criteria) (e.g., enough plays of the first content item), a first representation of a first content item that is displayed with a first visual indication of an amount of consumption, by the user during the first respective time period, of the first content item (708), such as entry 640-1 and play count 648-1 on FIG. 6G (e.g., album art, name, artist, etc. of the first content item that is displayed with a play count for the first content item that indicates the number of times the user played the first content item during the first respective time period) and in accordance with a determination that a third criteria is met (in some embodiments, the third criteria is different from the first and/or second criteria) (e.g., enough plays of the second content item), a second representation of a second content item that is displayed with a second visual indication of an amount of consumption, by the user during the first respective time period, of the second content item (710), such as entry 640-2 and play count 648-1 on FIG. 6G (e.g., album art, name, artist, etc. of the second content item that is displayed with a play count for the second content item that indicates the number of times the user played the second content item during the first respective time period). In some embodiments, the first visual indication and the second visual indication display consumption using a consumption metric of a first type (712), such as the number of plays as shown on FIG. 6G (e.g., the visual indications indicate how many times the content items were played/consumed by the user during the first respective time period).

In some embodiments, the plurality of representations of content items includes: in accordance with a determination that a fourth criteria is met (in some embodiments, the fourth criteria is different from the first, second, and/or third criteria) (e.g., enough plays of songs by enough different content creators), a plurality of representations of content creators (e.g., artists of songs/song albums, musicians, singers, directors of movies or television shows, etc.) selected based on the past content consumption history of the user during the first respective time period (714), such as top artists section 643 in FIG. 6R (e.g., content creators whose content the user has consumed during the first respective time period). In some embodiments, the plurality of representations of content items includes: in accordance with a determination that a fifth criteria is met (in some embodiments, the fifth criteria is different from the first, second, third, and/or fourth criteria) (e.g., enough plays of songs by the first content creator), a first representation of a first content creator that is displayed with a third visual indication of an amount of consumption, by the user during the first respective time period, of content associated with the first content creator (716), such as entry 647-1 in FIG. 6R (e.g., a photograph of the first content creator, a name of the first content creator, etc. that is displayed with a play time for the first content creator that indicates the total amount of time (e.g., duration) of content from the first content creator that the user consumed during the first respective time period), and in accordance with a determination that a sixth criteria is met (in some embodiments, the sixth criteria is different from the first, second, third, fourth, and/or fifth criteria) (e.g., enough plays of songs by the second content creator), a second representation of a second content creator that is displayed with a fourth visual indication of an amount of consumption, by the user during the first respective time period, of content associated with the second content creator (718), such as entry 647-2 in FIG. 6R (e.g., a photograph of the second content creator, a name of the second content creator, etc. that is displayed with a play time for the second content creator that indicates the total amount of time (e.g., duration) of content from the second content creator that the user consumed during the first respective time period). In some embodiments, the third visual indication and the fourth visual indication display consumption using a consumption metric of a second type, different from the first type (720), such as amount of hours listened shown in FIG. 6R (e.g., the visual indications indicate the total amount of time (e.g., duration, such as in hours or minutes) of content from the content creators consumed by the user during the first respective time period).

In some embodiments, the first respective time period is a calendar year (e.g., the year 2017, 2018 or 2019). In some embodiments, the first respective time period is a calendar month (e.g., January 2018, February 2018, or March 2018). In some embodiments, the content items selected for inclusion in the first respective content mix are those content items that the user consumed during the first respective time period that satisfy one or more criteria such as the numbers of consumption of those content items being greater than a threshold number (e.g., 10, 20, 40).

The content items are optionally content items that the user consumed during the first respective time period. In some embodiments, the album art is selectable to initiate playback of the first content item while continuing to display the user interface (e.g., without navigating away from the user interface). In some embodiments, the album art is selectable to initiate playback of the second content item while continuing to display the user interface (e.g., without navigating away from the user interface).

In some embodiments, the representations of the content creators are selectable to display user interfaces for those content creators that include information about the content creators, content items from those content creators, albums from those content creators, etc. For example, if the user consumed 4 hours of content (e.g., different songs) from content creator A during the first respective time period, the representation of content creator A is optionally displayed with a visual indication that indicates "4 hours". For example, if the user consumed 3 hours of content (e.g., different songs) from content creator B during the first respective time period, the representation of content creator B is optionally displayed with a visual indication that indicates "3 hours".

In some embodiments, the first respective content mix is like other (e.g., static or dynamic) content mixes available on the electronic device that can be added to a library of the user (or otherwise bookmarked/favorited by the user), and can be accessed via the library of the user. In contrast with other content mixes that might be available on the electronic device, the first respective content mix is optionally dynamic during the first respective time period, and optionally becomes static/fixed after the first respective time period, as described here.

In some embodiments, in response to receiving the input corresponding to the request to display the user interface associated with the first respective content mix, in accordance with a determination that the first criteria is not met, the electronic device forgoes displaying the plurality of representations of content items included in the first respective content mix. In some embodiments, in accordance with the determination that the first criteria is met and the second criteria is not met, the plurality of representations of content items does not include the first representation of the first content item. In some embodiments, in accordance with the determination that the first criteria is met and the third criteria is not met, the plurality of representations of content items does not include the second representation of the second content item.

In some embodiments, in response to receiving the input corresponding to the request to display the user interface associated with the first respective content mix, in accordance with a determination that the fourth criteria is not met, the electronic device forgoes displaying the plurality of representations of content creators. In some embodiments, in accordance with the determination that the fourth criteria is met and the fifth criteria is not met, the plurality of representations of content creators does not include the first representation of the first content creator. In some embodiments, in accordance with the determination that the fourth criteria is met and the sixth criteria is not met, the plurality of representations of content creators does not include the second representation of the second content creator.

The above-described manner of conditionally providing content item and content creator information, and appropriate corresponding consumption information, provides a quick and efficient manner of displaying and conveying information about the content consumption activity of the user during the first respective time period, which simplifies the interaction between the user and the electronic device and enhances the operability of the electronic device and makes the user-device interface more efficient (e.g., by displaying multiple categories of content consumption information in a single user interface, without requiring navigation to multiple user interfaces), which additionally reduces power usage and improves battery life of the electronic device by enabling the user to use the electronic device more quickly and efficiently. Additionally, the above-described manner of providing appropriate consumption information for content creators provides a quick and efficient manner of displaying and conveying information about the content consumption activity of the user during the first respective time period, which simplifies the interaction between the user and the electronic device and enhances the operability of the electronic device and makes the user-device interface more efficient (e.g., by displaying aggregated consumption information in meaningful groupings (e.g., content creators) without requiring display of, and navigation through, separate consumption information for separate content items in the groupings (e.g., content creators)), which additionally reduces power usage and improves battery life of the electronic device by enabling the user to use the electronic device more quickly and efficiently.

In some embodiments, the first and second visual indications indicate numbers of times the user consumed the first and second content items, respectively, during the first respective time period (722), such as play count 640-1 and 640-2 shown in FIG. 6L. In some embodiments, the third and fourth visual indications indicate durations of time the user consumed content associated with the first and second content creators, respectively, during the first respective time period (724), such as in FIG. 6R. Thus, in some embodiments, the user interface shows play count for the content items in the first respective content mix, but play time for the content creators included in the user interface.

The above-described manner of providing different metrics of content consumption for content items and content creators provides a quick and efficient manner of displaying and conveying useful and appropriate information about the quantity of content consumption activity of the user during the first respective time period, which simplifies the interaction between the user and the electronic device and enhances the operability of the electronic device and makes the user-device interface more efficient (e.g., by providing meaning consumption activity in a single user interface), which additionally reduces power usage and improves battery life of the electronic device by enabling the user to use the electronic device more quickly and efficiently.

In some embodiments, the input corresponding to the request to display the user interface associated with the first respective content mix is received at a first time (726), such as in FIG. 6F. In some embodiments, in accordance with a determination that the first time is within the first respective time period (e.g., the first respective time period is the year 2019, and the input to display the user interface was received in October 2019), the content included in the first respective content mix is based on the past content consumption activity of the user of the electronic device during a first portion of the first respective time period (e.g., January 2019 to October 2019) but not a second portion of the first respective time period (728), such as 2019 up to November 1 but not including November 2 through December 31 in FIG. 6FF (e.g., November 2019 to December 2019). In some embodiments, in accordance with a determination that the current time is after the first respective time period (e.g., the first respective time period is the year 2019, and the input to display the user interface was received in March 2020), the content included in the first respective content mix is based on the past content consumption activity of the user of the electronic device during the first and second portions of the first respective time period (730), such as all of 2019 in FIG. 6HH. For example, the first respective content mix is selected based on the content consumption activity of the user during the entirety of 2019, rather than simply a portion of 2019. Thus, in some embodiments, the content of the first respective content mix remains dynamic (e.g., can continue to change) throughout the year of 2019, but is optionally static/fixed after the year 2019.

The above-described manner of generating the content mix based on changing periods of content consumption provides a quick and efficient manner of providing the content mix to the user without requiring the user to wait for a particular time period to end, which simplifies the interaction between the user and the electronic device and enhances the operability of the electronic device and makes the user-device interface more efficient (e.g., by displaying the variable and dynamic content mix in the same user interface without requiring the user to try to find different content mixes when trying to access the content mix at different points in time in the first respective time period), which additionally reduces power usage and improves battery life of the electronic device by enabling the user to use the electronic device more quickly and efficiently and with fewer errors.

In some embodiments, after the first time, the electronic device detects (732) additional content consumption activity of the user of the electronic device, such as in 6GG (e.g., the user has listened to more and/or new songs (e.g., "additional content items") since the first respective content mix was displayed). In some embodiments, after detecting the additional content consumption activity of the user of the electronic device (734), in accordance with a determination that the additional content consumption activity occurred within the first respective time period (e.g., the additional content consumption activity occurred during the year 2019, and the first respective content mix is associated with the year 2019), the electronic device displays the first respective content mix with updated content included in the first respective content mix based on the additional content consumption activity, such as including the consumption activity form November 1 to December 1 in FIG. 6GG (e.g., if the additional content consumption activity of the user satisfies criteria, as defined herein, to be included in the 2019 content mix, the 2019 content mix is optionally updated to include those additional content items). In some embodiments, if the additional content consumption activity of the user does not satisfy the criteria, as defined herein, to be included in the 2019 content mix, the 2019 content mix is optionally not updated to include those additional content items. In some embodiments, the content mix is updated periodically (e.g., weekly, monthly, etc.), so the detecting of the additional content consumption activity and/or the updating of the content mix optionally occur at those periods.

In some embodiments, after detecting the additional content consumption activity of the user of the electronic device, in accordance with a determination that the additional content consumption activity occurred after the first respective time period, the electronic device displays the first respective content mix without the updated content based on the additional content consumption activity (738), such as not including consumption history from December 1 to December 31 in FIG. 6GG. For example, even if the additional content consumption activity of the user had satisfied criteria, as defined herein, to be included in the 2019 content mix (e.g., consumed enough times, etc.), it would not be included in the 2019 content mix, because the consumption occurred after the time period associated with the 2019 content mix. In some embodiments, after the end of 2019, the 2019 content mix becomes static/fixed (rather than dynamic based on user content consumption activity, as it optionally is during the year 2019).

The above-described manner of only updating the content mix based on appropriate content consumption activity, and thus fixing/making static the content mix after the end of the relevant time period, reduces the amount of content consumption history the electronic device must track and process as time progresses beyond the relevant time period.

In some embodiments, after detecting the additional content consumption activity of the user of the electronic device (740), in accordance with the determination that the additional content consumption activity occurred after the first respective time period, the electronic device displays (742) a second respective content mix that includes content based on the additional content consumption activity of the user, wherein the second respective content mix is associated with a second respective time period, after the first respective time period, such as the 2019 content mix after the end of 2018 shown in FIG. 6D. For example, the additional content consumption activity of the user is used to generate/update a 2020 content mix (e.g., by including the additional content items consumed by the user in the 2020 content mix), because the additional content consumption activity occurred in the year 2020. Like the 2019 content mix, in some embodiments, the 2020 content mix is generated/updated automatically (e.g., without explicit user input to update/generate the content mix, and/or to include/exclude any particular content items in the content mix).

The above-described manner of automatically using the additional content consumption activity for creating the subsequent content mix provides a quick and efficient manner of generating that content mix, which simplifies the interaction between the user and the electronic device and enhances the operability of the electronic device and makes the user-device interface more efficient (e.g., automatically appropriately utilizing the additional content consumption history without the need from input from the user directing such utilization), which additionally reduces power usage and improves battery life of the electronic device by enabling the user to use the electronic device more quickly and efficiently.

In some embodiments, the first respective content mix is provided to the electronic device (e.g., is available for display/listening on the electronic device) in accordance with a determination that the past content consumption activity of the user during the first respective time period satisfies one or more content mix generation criteria (744), such as shown and described in FIG. 6B. In some embodiments, the first respective content mix is not provided to the electronic device (e.g., is not available for display/listening on the electronic device) in accordance with a determination that the past content consumption activity of the user during the first respective time period does not satisfy the one or more content mix generation criteria (746), such as in FIG. 6E. For example, the content consumption activity (e.g., number of song plays, variety of song plays, etc.) of the user during the first respective time period must satisfy the criteria for generating the first respective content mix for the first respective content mix to be generated; otherwise, the first respective content mix is optionally not generated. In some embodiments, a selectable element (e.g., displayed in a content recommendation user interface, as described below) for displaying the user interface associated with the first respective content mix is only displayed if the criteria for generating the first respective content mix are satisfied.

The above-described manner of selectively generating the content mix ensures that the content mix is only generated when it would be helpful or meaningful, which simplifies the interaction between the user and the electronic device and enhances the operability of the electronic device and makes the user-device interface more efficient (e.g., by eliminating the number of user inputs received for viewing the content mix when the existence of the content mix would not be meaningful or useful), which additionally reduces power usage and improves battery life of the electronic device by enabling the user to use the electronic device more quickly and efficiently.

In some embodiments, the second respective content mix is provided to the electronic device (e.g., is available for display/listening on the electronic device) in accordance with a determination that the past content consumption activity of the user during the second respective time period satisfies the one or more content mix generation criteria (748), such as the 2018 replay mix shown in FIG. 6B (e.g., a 2020 content mix, where the first respective content mix is a 2019 content mix).

In some embodiments, the second respective content mix is not provided to the electronic device (e.g., is not available for display/listening on the electronic device) in accordance with a determination that the content consumption activity of the user during the second respective time period does not satisfy the one or more content mix generation criteria (750), such as the lack of the 2018 replay mix shown in FIG. 6C. In some embodiments, the criteria for generating the second respective content mix (e.g., number of song plays, variety of song plays, etc.) are the same as the criteria for generating the first respective content mix (e.g., number of song plays, variety of song plays, etc.), except that the content consumption activity of the user that must satisfy the criteria for generating the first respective content mix is content consumption activity from the first respective time period, and the content consumption activity of the user that must satisfy the criteria for generating the second respective content mix is content consumption activity from the second respective time period.

The above-described manner of utilizing consistent content mix generation criteria for different time periods provides a consistent and efficient manner of generating content mixes based on the content consumption activity of the user during different time period, which simplifies the interaction between the user and the electronic device and enhances the operability of the electronic device and makes the user-device interface more efficient (e.g., by maintaining consistency between different time periods, which reduces user error in interacting with the electronic device), which additionally reduces power usage and improves battery life of the electronic device by enabling the user to use the electronic device more quickly and efficiently.

In some embodiments, the one or more content mix generation criteria include a criterion that is satisfied when more than a first threshold number of content items (e.g., 7, 10, 15, or 20 content items, such as songs) have been consumed more than a second threshold number of times (e.g., at least 3, 5 or 10 times) during a respective time period (752), such as described in FIG. 6B. For example, in some embodiments, in order for the first respective content mix to be generated, the user must have listened to at least 10 songs, each at least 3 times, during the first respective time period. In some embodiments, each of those at least 10 songs is optionally included in the first respective content mix. Songs that the user has listened to less than 3 times (e.g., once or twice) during the first respective time period are optionally not included in the first respective content mix. In some embodiments, the user must also have a subscription to a particular content provider during the first respective time period in order for the first respective content mix to be generated (e.g., and that content consumption must have occurred via that particular content provider, not via other content providers); otherwise, the first respective content mix is optionally not generated.

The above-described manner of regulating generation of the content mix ensures the content mix includes a limited amount of information (e.g., content), which simplifies the interaction between the user and the electronic device and enhances the operability of the electronic device and makes the user-device interface more efficient (e.g., by allowing interaction with and navigation through the content mix using fewer inputs), which additionally reduces power usage and improves battery life of the electronic device by enabling the user to use the electronic device more quickly and efficiently.

In some embodiments, the first respective content mix includes content consumed by the user of the electronic device, and does not include content not consumed by the user of the electronic device (754), such as described in FIG. 6G. In some embodiments, the first respective content mix only includes content items the user actually consumed during the first respective time period (and in some embodiments, a subset of those content items that the user consumed during the first respective time period—the subset that satisfies criteria for inclusion in the first respective content mix). This is, for example, in contrast to a content mix that includes content items not actually consumed by the user, but recommended to the user based on other content consumed by the user (e.g., similar style content, same genre content, other content from the same artist, etc.).

The above-described manner of including only content consumed by the user in the content mix reduces the universe of content items/artists/albums at issue, which reduces the processing necessary to generate the content mix (e.g., as compared with a content mix that must be generated from a universe of all content items, artists, albums, as opposed to one that is generated from a universe of only the content items, artists, albums consumed by the user), which additionally reduces power usage and improves battery life of the electronic device.

In some embodiments, the fourth criteria is met in accordance with a determination that the user has consumed more than a threshold duration of content (e.g., 1, 3, 5 hours of content) associated with each of more than a threshold number of content creators (e.g., 3, 5, 10 artists or content creators) during the first respective time period (756), such as in FIG. 6Q. In some embodiments, the fourth criteria is not met in accordance with a determination that the user has not consumed more than the threshold duration of content associated with each of more than the threshold number of content creators during the first respective time period, the user interface does not include the plurality of representations of content creators (758), such as in FIG. 6Q.

For example, the user interface that includes the information about the content items included in the first respective content mix optionally only includes representations of content creators (e.g., a "Top Artists" section) if the user has consumed at least 1 hour of content from each of three content creators during the first respective time period; otherwise (e.g., if the user has consumed 1 hour of content from each of only two content creators, or if the user has consumed 3 hours of content from only one content creator but not at least 1 hour of content from two other content creators), the user interface optionally does not include the representations of the content creators (e.g., while still including the representations of the content items included in the first respective content mix). In some embodiments, the content creators included in the representations of content creators are those content creators for which the user has consumed sufficient content—as described above—during the first respective time period.

The above-described manner of selectively including a content creator section in the user interface reduces the processing time needed to include/analyze such information if such information would not be useful or meaningful, which simplifies the interaction between the user and the electronic device and enhances the operability of the electronic device and makes the user-device interface more efficient (e.g., by avoiding requiring the user to provide input to navigate through sections of the user interface if they would not be useful or meaningful), which additionally reduces power usage and improves battery life of the electronic device by enabling the user to use the electronic device more quickly and efficiently.

In some embodiments, in accordance with a determination that the user has consumed more than a threshold number of content items (e.g., 3, 5, 7 songs) from a respective collection of content items (e.g., a music album) each more than a threshold number of times (e.g., 1, 3, 5, 7 times) during the first respective time period, the user interface includes a representation of the respective collection of content items (760), such as entry 668-1 and 668-2 shown in FIG. 6V. In some embodiments, in accordance with a determination that the user has not consumed more than the threshold number of content items from the respective collection of content items each more than the threshold number of times during the first respective time period, the user interface does not include the representation of the respective collection of content items (762).

For example, the user interface that includes the information about the content items included in the first respective content mix optionally only includes representations of collections of content items (e.g., a "Top Albums" section) if the user has consumed at least 3 songs from a given album, each more than once, during the first respective time period; otherwise (e.g., if the user has consumed only two songs from any given album), the user interface optionally does not include the representations of the albums (e.g., while still including the representations of the content items included in the first respective content mix). In some embodiments, the representations of the albums include the album art, the name of the album and/or the name of the artist associated with the album. In some embodiments, each album is selectable to display a user interface associated with the album that includes information about the album, the artist(s) associated with the album, and the songs included in the album. In some embodiments, the user interface will include the "Top Albums" section even if only a single album satisfies the above inclusion criteria (and that album will be included in the "Top Albums" section). In some embodiments, the user interface will only include the "Top Albums" section if more than a threshold number (e.g., 3, 5, 10) of albums satisfy the above inclusion criteria (and those albums—or a subset of those albums—will be included in the "Top Albums" section).

The above-described manner of selectively including a content collection section in the user interface reduces the processing time needed to include/analyze such information if such information would not be useful or meaningful, which simplifies the interaction between the user and the electronic device and enhances the operability of the electronic device and makes the user-device interface more efficient (e.g., by avoiding requiring the user to provide input to navigate through sections of the user interface if they would not be useful or meaningful), which additionally reduces power usage and improves battery life of the electronic device by enabling the user to use the electronic device more quickly and efficiently.

In some embodiments, the representation of the respective collection of content items is displayed with a visual indication of an amount of consumption, by the user during the first respective time period, of content included in the respective collection of content items (764), such as in the play counts shown in FIG. 6V. In some embodiments, the representations of albums are displayed with indications indicating the number of plays of songs included in those albums the user has completed during the first respective time period. For example, if the user has consumed songs from Album A a total of 57 times (e.g., song I 10 times, song II 25 times, song III 22 times) during the first respective time period, the representation of Album A is optionally displayed with "played 57 times". In some embodiments, in contrast to the above, the "play count" for a given album is determined differently. For example, a "play count" of 1 is attributed to the album for each time the user has listened to at least three songs in the album. For example, if the user has listened to the entire album (e.g., including 10 songs) in one sitting, that playback session is optionally counted as 1 "play count". Then if the user, in another sitting, listens to three songs from the album, that playback session is optionally counted as another 1 "play count". However, if the user, in another sitting, listens to only two songs from the album, that playback session is optionally not counted as any "play count." In some embodiments, the playback of those two songs from the playback session are combinable with playback of one or more songs (the same or different) from a subsequent playback session to register as another 1 "play count" for the album (e.g., because, together, the number of songs listened to is three or greater). In some embodiments, listening to one song 10 times (or 3 times) does not count as an album "play count" (but in some embodiments, it does). In some embodiments, if a user listens to the first track of an album, then navigates to another album or playlist, and comes back later and plays the second and third track of the album, together those listening events would count as 1 "play count" (but in some embodiments, it would not, because the listening activity would have occurred in different sessions of viewing the album user interface). In some embodiments, if a user listens to tracks 1-3 of an album during one session, then on the next day, listens to tracks 4-6, and then on a third day, listens to tracks 7-9, this counts as 3 "play counts" (because each session meets the minimum criteria for qualifying as an album play count); but in some embodiments, together, these would all be considered a single "play count" because the songs played would be no different than the songs that would have been played had the user simply listened to songs 1-9 in one sessions (which would optionally count as a single play count). Alternative manners of determining album "play count" are also possible.

The above-described manner of providing appropriate consumption information for collections of content items provides a quick and efficient manner of displaying and conveying information about the content consumption activity of the user during the first respective time period, which simplifies the interaction between the user and the electronic device and enhances the operability of the electronic device and makes the user-device interface more efficient (e.g., by displaying aggregated consumption information in meaningful groupings (e.g., albums) without requiring display of, and navigation through, separate consumption information for separate content items in the groupings (e.g., albums)), which additionally reduces power usage and improves battery life of the electronic device by enabling the user to use the electronic device more quickly and efficiently.

In some embodiments, the electronic device plays (766), by the user during the first respective time period, a respective content item included in the respective collection of content, such as Song 14 shown in FIG. 6Z (e.g., the user plays a song that is included in a given album that is included in the content mix user interface (e.g., the 2019 content mix user interface)).

In some embodiments, in accordance with a determination that the respective content item was played from a user interface associated with the respective collection of content items (e.g., the song was played from the album user interface for the given album), the visual indication of the amount of consumption of content included in the respective collection of content items reflects the playback of the respective content item (768), such as the play count updating to 8 plays in FIG. 6AA (e.g., playback of content from the album user interface counts towards the total consumption amount displayed in the content mix user interface for that album).

In some embodiments, in accordance with a determination that the respective content item was played from a user interface other than the user interface associated with the respective collection of content items (e.g., the song was played back from another user interface, such as from the user interface for a playlist, the song was individually searched for and played from the search user interface, the song was played from a content recommendation user interface, etc.), the visual indication of the amount of consumption of content included in the respective collection of content items does not reflect the playback of the respective content item (770), such as the play count not incrementing in FIG. 6CC (e.g., playback of content from other than the album user interface does not count towards the total consumption amount displayed in the content mix user interface for that album).

The above-described manner of conditionally including content playback activity in album play counts ensures that only relevant content playback is included in album play count, which simplifies the interaction between the user and the electronic device and enhances the operability of the electronic device and makes the user-device interface more efficient (e.g., by only including albums in the content mix user interface that the user has meaningfully played, and not including those that the user has not meaningfully played), which additionally reduces power usage and improves battery life of the electronic device by reducing unnecessary tracking and processing of album play count information.

In some embodiments, the first respective content mix is generated as a result of the past content consumption activity of the user during the first respective time period satisfying one or more content mix generation criteria (772), such as the 2019 replay mix shown in FIG. 6G (e.g., the content consumption history of the user during the first respective time period satisfies the criteria for generating the first respective content mix, as described herein).

In some embodiments, in accordance with a determination that the past content consumption activity of the user during a second respective time period, before the first respective time period (e.g., the user's content consumption during the year 2016, where the first respective time period is the year 2019), satisfies the one or more content mix generation criteria (e.g., the same criteria used to evaluate the user's content consumption in the year 2019), the user interface includes a representation of a second respective content mix that includes content based on the past content consumption history of the user during the second respective time period, wherein the representation of the second respective content mix is selectable to display information about the content included in the second respective content mix (774), such as the previous content mixes shown in FIG. 6DD (e.g., the user interface includes a "2016 content mix" representation that is currently fixed (e.g., because the current time is past 2016) as opposed to dynamic (e.g., as is the "2019 content mix", because the current time is within 2019), and is selectable to display a user interface that includes information about the content included in the 2016 content mix (e.g., displayed with the same information as is the content included in the 2019 content mix)).

In some embodiments, the 2016 content mix user interface that is displayed merely includes representations of (and play counts for) the songs in the 2016 content mix without including the additional information included in the 2019 content mix user interface, such as top artists and top albums (e.g., the 2016 content mix is displayed in a playlist user interface, just like other playlists would be displayed, with selectable elements for playing the songs in the playlist, adding the playlist to the library of the user, playing back the playlist in a shuffled order, etc.). In some embodiments, however, the 2016 content mix user interface that is displayed includes all of the analogous information that is included in the 2019 content mix user interface, such as representations of songs and play counts, representations of top albums (if the top album criteria were met that year) and play counts, representations of top artists (if the top artists criteria were met that year) and play times, etc.)

In some embodiments, in accordance with a determination that the past content consumption activity of the user during the second respective time period does not satisfy the one or more content mix generation criteria, the user interface does not include the representation of the second respective content mix (776), such as the lack of the 2017 replay mix shown in FIG. 6DD. For example, the user interface for the 2019 content mix optionally includes a "Back in Time" section that includes representations of content mixes for years in which the user's content consumption satisfied the criteria for generating those content mixes (if any).

The above-described manner of selectively including prior-time period content mix representations in the user interface provides a quick and efficient manner of accessing such prior-time period content mixes, which simplifies the interaction between the user and the electronic device and enhances the operability of the electronic device and makes the user-device interface more efficient (e.g., by allowing navigation to those content mixes from the user interface for the current content mix), which additionally reduces power usage and improves battery life of the electronic device by enabling the user to use the electronic device more quickly and efficiently.

In some embodiments, the input corresponding to the request to display the user interface associated with the first respective content mix comprises selection of a first selectable element associated with the first respective content mix, wherein the first selectable element is displayed in a content recommendation user interface (778), such as selection of banner 630 on the "For You" page shown in FIG. 6F (e.g., the first selectable element is displayed in a general content recommendation user interface that displays various content recommendations to the user based on the user's past content consumption, such as recommended songs (whether or not the user has listened to those songs), recommended artists (whether or not the user has listened to songs from those artists), recommended albums/artists based on content consumption activity of contacts of the user (whether or not the user has listened to those songs), etc.) In some embodiments, the first selectable element is not displayed in the content recommendation user interface if the criteria for generating the first respective content mix are not satisfied.

In some embodiments, a current time at the electronic device is within a second respective time period, after the first respective time period (780), such as Mar. 1, 2019 shown in FIG. 6D (e.g., the current date is in 2020, while the first respective time period is the year 2019).

In some embodiments, in accordance with a determination that the current time is more than a threshold time into the second respective time period (e.g., the current date is at least two months into 2020, such as Mar. 1, 2020), the content recommendation user interface includes a second selectable element associated with a second respective content mix that is associated with the second respective time period, wherein the second selectable element is selectable to display information about content included in the second respective content mix (e.g., including analogous information/elements as are displayed in the user interface associated with the first respective content mix), and the content recommendation user interface does not include the first selectable element associated with the first respective content mix (782), such as displaying a banner for the 2019 replay mix but not displaying a banner for the 2018 replay mix shown in FIG. 6D (e.g., if the content consumption activity of the user during 2020 satisfies the criteria for generating the 2020 content mix, the recommendation user interface includes an element selectable to display the user interface with information about the content included in the 2020 content mix, the content creators associated with the 2020 content mix (if any), the content collections associated with the 2020 content mix (if any), etc., and no longer includes the selectable element for the 2019 content mix).

In some embodiments, even if the current date is at least two months into 2020, if the content consumption activity of the user in 2020 does not satisfy the criteria for generating the 2020 content mix, the content recommendation user interface will not include the selectable element for the 2020 content mix (e.g., because the 2020 content mix is not generated), and will also not include the selectable element for the 2019 content mix, because the current date is at least two months into 2020).

In some embodiments, in accordance with a determination that the current time is less than the threshold time into the second respective time period, the content recommendation user interface does not include the second selectable element associated with the second respective content mix, and the content recommendation user interface includes the first selectable element associated with the first respective content mix (784), such as displaying a banner for the 2018 replay mix but not displaying a banner for the 2019 replay mix shown in FIG. 6B. Thus, in some embodiments, the content recommendation user interface does not switch from displaying the 2019 content mix representation to displaying the 2020 content mix representation (or simply ceasing to display the 2019 content mix representation without displaying the 2020 content mix representation) until at least two months have elapsed in the next time period (e.g., 2020). During this time, the 2019 content mix representation optionally remains selectable to display the user interface associated with the 2019 content mix representation, as described herein.

The above-described manner of maintaining the link for the content mix after the time period associated with the content mix provides a quick and efficient manner of continuing to access the content mix while the next content mix is not yet generated, which simplifies the interaction between the user and the electronic device and enhances the operability of the electronic device and makes the user-device interface more efficient (e.g., by allowing the user to quickly and efficiently access the latest available time period-content mix), which additionally reduces power usage and improves battery life of the electronic device by enabling the user to use the electronic device more quickly and efficiently.

In some embodiments, the user interface associated with the first respective content mix further includes a representation of a respective collection of content items consumed by the user during the first respective time period (e.g., the user interface for the first respective content mix includes a "Top Albums" section with a representation of at least one album), and the user interface is displayed in a first application (786), such as the top artists section displayed in the music playback website shown in FIG. 6OO (e.g., the user interface for the first respective content mix is displayed in a web browser).

In some embodiments, while displaying, via the display, the user interface associated with the first respective content mix, the electronic device receives (788), via the one or more input devices, a respective input, such as in FIG. 6MM and 6PP. In some embodiments, in response to receiving the respective input (790), in accordance with a determination that the respective input corresponds to a selection of the first content item (e.g., selection of the album art for the first content item included in the first respective content mix), the electronic device initiates (792) playback of the first content item while maintaining display of the user interface in the first application, such as playing Song 1 shown in FIG. 6NN (e.g., the selected song is played from within the web browser application, without the need to exit to another application to playback the selected song).

In some embodiments, in response to receiving the respective input, in accordance with a determination that the respective input corresponds to a selection of the respective collection of content items (794), such as selection of an artist in 6PP (e.g., selection of the album art for the album included in the "Top Albums" section), the electronic device displays (796), via the display, a user interface associated with the respective collection of content items, such as user interface 650 shown in FIG. 6QQ (e.g., a user interface corresponding to the selected album, that includes information about songs included in that album but does not include information about songs not included in that album or artists not associated with that album).

In some embodiments, the user interface associated with the respective collection of content items is displayed in a second application, different from the first application (798), such as the music playback application 600 shown in FIG. 6QQ (e.g., the web browser is optionally not able to access/display album user interfaces, and therefore a separate application (e.g., a music browsing application) is launched or displayed (e.g., if already launched), and the album user interface for the selected album is displayed in the separate application). In some embodiments, the web browser is closed/exited. In some embodiments, the web browser remains open/launched, and remains displaying the user interface associated with the first respective content mix, but is de-prioritized with respect to (e.g., displayed behind) the separate application in which the album user interface is displayed.

In some embodiments, the user interface associated with the respective collection of content items includes information about the content items included in the respective collection of content items (799), such as user interface 650 shown in FIG. 6QQ (e.g., names of songs included in the album, album art for the album, information about the artist(s) associated with the album, etc.). In some embodiments, the correct application for taking the requested action (e.g., playing a song or displaying an album user interface) is automatically displayed/launched in response to the user input without the need for the user input to determine which application is needed for each action.

The above-described manner of automatically taking the requested action in the appropriate application provides a quick and efficient manner of taking the requested action without error, which simplifies the interaction between the user and the electronic device and enhances the operability of the electronic device and makes the user-device interface more efficient (e.g., by reducing the input needed from the user to take the requested action, and also reducing errors in taking the requested action), which additionally reduces power usage and improves battery life of the electronic device by enabling the user to use the electronic device more quickly and efficiently.

It should be understood that the particular order in which the operations in FIGS. 7A-7K have been described is merely exemplary and is not intended to indicate that the described order is the only order in which the operations could be performed. One of ordinary skill in the art would recognize various ways to reorder the operations described herein.

The operations in the information processing methods described above are, optionally, implemented by running one or more functional modules in an information processing apparatus such as general purpose processors (e.g., as described with respect to FIGS. 1A-1B, 3, 5A-5C) or application specific chips. Further, the operations described above with reference to FIGS. 7A-7K are, optionally, implemented by components depicted in FIGS. 1A-1B. For example, detecting operations 732, displaying operations 704, 736, 738, 742, and 796, receiving operations 702, and initiating operations 792 are, optionally, implemented by event sorter 170, event recognizer 180, and event handler 190. Event monitor 171 in event sorter 170 detects a contact on touch-sensitive surface 604, and event dispatcher module 174 delivers the event information to application 136-1. A respective event recognizer 180 of application 136-1 compares the event information to respective event definitions 186, and determines whether a first contact at a first location on the touch-sensitive surface corresponds to a predefined event or sub-event, such as selection of an object on a user interface. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

As described above, one aspect of the present technology is the gathering and use of data available from specific and legitimate sources to improve the delivery to users of content that may be of interest to them. The present disclosure contemplates that in some instances, this gathered data may include personal information data that uniquely identifies or can be used to identify a specific person. Such personal information data can include demographic data, location-based data, online identifiers, telephone numbers, email addresses, home addresses, data or records relating to a user's health or level of fitness (e.g., vital signs measurements, medication information, exercise information), date of birth, or any other personal information.

The present disclosure recognizes that the use of such personal information data, in the present technology, can be used to the benefit of users. For example, the personal information data can be used to deliver curated playlists that may be of greater interest to the user in accordance with their preferences. Accordingly, use of such personal information data enables users to have greater control of the delivered content. Further, other uses for personal information data that benefit the user are also contemplated by the present disclosure.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominent and easily accessible by users, and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations that may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, such as in the case of advertisement delivery services, the present technology can be configured to allow users to select to "opt in" or "opt out" of participation in the collection of personal information data during registration for services or anytime thereafter. In another example, users can select not to provide content consumption activity data during user-set times for targeted content delivery services. In yet another example, users can select to limit the length of time content consumption activity data is maintained or entirely block the development of a content consumption profile. In addition to providing "opt in" and "opt out" options, the present disclosure contemplates providing notifications relating to the access or use of personal information. For instance, a user may be notified upon downloading an application that their personal information data will be accessed and then reminded again just before personal information data is accessed by the application.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, curated playlists can be generated and delivered to users based on aggregated non-personal information data or a bare minimum amount of personal information, such as the replay mixes being handled only on the user's device or other non-personal information available to the content delivery services.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

The invention claimed is:

1. A method comprising:
   at an electronic device in communication with a display and one or more input devices:
   receiving, via the one or more input devices, an input corresponding to a request to display a user interface associated with a first respective content mix, wherein the first respective content mix is associated with a first respective time period; and
   in response to receiving the input corresponding to the request to display the user interface associated with the first respective content mix, displaying, via the display, the user interface, wherein the user interface includes:
   in accordance with a determination that a first criteria is met, a plurality of representations of content items included in the first respective content mix based on a past content consumption history of a user during the first respective time period, including:
   in accordance with a determination that a second criteria is met, a first representation of a first content item that is displayed with a first visual indication of an amount of consumption, by the user during the first respective time period, of the first content item, wherein in accordance with a determination that the second criteria is not met, the user interface does not include the first representation of the first content item; and
   in accordance with a determination that a third criteria is met, a second representation of a second content item that is displayed with a second visual indication of an amount of consumption, by the user during the first respective time period, of the second content item, wherein in accordance with a determination that the third criteria is not met, the user interface does not include the second representation of the second content item,
   wherein the first visual indication and the second visual indication display consumption using a consumption metric of a first type; and
   in accordance with a determination that a fourth criteria is met, a plurality of representations of content creators selected based on the past content consumption history of the user during the first respective time period, including:
   in accordance with a determination that a fifth criteria is met, a first representation of a first content creator that is displayed with a third visual indication of an amount of consumption, by the user during the first respective time period, of content associated with the first content creator; and
   in accordance with a determination that a sixth criteria is met, a second representation of a second content creator that is displayed with a fourth visual indication of an amount of consumption, by the user during the first respective time period, of content associated with the second content creator,
   wherein the third visual indication and the fourth visual indication display consumption using a consumption metric of a second type, different from the first type.

2. The method of claim 1, wherein:
the first and second visual indications indicate numbers of times the user consumed the first and second content items, respectively, during the first respective time period, and
the third and fourth visual indications indicate durations of time the user consumed content associated with the first and second content creators, respectively, during the first respective time period.

3. The method of claim 1, wherein:
the input corresponding to the request to display the user interface associated with the first respective content mix is received at a first time,
in accordance with a determination that the first time is within the first respective time period, the content included in the first respective content mix is based on the past content consumption history of the user of the electronic device during a first portion of the first respective time period but not a second portion of the first respective time period, and in accordance with a determination that the first time is after the first respective time period, the content included in the first respective content mix is based on the past content consumption history of the user of the electronic device during the first and second portions of the first respective time period.

4. The method of claim 3, further comprising:

after the first time, detecting additional content consumption activity of the user of the electronic device; and after detecting the additional content consumption activity of the user of the electronic device:

in accordance with a determination that the additional content consumption activity occurred within the first respective time period, displaying the first respective content mix with updated content included in the first respective content mix based on the additional content consumption activity; and in accordance with a determination that the additional content consumption activity occurred after the first respective time period, displaying the first respective content mix without the updated content based on the additional content consumption activity.

5. The method of claim 4, further comprising:

after detecting the additional content consumption activity of the user of the electronic device:

in accordance with the determination that the additional content consumption activity occurred after the first respective time period, displaying a second respective content mix that includes content based on the additional content consumption activity of the user, wherein the second respective content mix is associated with a second respective time period, after the first respective time period.

6. The method of claim 5, wherein:

the second respective content mix is provided to the electronic device in accordance with a determination that past content consumption history of the user during the second respective time period satisfies one or more content mix generation criteria; and the second respective content mix is not provided to the electronic device in accordance with a determination that the past content consumption history of the user during the second respective time period does not satisfy the one or more content mix generation criteria.

7. The method of claim 1, wherein:

the first respective content mix is provided to the electronic device in accordance with a determination that the past content consumption history of the user during the first respective time period satisfies one or more content mix generation criteria; and the first respective content mix is not provided to the electronic device in accordance with a determination that the past content consumption history of the user during the first respective time period does not satisfy the one or more content mix generation criteria.

8. The method of claim 7, wherein the one or more content mix generation criteria include:

a criterion that is satisfied when more than a first threshold number of content items have been consumed more than a second threshold number of times during a respective time period.

9. The method of claim 1, wherein the first respective content mix includes content consumed by the user of the electronic device, and does not include content not consumed by the user of the electronic device.

10. The method of claim 1, wherein:

the fourth criteria is met in accordance with a determination that the user has consumed more than a threshold duration of content associated with each of more than a threshold number of content creators during the first respective time period, and the fourth criteria is not met in accordance with a determination that the user has not consumed more than the threshold duration of content associated with each of more than the threshold number of content creators during the first respective time period, the user interface does not include the plurality of representations of content creators.

11. The method of claim 1, wherein:

in accordance with a determination that the user has consumed more than a threshold number of content items from a respective collection of content items each more than a threshold number of times during the first respective time period, the user interface includes a representation of the respective collection of content items, and in accordance with a determination that the user has not consumed more than the threshold number of content items from the respective collection of content items each more than the threshold number of times during the first respective time period, the user interface does not include the representation of the respective collection of content items.

12. The method of claim 11, wherein the representation of the respective collection of content items is displayed with a visual indication of an amount of consumption, by the user during the first respective time period, of content included in the respective collection of content items.

13. The method of claim 12, further comprising:

playing, by the user during the first respective time period, a respective content item included in the respective collection of content, wherein:

in accordance with a determination that the respective content item was played from a user interface associated with the respective collection of content items, the visual indication of the amount of consumption of content included in the respective collection of content items reflects playback of the respective content item, and in accordance with a determination that the respective content item was played from a user interface other than the user interface associated with the respective collection of content items, the visual indication of the amount of consumption of content included in the respective collection of content items does not reflect the playback of the respective content item.

14. The method of claim 1, wherein:

the first respective content mix is generated as a result of the past content consumption history of the user during the first respective time period satisfying one or more content mix generation criteria, in accordance with a determination that past content consumption history of the user during a second respective time period, before the first respective time period, satisfies the one or more content mix generation criteria, the user interface includes a representation of a second respective content mix that includes content based on the past content consumption history of the user during the second respective time period, wherein the representation of the second respective content mix is selectable to display information about the content included in the second respective content mix, and in accordance with a determination that the past content consumption history of the user during the second respective time period does not satisfy the one or more content mix generation criteria, the user interface does not include the representation of the second respective content mix.

15. The method of claim 1, wherein:

the input corresponding to the request to display the user interface associated with the first respective content mix comprises selection of a first selectable element associated with the first respective content mix, wherein the first selectable element is displayed in a content recommendation user interface, a current time at the electronic device is within a second respective time period, after the first respective time period, in accordance with a determination that the current time is more than a threshold time into the second respective time period, the content recommendation user interface includes a second selectable element associated with a second respective content mix that is associated with the second respective time period, wherein the second selectable element is selectable to display information about content included in the second respective content mix, and the content recommendation user interface does not include the first selectable element associated with the first respective content mix, and in accordance with a determination that the current time is less than the threshold time into the second respective time period, the content recommendation user interface does not include the second selectable element associated with the second respective content mix, and the content recommendation user interface includes the first selectable element associated with the first respective content mix.

16. The method of claim 1, wherein the user interface associated with the first respective content mix further includes a representation of a respective collection of content items consumed by the user during the first respective time period, and the user interface is displayed in a first application, the method further comprising:

while displaying, via the display, the user interface associated with the first respective content mix, receiving, via the one or more input devices, a respective input; and in response to receiving the respective input:

in accordance with a determination that the respective input corresponds to a selection of the first content item, initiating playback of the first content item while maintaining display of the user interface in the first application; and in accordance with a determination that the respective input corresponds to a selection of the respective collection of content items:

displaying, via the display, a user interface associated with the respective collection of content items, wherein:

the user interface associated with the respective collection of content items is displayed in a second application, different from the first application, and the user interface associated with the respective collection of content items includes information about the content items included in the respective collection of content items.

17. The method of claim 1, wherein the consumption metric of the first type is a total number of times a respective content item was consumed by the user during the first respective time period.

18. The method of claim 1, wherein the consumption metric of the second type is a total amount of time content from a respective content creator was consumed by the user during the first respective time period.

19. An electronic device, comprising:

one or more processors;

memory; and one or more programs, wherein the one or more programs are stored in the memory and configured to be executed by the one or more processors, the one or more programs including instructions for:

receiving, via one or more input devices, an input corresponding to a request to display a user interface associated with a first respective content mix, wherein the first respective content mix is associated with a first respective time period; and in response to receiving the input corresponding to the request to display the user interface associated with the first respective content mix, displaying, via a display, the user interface, wherein the user interface includes:

in accordance with a determination that a first criteria is met, a plurality of representations of content items included in the first respective content mix based on a past content consumption history of a user during the first respective time period, including:

in accordance with a determination that a second criteria is met, a first representation of a first content item that is displayed with a first visual indication of an amount of consumption, by the user during the first respective time period, of the first content item, wherein in accordance with a determination that the second criteria is not met, the user interface does not include the first representation of the first content item; and in accordance with a determination that a third criteria is met, a second representation of a second content item that is displayed with a second visual indication of an amount of consumption, by the user during the first respective time period, of the second content item, wherein in accordance with a determination that the third criteria is not met, the user interface does not include the second representation of the second content item, wherein the first visual indication and the second visual indication display consumption using a consumption metric of a first type; and in accordance with a determination that a fourth criteria is met, a plurality of representations of content creators selected based on the past content consumption history of the user during the first respective time period, including:

in accordance with a determination that a fifth criteria is met, a first representation of a first content creator that is displayed with a third visual indication of an amount of consumption, by the user during the first respective time period, of content associated with the first content creator; and in accordance with a determination that a sixth criteria is met, a second representation of a second content creator that is displayed with a fourth visual indication of an amount of consumption, by the user during the first respective time period, of content associated with the second content creator,
wherein the third visual indication and the fourth visual indication display consumption using a consumption metric of a second type, different from the first type.

20. The electronic device of claim 19, wherein:
the first and second visual indications indicate numbers of times the user consumed the first and second content items, respectively, during the first respective time period, and
the third and fourth visual indications indicate durations of time the user consumed content associated with the first and second content creators, respectively, during the first respective time period.

21. The electronic device of claim 19, wherein:
the input corresponding to the request to display the user interface associated with the first respective content mix is received at a first time,
in accordance with a determination that the first time is within the first respective time period, the content included in the first respective content mix is based on the past content consumption history of the user of the electronic device during a first portion of the first respective time period but not a second portion of the first respective time period, and
in accordance with a determination that the first time is after the first respective time period, the content included in the first respective content mix is based on the past content consumption history of the user of the electronic device during the first and second portions of the first respective time period.

22. The electronic device of claim 21, the one or more programs further including instructions for:
after the first time, detecting additional content consumption activity of the user of the electronic device; and
after detecting the additional content consumption activity of the user of the electronic device:
in accordance with a determination that the additional content consumption activity occurred within the first respective time period, displaying the first respective content mix with updated content included in the first respective content mix based on the additional content consumption activity; and
in accordance with a determination that the additional content consumption activity occurred after the first respective time period, displaying the first respective content mix without the updated content based on the additional content consumption activity.

23. The electronic device of claim 22, the one or more programs further including instructions for:
after detecting the additional content consumption activity of the user of the electronic device:
in accordance with the determination that the additional content consumption activity occurred after the first respective time period, displaying a second respective content mix that includes content based on the additional content consumption activity of the user, wherein the second respective content mix is associated with a second respective time period, after the first respective time period.

24. The electronic device of claim 23, wherein:
the second respective content mix is provided to the electronic device in accordance with a determination that past content consumption history of the user during the second respective time period satisfies one or more content mix generation criteria; and
the second respective content mix is not provided to the electronic device in accordance with a determination that the past content consumption history of the user during the second respective time period does not satisfy the one or more content mix generation criteria.

25. The electronic device of claim 19, wherein:
the first respective content mix is provided to the electronic device in accordance with a determination that the past content consumption history of the user during the first respective time period satisfies one or more content mix generation criteria; and
the first respective content mix is not provided to the electronic device in accordance with a determination that the past content consumption history of the user during the first respective time period does not satisfy the one or more content mix generation criteria.

26. The electronic device of claim 25, wherein the one or more content mix generation criteria include:
a criterion that is satisfied when more than a first threshold number of content items have been consumed more than a second threshold number of times during a respective time period.

27. The electronic device of claim 19, wherein the first respective content mix includes content consumed by the user of the electronic device, and does not include content not consumed by the user of the electronic device.

28. The electronic device of claim 19, wherein:
the fourth criteria is met in accordance with a determination that the user has consumed more than a threshold duration of content associated with each of more than a threshold number of content creators during the first respective time period, and
the fourth criteria is not met in accordance with a determination that the user has not consumed more than the threshold duration of content associated with each of more than the threshold number of content creators during the first respective time period, the user interface does not include the plurality of representations of content creators.

29. The electronic device of claim 19, wherein:
in accordance with a determination that the user has consumed more than a threshold number of content items from a respective collection of content items each more than a threshold number of times during the first respective time period, the user interface includes a representation of the respective collection of content items, and
in accordance with a determination that the user has not consumed more than the threshold number of content items from the respective collection of content items each more than the threshold number of times during the first respective time period, the user interface does not include the representation of the respective collection of content items.

30. The electronic device of claim 29, wherein the representation of the respective collection of content items is displayed with a visual indication of an amount of consumption, by the user during the first respective time period, of content included in the respective collection of content items.

31. The electronic device of claim 30, the one or more programs further including instructions for:
playing, by the user during the first respective time period, a respective content item included in the respective collection of content,
wherein:
in accordance with a determination that the respective content item was played from a user interface associated with the respective collection of content items, the visual indication of the amount of consumption of content included in the respective collection of content items reflects playback of the respective content item, and
in accordance with a determination that the respective content item was played from a user interface other than the user interface associated with the respective collection of content items, the visual indication of the amount of consumption of content included in the respective collection of content items does not reflect the playback of the respective content item.

32. The electronic device of claim 19, wherein:
the first respective content mix is generated as a result of the past content consumption history of the user during the first respective time period satisfying one or more content mix generation criteria,
in accordance with a determination that past content consumption history of the user during a second respective time period, before the first respective time period, satisfies the one or more content mix generation criteria, the user interface includes a representation of a second respective content mix that includes content based on the past content consumption history of the user during the second respective time period, wherein the representation of the second respective content mix is selectable to display information about the content included in the second respective content mix, and
in accordance with a determination that the past content consumption history of the user during the second respective time period does not satisfy the one or more content mix generation criteria, the user interface does not include the representation of the second respective content mix.

33. The electronic device of claim 19, wherein:
the input corresponding to the request to display the user interface associated with the first respective content mix comprises selection of a first selectable element associated with the first respective content mix, wherein the first selectable element is displayed in a content recommendation user interface, a current time at the electronic device is within a second respective time period, after the first respective time period,
in accordance with a determination that the current time is more than a threshold time into the second respective time period, the content recommendation user interface includes a second selectable element associated with a second respective content mix that is associated with the second respective time period, wherein the second selectable element is selectable to display information about content included in the second respective content mix, and the content recommendation user interface does not include the first selectable element associated with the first respective content mix, and
in accordance with a determination that the current time is less than the threshold time into the second respective time period, the content recommendation user interface does not include the second selectable element associated with the second respective content mix, and the content recommendation user interface includes the first selectable element associated with the first respective content mix.

34. The electronic device of claim 19, wherein the user interface associated with the first respective content mix further includes a representation of a respective collection of content items consumed by the user during the first respective time period, and the user interface is displayed in a first application, the one or more programs further including instructions for:
while displaying, via the display, the user interface associated with the first respective content mix, receiving, via the one or more input devices, a respective input; and
in response to receiving the respective input:
in accordance with a determination that the respective input corresponds to a selection of the first content item, initiating playback of the first content item while maintaining display of the user interface in the first application; and
in accordance with a determination that the respective input corresponds to a selection of the respective collection of content items:
displaying, via the display, a user interface associated with the respective collection of content items, wherein:
the user interface associated with the respective collection of content items is displayed in a second application, different from the first application, and
the user interface associated with the respective collection of content items includes information about the content items included in the respective collection of content items.

35. The electronic device of claim 19, wherein the consumption metric of the first type is a total number of times a respective content item was consumed by the user during the first respective time period.

36. The electronic device of claim 19, wherein the consumption metric of the second type is a total amount of time content from a respective content creator was consumed by the user during the first respective time period.

37. A non-transitory computer readable storage medium storing one or more programs, the one or more programs comprising instructions, which when executed by one or more processors of an electronic device, cause the electronic device to:
receive, via one or more input devices, an input corresponding to a request to display a user interface associated with a first respective content mix, wherein the first respective content mix is associated with a first respective time period; and
in response to receiving the input corresponding to the request to display the user interface associated with the first respective content mix, display, via a display, the user interface, wherein the user interface includes:
in accordance with a determination that a first criteria is met, a plurality of representations of content items included in the first respective content mix based on a past content consumption history of a user during the first respective time period, including:
in accordance with a determination that a second criteria is met, a first representation of a first content item that is displayed with a first visual indication of an amount of consumption, by the user during the first respective time period, of the first content item, wherein in accordance with a determination that the second criteria is not met, the user interface does not include the first representation of the first content item; and in accordance with a determination that a third criteria is met, a second representation of a second content item that is displayed with a second visual indication of an amount of consumption, by the user during the first respective time period, of the second content item, wherein in accordance with a determination that the third criteria is not met, the user interface does not include the second representation of the second content item, wherein the first visual indication and the second visual indication display consumption using a consumption metric of a first type; and in accordance with a determination that a fourth criteria is met, a plurality of representations of content creators selected based on the past content consumption history of the user during the first respective time period, including:

in accordance with a determination that a fifth criteria is met, a first representation of a first content creator that is displayed with a third visual indication of an amount of consumption, by the user during the first respective time period, of content associated with the first content creator; and in accordance with a determination that a sixth criteria is met, a second representation of a second content creator that is displayed with a fourth visual indication of an amount of consumption, by the user during the first respective time period, of content associated with the second content creator, wherein the third visual indication and the fourth visual indication display consumption using a consumption metric of a second type, different from the first type.

38. The non-transitory computer readable storage medium of claim 37, wherein:
the first and second visual indications indicate numbers of times the user consumed the first and second content items, respectively, during the first respective time period, and
the third and fourth visual indications indicate durations of time the user consumed content associated with the first and second content creators, respectively, during the first respective time period.

39. The non-transitory computer readable storage medium of claim 37, wherein:
the input corresponding to the request to display the user interface associated with the first respective content mix is received at a first time,
in accordance with a determination that the first time is within the first respective time period, the content included in the first respective content mix is based on the past content consumption history of the user of the electronic device during a first portion of the first respective time period but not a second portion of the first respective time period, and
in accordance with a determination that the first time is after the first respective time period, the content included in the first respective content mix is based on the past content consumption history of the user of the electronic device during the first and second portions of the first respective time period.

40. The non-transitory computer readable storage medium of claim 39, the one or more programs further including instructions for:

after the first time, detecting additional content consumption activity of the user of the electronic device; and
after detecting the additional content consumption activity of the user of the electronic device:
in accordance with a determination that the additional content consumption activity occurred within the first respective time period, displaying the first respective content mix with updated content included in the first respective content mix based on the additional content consumption activity; and
in accordance with a determination that the additional content consumption activity occurred after the first respective time period, displaying the first respective content mix without the updated content based on the additional content consumption activity.

41. The non-transitory computer readable storage medium of claim 40, the one or more programs further including instructions for:
after detecting the additional content consumption activity of the user of the electronic device:
in accordance with the determination that the additional content consumption activity occurred after the first respective time period, displaying a second respective content mix that includes content based on the additional content consumption activity of the user, wherein the second respective content mix is associated with a second respective time period, after the first respective time period.

42. The non-transitory computer readable storage medium of claim 41, wherein:
the second respective content mix is provided to the electronic device in accordance with a determination that past content consumption history of the user during the second respective time period satisfies one or more content mix generation criteria; and
the second respective content mix is not provided to the electronic device in accordance with a determination that the past content consumption history of the user during the second respective time period does not satisfy the one or more content mix generation criteria.

43. The non-transitory computer readable storage medium of claim 37, wherein:
the first respective content mix is provided to the electronic device in accordance with a determination that the past content consumption history of the user during the first respective time period satisfies one or more content mix generation criteria; and
the first respective content mix is not provided to the electronic device in accordance with a determination that the past content consumption history of the user during the first respective time period does not satisfy the one or more content mix generation criteria.

44. The non-transitory computer readable storage medium of claim 43, wherein the one or more content mix generation criteria include:
a criterion that is satisfied when more than a first threshold number of content items have been consumed more than a second threshold number of times during a respective time period.

45. The non-transitory computer readable storage medium of claim 37, wherein the first respective content mix includes content consumed by the user of the electronic device, and does not include content not consumed by the user of the electronic device.

46. The non-transitory computer readable storage medium of claim 37, wherein:
the fourth criteria is met in accordance with a determination that the user has consumed more than a threshold duration of content associated with each of more than a threshold number of content creators during the first respective time period, and
the fourth criteria is not met in accordance with a determination that the user has not consumed more than the threshold duration of content associated with each of more than the threshold number of content creators during the first respective time period, the user interface does not include the plurality of representations of content creators.

47. The non-transitory computer readable storage medium of claim 37, wherein:
in accordance with a determination that the user has consumed more than a threshold number of content items from a respective collection of content items each more than a threshold number of times during the first respective time period, the user interface includes a representation of the respective collection of content items, and
in accordance with a determination that the user has not consumed more than the threshold number of content items from the respective collection of content items each more than the threshold number of times during the first respective time period, the user interface does not include the representation of the respective collection of content items.

48. The non-transitory computer readable storage medium of claim 47, wherein the representation of the respective collection of content items is displayed with a visual indication of an amount of consumption, by the user during the first respective time period, of content included in the respective collection of content items.

49. The non-transitory computer readable storage medium of claim 48, the one or more programs further including instructions for:
playing, by the user during the first respective time period, a respective content item included in the respective collection of content,
wherein:
in accordance with a determination that the respective content item was played from a user interface associated with the respective collection of content items, the visual indication of the amount of consumption of content included in the respective collection of content items reflects playback of the respective content item, and
in accordance with a determination that the respective content item was played from a user interface other than the user interface associated with the respective collection of content items, the visual indication of the amount of consumption of content included in the respective collection of content items does not reflect the playback of the respective content item.

50. The non-transitory computer readable storage medium of claim 37, wherein:
the first respective content mix is generated as a result of the past content consumption history of the user during the first respective time period satisfying one or more content mix generation criteria,
in accordance with a determination that past content consumption history of the user during a second respective time period, before the first respective time period, satisfies the one or more content mix generation criteria, the user interface includes a representation of a second respective content mix that includes content based on the past content consumption history of the user during the second respective time period, wherein the representation of the second respective content mix is selectable to display information about the content included in the second respective content mix, and
in accordance with a determination that the past content consumption history of the user during the second respective time period does not satisfy the one or more content mix generation criteria, the user interface does not include the representation of the second respective content mix.

51. The non-transitory computer readable storage medium of claim 37, wherein:
the input corresponding to the request to display the user interface associated with the first respective content mix comprises selection of a first selectable element associated with the first respective content mix, wherein the first selectable element is displayed in a content recommendation user interface,
a current time at the electronic device is within a second respective time period, after the first respective time period,
in accordance with a determination that the current time is more than a threshold time into the second respective time period, the content recommendation user interface includes a second selectable element associated with a second respective content mix that is associated with the second respective time period, wherein the second selectable element is selectable to display information about content included in the second respective content mix, and the content recommendation user interface does not include the first selectable element associated with the first respective content mix, and
in accordance with a determination that the current time is less than the threshold time into the second respective time period, the content recommendation user interface does not include the second selectable element associated with the second respective content mix, and the content recommendation user interface includes the first selectable element associated with the first respective content mix.

52. The non-transitory computer readable storage medium of claim 37, wherein the user interface associated with the first respective content mix further includes a representation of a respective collection of content items consumed by the user during the first respective time period, and the user interface is displayed in a first application, the one or more programs further including instructions for:
while displaying, via the display, the user interface associated with the first respective content mix, receiving, via the one or more input devices, a respective input; and
in response to receiving the respective input:
in accordance with a determination that the respective input corresponds to a selection of the first content item, initiating playback of the first content item while maintaining display of the user interface in the first application; and
in accordance with a determination that the respective input corresponds to a selection of the respective collection of content items:
displaying, via the display, a user interface associated with the respective collection of content items, wherein:

the user interface associated with the respective collection of content items is displayed in a second application, different from the first application, and content items includes information about the content items included in the respective collection of content items.

53. The non-transitory computer readable storage medium of claim 37, wherein the consumption metric of the first type is a total number of times a respective content item was consumed by the user during the first respective time period.

54. The non-transitory computer readable storage medium of claim 37, wherein the consumption metric of the second type is a total amount of time content from a respective content creator was consumed by the user during the first respective time period.

* * * * *

UNITED STATES PATENT AND TRADEMARK OFFICE
CERTIFICATE OF CORRECTION

| | | |
|---|---|---|
| PATENT NO. | : 11,656,838 B2 | Page 1 of 1 |
| APPLICATION NO. | : 17/095394 | |
| DATED | : May 23, 2023 | |
| INVENTOR(S) | : Tiffany S. Reese et al. | |

It is certified that error appears in the above-identified patent and that said Letters Patent is hereby corrected as shown below:

In the Claims

In Column 73, Line 4, in Claim 52 please delete "content" and insert -- the user interface associated with the respective collection of content --.

Signed and Sealed this
Thirtieth Day of September, 2025

John A. Squires
*Director of the United States Patent and Trademark Office*